United States Patent
Taguchi

(10) Patent No.: US 7,316,472 B2
(45) Date of Patent: *Jan. 8, 2008

(54) JET PRINTING INK AND METHOD OF INK JET PRINTING

(75) Inventor: Toshiki Taguchi, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 105 days.

This patent is subject to a terminal disclaimer.

(21) Appl. No.: 10/503,764

(22) PCT Filed: Feb. 6, 2003

(86) PCT No.: PCT/JP03/01250

§ 371 (c)(1),
(2), (4) Date: Apr. 28, 2005

(87) PCT Pub. No.: WO03/066754

PCT Pub. Date: Aug. 14, 2003

(65) Prior Publication Data

US 2005/0219339 A1    Oct. 6, 2005

(30) Foreign Application Priority Data

Feb. 7, 2002 (JP) ............... 2002-030987
Feb. 8, 2002 (JP) ............... 2002-032862
Feb. 8, 2002 (JP) ............... 2002-032941
Feb. 12, 2002 (JP) ............... 2002-033926

(51) Int. Cl.
*G01D 11/00* (2006.01)

(52) U.S. Cl. ............... 347/100; 347/95; 523/160

(58) Field of Classification Search ............... 347/100, 347/95, 96, 101; 106/31.6, 31.27, 31.13; 523/160

See application file for complete search history.

(56) References Cited

U.S. PATENT DOCUMENTS

| 3,287,470 | A | 11/1966 | Geigy |
| 5,704,969 | A | 1/1998 | Kanaya et al. |
| 7,037,365 | B2 * | 5/2006 | Taguchi et al. ............ 347/100 |

FOREIGN PATENT DOCUMENTS

| EP | 20161 A2 | 12/1980 |
| EP | 1 364 994 A1 | 1/2002 |
| JP | 5-17714 A | 1/1993 |
| JP | 2000-239584 A | 9/2000 |
| JP | 2002-285050 A | 10/2002 |
| JP | 2003-64275 A | 3/2003 |
| WO | WO 96/34916 A2 | 11/1996 |
| WO | WO 02/60994 A1 | 1/2002 |
| WO | WO 02/83795 A2 | 4/2002 |

OTHER PUBLICATIONS

Tokuya Ota, "Ink Jet Printer-yo Ink to Kirokushi", Electrophotography, 1985, vol. 24, No. 4, pp. 356 to 358.
Kabushiki Kaisha Gijutsu Joho Kyokai, "Ink Jet Kiroku ni okeru Ink-Media-Printer no Kaihatsu Gijutsu", Kabushiki Kaisha Gijutsu Joho Kyokai, Feb. 1, 2001, p. 4.
Takeshi Amari, "Ink Jet Printer Gijutsu to Zairyo", Kabushiki Kaisha CMC, Jul. 31, 1998, pp. 206 to 207.

* cited by examiner

*Primary Examiner*—Manish S. Shah
(74) *Attorney, Agent, or Firm*—Sughrue Mion, Pllc.

(57) ABSTRACT

An ink for ink jet recording comprises a water soluble dye, in which the water soluble dye having an oxidation potential more positive than 1.0 V (SCE) is dissolved or dispersed in an aqueous medium, which comprises at least one selected from compounds represented by the following general formula (A) and compounds represented by the following general formula (B), which gives excellent in discharge stability of the ink even after aging for long period of time.

20 Claims, No Drawings

JET PRINTING INK AND METHOD OF INK JET PRINTING

TECHNICAL FIELD

The present invention relates to an ink for ink jet recording and a method of recording where the ink is used, and particularly to an ink for ink jet recording that is high in quality of recorded images, excellent in discharge stability of an ink liquid even after aging for a long period of time, and furthermore, excellent in keeping quality of the resulting images and a method of ink jet recording where the ink is used.

BACKGROUND ART

In recent years, with the spread of a computer an ink jet printer has been widely used not only in offices but also in houses in order to carry out printing or drawing on paper, film, cloth, and the like.

The method of ink jet recording include a system of discharging droplets by applying a pressure by use of a piezoresistor, a system of discharging droplets by foaming ink with the aid of heat, a system of using ultrasonic waves, or a system of sucking and discharging droplets by use of electrostatic force. As the ink for ink jet recording, an aqueous ink, an oily ink, or a solid (fusing type) ink is used.

Of these inks, the aqueous ink is comparatively superior to the oily ink and solid (fusing type) ink in view of possibility that manufacture, handling property, odor, safety, and the like can be simultaneously satisfied, and accordingly has become the leading ink for ink jet recording at present.

Dyestuffs used for these inks for ink jet recording need high solubility in solvent (ink medium), capability of high density recording, good color hue, excellent resistance to light, heat, air, water, or chemicals, good fixing onto image-receiving materials and resistant to blurring, excellent keeping quality of ink, no toxicity, high purity, and furthermore availability at a reasonable price.

However, it is extremely difficult to search dyestuffs meeting the above-described requirements at high levels. Particularly, excellent color hue and fastness are incompatible with each other in many cases, color materials for magenta or cyan ink that meet all requirements as described above are difficult to acquire, and particularly it is difficult to search for dyestuffs where good magenta or cyan color hue is compatible with light resistance enduring an oxidative atmosphere.

Accordingly, although various dyes and pigments have been proposed for the ink jet already and used indeed, dyestuffs that meet all requirements as described above have not been found out yet in the present state.

Hitherto well known dyes and pigments on which the color index numbers are bestowed are difficult to allow the compatibility of the color hue with the fastness required by the ink for ink jet recording.

Azo dyes derived from aromatic amines and five-membered heterocyclic amines as described in the following patent literature 1 are proposed as dyes improved in fastness. However, since these dyes have unpreferable color hues in yellow and cyan regions, the dyes have a problem of deteriorating the reproducibility of color.

The following patent literatures 2 and 3 disclose inks for ink jet recording aiming at the compatibility between the color hue and light resistance. However, the dyestuffs used in the respective literatures have poor solubility in water in a case where they are used for water-soluble inks. Use of the dyestuffs described in the respective literatures for water-soluble inks for ink jet also introduces a problem in wet heat resistance.

Compounds and ink compositions described in the following patent literature 4 are proposed as a means of solving these problems. In addition, in order to improve the color hue and light resistance, inks for ink jet recording where a pyrazolyl aniline azo dyestuff is used are described (the following patent literature 5). However, these inks for ink jet recording were insufficient in both reproducibility of color and fastness of output images.

When glossy paper used exclusively for ink jet for photographic image was used for recording and stuck in a room, it was further found that the keeping quality of image was remarkably poor in some cases. The present inventor presumes that this phenomenon is due to an oxidative gas in the air such as ozone. Furthermore, although this phenomenon occurs with difficulty by putting the paper into a glass-made picture frame and intercepting a stream of the air, this treatment results in limiting conditions for use.

This phenomenon is particularly noticeable in the glossy paper used exclusively for ink jet for photographic image and presents a serious problem to the present ink jet recording system where the photographic image is one of important characteristics.

Furthermore, it was found that the aqueous ink had a problem of deteriorating readily the discharging properties thereof.

[List of Patent Literatures of Conventional Art]
  [Patent Literature 1]
  JP-A-55-161856
  [Patent Literature 2]
  JP-A-61-36362
  [Patent literature 3]
  JP-A-2-212566
  [Patent Literature 4]
  JP-T-11-504958 (the term "JP-T" as used herein means a published Japanese translation of a PCT application)
  [Patent Literature 5]
  JP Application No. 2000-80733

The object of this invention is to provide an ink for ink jet recording that is excellent in discharge stability even after aging the ink over a long period of time, in addition, good in color hue, and excellent in weathering resistance, light resistance, heat stability, and oxidation resistance and a recording method where the ink is used.

DISCLOSURE OF THE INVENTION

The object of this invention is achieved by means as described in the following items 1 to 18.

1. An ink for ink jet recording comprising a dye dissolved or disperses in an aqueous medium, wherein the dye is a water-soluble dye having an oxidation potential more positive than 1.0 V (vs SCE) and the ink comprises at least one selected from compounds represented by the following general formula (A) and compounds represented by the following general formula (B):

General Formula (A)

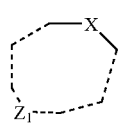

in the formula, X represents a group containing carbonyl or a heteroatom; $Z_1$ represents a group of atoms that can form a cyclic organic substance:

General Formula (B)

X$^1$—Y-Z in the formula, X$^1$ represents a group shown by —N(Q$_1$)-Q$_2$; Z represents a group shown by —N(Q$_1$)-Q$_2$ or a group shown by —O-Q$_3$; Y represents a group shown by —W-(G)$_k$-(H)$_n$—; W and H represent groups shown by —CO—, —SO$_2$—, or —PO(Q$_4$)—; G represents a divalent connecting group; Q$_1$ to Q$_4$ represent any of a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group, and a heteroarylamino group; X and Z may combine with each other to form a ring; K and n each represent 0 or 1.

2. The ink for ink jet recording as described in the item 1, wherein the dye is a magenta dye selected from an azo dye, and the magenta dye has an absorption maximum in a spectral region of 500 to 580 nm in the aqueous medium.

3. The ink for ink jet recording as described in the item 2, wherein the azo dye has a chromophore represented by general formula: (heterocycle A)-N=N-(heterocycle B), in which the heterocycle A and the heterocycle B in the above general formula may have the same structure.

4. The ink for ink jet recording as described in the item 2 or 3, wherein the azo dye is an azo dye having an aromatic nitrogen-containing six-membered heterocycle linked directly to at least one side of the azo group as a coupling component.

5. The ink for ink jet recording as described in item 3 or 4, wherein the azo dye is an azo dye having an aromatic amino group- or a heterocyclic amino group-containing structure as an auxochrome.

6. The ink for ink jet recording as described in any of the items 2 to 5, wherein the azo dye is an azo dye having a steric structure.

7. The ink for ink jet recording as described in any of the items 2 to 6, wherein the azo dye is a dye represented by the following general formula (1):

General formula (1)

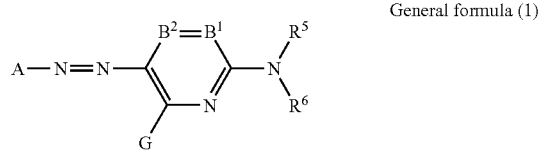

In general formula (1), A represents a five-membered heterocyclic group;

B$^1$ and B$^2$ each represents =CR$^1$— or —CR$^2$=, or either thereof represents a nitrogen atom and the other represents =CR$^1$— or —CR$^2$=; R$^5$ and R$^6$ each independently represent a hydrogen atom or a substituent group, the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and a hydrogen atom(s) on the respective substituent groups may be substituted;

G, R$^1$, and R$^2$ each independently represent a hydrogen atom or a substituent group, the substituent group represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and a hydrogen atom(s) on the respective substituent groups may be substituted;

R$^1$ and R$^5$, or R$^5$ and R$^6$ may be combined to form a five- or six-membered ring.

8. The ink for ink jet recording as described in any of the items 2 to 7, wherein a rate constant of ozone fading of a recorded image is 5.0×10$^{-2}$ [hour$^{-1}$] or less.

9. The ink for ink jet recording as described in the item 1, wherein the dye is a phthalocyanine dye.

10. The ink for ink jet recording as described in the item 9, wherein a residual ratio of dye (density after fading/initial density×100) is 60 percent or more when kept in an ozone atmosphere of 5 ppm for 24 hr, in a monochromatic site printed so that the cyan reflection density in a status A filter is from 0.9 to 1.1 by use of a monochrome of the ink (cyan).

11. The ink for ink jet recording as described in the items 9 or 10, wherein an amount of Cu ion running off into water is 20 percent or less of the total dye after the ink undergoes ozone fading under the condition of the item 10.

12. The ink for ink jet recording as described in any of the items 9 to 11, wherein the phthalocyanine dye is a water-soluble dye having an electron-withdrawing group at a β position of a benzene ring of the phthalocyanine.

13. The ink for ink jet recording as described in any of the items 9 to 12, wherein the phthalocyanine dye is a water-soluble phthalocyanine dye prepared by a process that does not go through a sulfonation of non-substituted phthalocyanine.

14. The ink for ink jet recording as described in any of the items 9 to 13, wherein the phthalocyanine dye is represented by the following general formula (I):

General formula (I)

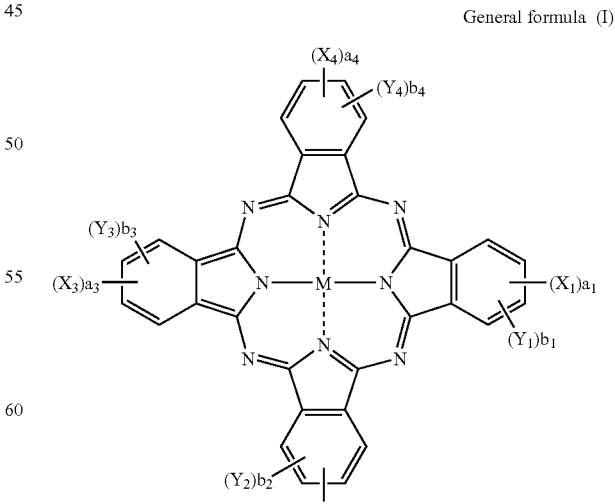

in the above formula (I), $X_1$, $X_2$, $X_3$, and $X_4$ each independently represent —SO-Z, —SO$_2$-Z, —SO$_2$NR1R2, a sulfo group, —CONR1R2, or —CO$_2$R1;

the above Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; the above R1 and R2 each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and when a plurality of Z's exist, the Z's may be the same or different;

$Y_1$, $Y_2$, $Y_3$, and $Y_4$ each independently represent a monovalent substituent group;

when any of $X_1$ to $X_4$ and $Y_1$ to $Y_4$ exists in plurality, they may be the same or different;

$a_1$ to $a_4$ and $b_1$ to $b_4$ represent the number of substituent groups $X_1$ to $X_4$ and $Y_1$ to $Y_4$, respectively, and $a_1$ to $a_4$ each independently represent an integer of 0 to 4, all of them do not represent 0 at the same time, and $b_1$ to $b_4$ each independently represent an integer of zero to four;

M is a hydrogen atom, a metallic atom, or an oxide, a hydroxide or a halide thereof.

15. The ink for ink jet recording as described in the item 14, wherein the dye represented by general formula (I) is a dye represented by the following general formula (II):

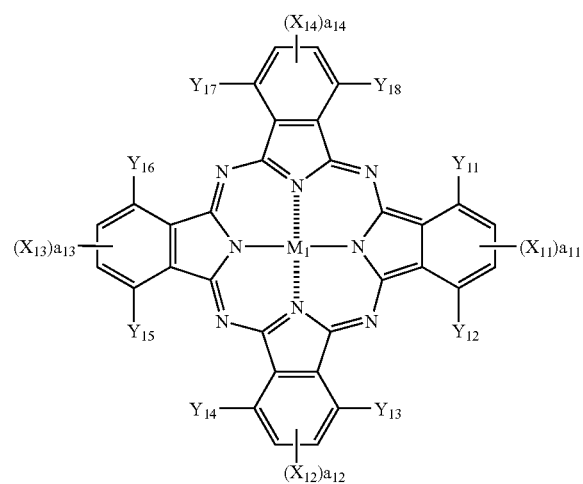

General formula (II)

in the above general formula (II), $X_{11}$ to $X_{14}$, $Y_{11}$ to $Y_{14}$, and M have the same meanings as $X_1$ to $X_4$, $Y_1$ to $Y_4$, and M in general formula (I), respectively;

$a_{11}$ to $a_{14}$ each independently represent an integer of 1 or 2.

16. The ink for ink jet recording as described in any of the items 1 to 15, which comprises an organic solvent having a boiling point of 150° C. or higher.

17. A method of ink jet recording, which comprises using the ink for ink jet recording as described in the items 1 to 16.

18. A method of ink jet recording, which comprises discharging ink droplets according to a recording signal onto an image-receiving material that has an image-receiving layer containing particles of a white inorganic pigment on a support to record an image on the image-receiving material, wherein the ink droplets comprises the ink for ink jet recording as described in the items 1 to 16.

The present invention is hereinafter illustrated in further detail.

The applicant of this patent has intensively studied the ink for ink jet recording and as a result, the characteristics required by dyes are 1) to have a good color hue and cause no change in color hue (solvatochromism), 2) to be excellent in resistance (light, ozone, NO$_x$, solvent, oil, and water), 3) to be safe (causing no Ames, no carcinogenicity, no skin irritation, and easy decomposability), 4) to be a low cost, 5) to have a high ε, 6) to have high solubility, and 7) to have a strong fixing property to media.

Subsequently, the characteristics required by properties of ink and concentrated ink are 1) to be uniform in spite of temperature and aging time, 2) to be soiled with difficulty, 3) to be good in penetration to media, 4) to be uniform in size of droplets discharged, 5) to select no paper, 6) to be easy in preparation of solution, 7) to cause no wrong discharge, foam with difficulty, and allow foam to disappear easily, and 8) to discharge stably.

The characteristics required by image are 1) to be fine without blurring, discoloration, and beading, 2) to have flaw resistance, 3) to be high and uniform in gloss, 4) to be good in keeping quality of image and excellent in fading balance, 5) to be quick in drying, 6) to be printed at a high speed, and 7) to have no dependence on image density in fading ratio.

Specific embodiments of this invention are hereinafter illustrated in detail.

[Magenta Dye]

In order to possess the characteristics at which this invention aims, the recording of image is carried out, as magenta ink, by use of a dye having the characteristics described in the above-described items 1 to 7. Accordingly, these characteristics are illustrated as to the magenta dye.

The magenta ink used as ink for ink jet recording of this invention has a magenta dye selected from an azo dye and dissolved or dispersed in an aqueous medium, and the dye has, as fundamental characteristics, an absorption maximum in the spectral region of 500 to 580 nm in the aqueous medium and an oxidation potential of 1.0 V (vs SCE) or positive.

The first structural characteristic of preferred dyes selected from the azo dye is to have a chromophore represented by general formula (heterocycle A)-N=N-(heterocycle B). In this case, heterocycle A and heterocycle B may have the same structure. Heterocycle A and heterocycle B are specifically five-membered or six-membered heterocycles, which are heterocycles selected from pyrazole, imidazole, triazole, oxazole, thiazole, selenazole, pyridone, pyrazine, pyrimidine, and pyridine. Specific examples are described in JP Application No. 2000-15853, JP Application No. 2001-15614, JP-A-2002-309116, JP Application No. 2001-195014, and the like.

Furthermore, the second preferred structural characteristics of the above-described azo dye are to be an azo dye that has an aromatic nitrogen-containing six-membered heterocycle linked directly to at least one side of the azo group as a coupling component, and specific examples are described in 2001-110457.

The third preferred structural characteristic is that the auxochrome has a structure of an aromatic ring amino group or a heterocyclic ring amino group, specifically an anilino group or a heterylamino group.

The fourth preferred structural characteristic is to have a steric structure. Specific examples are described in JP Application No. 2002-12015.

Of the preferred structural characteristics of the azo dye as described above, the most preferred dyes to achieve the object of this invention are dyes represented by the following general formula (1).

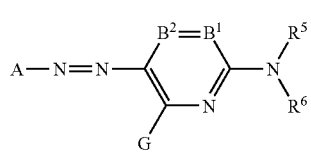

General formula (1)

In general formula (1), A represents a five-membered heterocyclic group.

$B^1$ and $B^2$ represent $=CR^1-$ and $-CR^2=$, respectively, or either thereof represents a nitrogen atom and the other represents $=CR^1-$ or $-CR^2=$. $R^5$ and $R^6$ each independently represent a hydrogen atom or a substituent group, the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and hydrogen atoms on the respective substituent groups may be replaced.

G, $R^1$, and $R^2$ each independently represent a hydrogen atom or a substituent group, the substituent group represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arysulfinyl group, a heterocyclic sulfinyl group, a sulfamoyl group, or a sulfo group, and hydrogen atoms on the respective substituent groups may be replaced.

$R^1$ and $R^5$ or $R^5$ and $R^6$ may combine to form a five or six-membered ring.

The dyes of general formula (1) are illustrated in further detail.

In general formula (1), A represents a five-membered heterocyclic group, and examples of the heteroatoms of the heterocycle include N, O, and S. A is preferably a nitrogen-containing five-membered heterocycle and the heterocycle may be further condensed with an aliphatic ring, an aromatic ring, or an other heterocycle. Examples of preferred heterocycle A include a pyrazole ring, an imidazole ring, a thiazole ring, an isothiazole ring, a thiadiazole ring, a benzothiazole ring, a benzoxazole ring, and a benzisothiazole ring. The respective heterocyclic rings may have a further substituent group. Of these, the pyrazole ring, the imidazole ring, the isothiazole ring, the thiadiazole ring, the benzothiazole ring represented by the following general formulas (a) and (f) are preferred.

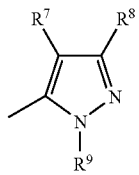

General formula (a)

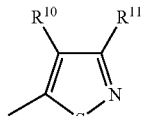

(b)

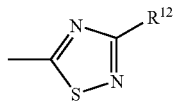

(c)

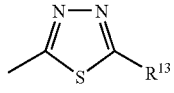

(d)

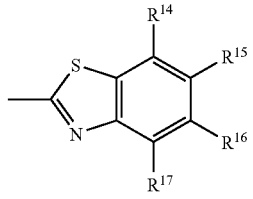

(e)

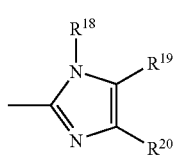

(f)

In the above-described general formulas (a) to (f), $R^7$ to $R^{20}$ represent the same substituent groups as G, $R^1$, and $R^2$ in general formula (1).

Of general formulas (a) to (f), the pyrazole ring and the isothiazole ring represented by general formulas (a) and (b) are preferred, and the pyrazole ring represented by general formula (a) is most preferred.

In general formula (1), $B^1$ and $B^2$ represent $=CR^1-$ and $-CR^2=$, respectively, or either thereof represents a nitrogen atom and the other represents $=CR^1-$ or $-CR^2=$, but those representing $=CR^1-$ and $-CR^2=$, respectively, are more preferred.

$R^5$ and $R^6$ each independently represent a hydrogen atom or a substituent group, the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and hydrogen atoms on the respective substituent groups may be replaced.

$R^5$ and $R^6$ preferably include the hydrogen atom, the aliphatic group, the aromatic group, the heterocyclic group, the acyl group, or the alkylsulfonyl or arylsulfonyl group. $R^5$ and $R^6$ are further preferably the hydrogen atom, the aromatic group, the heterocyclic group, the acyl group, or the alkylsulfonyl or arylsulfonyl group. $R^5$ and $R^3$ are most preferably the hydrogen atom, the aryl group, or the heterocyclic group. Hydrogen atoms on the respective substituent groups may be replaced. However, $R^5$ and $R^6$ can not be hydrogen atoms at the same time.

G, $R^1$, and $R^2$ each independently represent a hydrogen atom or a substituent group, the substituent group represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and hydrogen atoms on the respective substituent groups may be replaced.

G is preferably the hydrogen atom, the halogen atom, the aliphatic group, the aromatic group, the hydroxy group, the alkoxy group, the aryloxy group, the acyloxy group, the heterocyclic oxy group, the amino group, the acylamino group, the ureido group, the sulfamoylamino group, the alkoxycarbonylamino group, the aryloxycarbonylamino group, the alkylthio or arylthio group, or the heterocyclic thio group; further preferably the hydrogen atom, the halogen atom, the alkyl group, the hydroxy group, the alkoxy group, the aryloxy group, the acyloxy group, the amino group, or the acylamino group; and of these, most preferably the hydrogen atom, the amino group (preferably anilino group), and the acylamino group. Hydrogen atoms on the respective substituent groups may be replaced.

$R^1$ and $R^2$ preferably include a hydrogen atom, an alkyl group, a halogen atom, an alkoxycarbonyl group, a carboxyl group, a carbamoyl group, a hydroxy group, an alkoxy group, and a cyano group. Hydrogen atoms on the respective substituent groups may be replaced.

$R^1$ and $R^5$ or $R^5$ and $R^6$ may combine to form a five or six-membered ring.

When A has a substituent group or when substituent groups on $R^1$, $R^2$, $R^5$, $R^6$, or G have further substituent groups, the substituent groups can include those included in the above-described G, $R^1$, and $R^2$.

When the dyes of this invention are water-soluble dyes, it is preferable that the dyes have an ionic hydrophilic group at any position on A, $R^1$, $R^2$, $R^5$, $R^6$, and G as a substituent group. The ionic hydrophilic group used as the substituent group includes a sulfo group, a carboxyl group, a phosphono group, a quaternary ammonium group, and the like. As the above-described ionic hydrophilic group, the carboxyl group, the phosphono group, and the sulfo group are preferred, and the carboxyl group and the sulfo group are particularly preferred. The carboxyl group, the phosphono group, and the sulfo group may be in the form of salts, and examples of counter ions to form the salts include an ammonium ion, an alkali metal ion (e.g., lithium ion, sodium ion, and potassium ion), and an organic cation (e.g., tetramethylammonium ion, tetramethylguanidinium ion, and tetramethylphosphonium).

Terms (substituent groups) used in the present description are illustrated. These terms are common even among different signs in general formula (1) and general formula (1a) shown later.

The halogen atom includes a fluorine atom, a chlorine atom, and a bromine atom.

The aliphatic group means an alkyl group, a substituted alkyl group, an alkenyl group, a substituted alkenyl group, an alkynyl group, a substituted alkynyl group, an aralkyl group, and a substituted aralkyl group. In the present description, "substituted" used in "substituted alkyl group" and the like shows that a hydrogen atom existing on an "alkyl group" is replaced by a substituent group included in the above-described G, $R^1$, or $R^2$.

The aliphatic group may have a branch or may form a ring. The carbon number of the aliphatic group is preferably from one to 20, and further preferably from one to 16. The aryl moieties of the aralkyl group and the substituted aralkyl group are preferably a phenyl group or a naphthyl group and particularly preferably the phenyl group. Examples of the aliphatic groups include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenetyl group, a vinyl group, and an allyl group.

The aromatic group means an aryl group and a substituted aryl group. The aryl group is preferably a phenyl group or a naphthyl group and particularly preferably the phenyl group. The carbon number of the aromatic group is preferably from six to 20 and further preferably from six to 16.

Examples of the aromatic groups include a phenyl group, a p-tolyl group, a p-methoxyphenyl group, an o-chlorophenyl group, and a m-(3-sulfopropylamino)phenyl group.

The heterocyclic group includes a substituted heterocyclic group. The heterocyclic group may be condensed with an aliphatic ring, an aromatic ring, or another heterocycle. The above-described heterocyclic group is preferably a five or six-membered heterocyclic group. Examples of the above-described substituent groups include an aliphatic group, a halogen atom, an alkylsulfonyl group, an arylsulfonyl group, an acyl group, an acylamino group, a sulfamoyl group, a carbamoyl group, an ionic hydrophilic group, and the like. Examples of the above-described heterocyclic group include a 2-pyridyl group, a 2-thienyl group, a 2-thiazolyl group, a 2-benzothiazolyl group, a 2-benzoxazolyl group, and a 2-furfuryl group.

The carbamoyl group includes a substituted carbamoyl group. An example of the above-described substituent group is an alkyl group. Examples of the above-described carbamoyl group include a methylcarbamoyl group and a dimethylcarbamoyl group.

The alkoxycarbonyl group includes a substituted alkoxycarbonyl group. Alkoxycarbonyl groups having a carbon number of two to 20 are preferred as the above-described alkoxycarbonyl groups. An example of the above-described substituent group is an ionic hydrophilic group. Examples of the above-described alkoxycarbonyl groups include a methoxycarbonyl group and an ethoxycarbonyl group.

The aryloxycarbonyl group includes a substituted aryloxycarbonyl group. Aryloxycarbonyl groups having a carbon number of seven to 20 are preferred as the above-described aryloxycarbonyl groups. An example of the above-described substituent group is an ionic hydrophilic group. An example of the above-described aryloxycarbonyl groups is a phenoxycarbonyl group.

The heterocyclic oxycarbonyl group includes a substituted heterocyclic oxycarbonyl group. The heterocycle includes heterocycles described above as the heterocyclic groups. Heterocyclic oxycarbonyl groups having a carbon number of two to 20 are preferred as the above-described heterocyclic oxycarbonyl groups. An example of the above-described substituent group is an ionic hydrophilic group. An example of the above-described heterocyclic oxycarbonyl group is a 2-pyridyloxycarbonyl group.

The acyl group includes a substituted acyl group. Acyl groups having a carbon number of one to 20 are preferred as the above-described acyl groups. An example of the above-described substituent group is an ionic hydrophilic group. Examples of the above-described acyl groups include an acetyl group and a benzoyl group.

The alkoxy group includes a substituted alkoxy group. Alkoxy groups having a carbon number of one to 20 are preferred as the above-described alkoxy groups. Examples of the above-described substituent group include an alkoxy group, a hydroxyl group, and an ionic hydrophilic group. Examples of the above-described alkoxy groups include a methoxy group, an ethoxy group, an isopropoxy group, a methoxyethoxy group, a hydroxyethoxy group, and a 3-carboxypropoxy group.

The aryloxy group includes a substituted aryloxy group. Aryloxy groups having a carbon number of six to 20 are preferred as the above-described aryloxy groups. Examples of the above-described substituent group include an alkoxy group and an ionic hydrophilic group. Examples of the above-described aryloxy groups include a phenoxy group, a p-methoxyphenoxy group, and an o-methoxyphenoxy group.

The heterocyclic oxy group includes a substituted heterocyclic oxy group. The heterocycle includes heterocycles described above as the heterocyclic groups. Heterocyclic oxy groups having a carbon number of two to 20 are preferred as the above-described heterocyclic oxy groups. Examples of the above-described substituent group include an alkyl group, an alkoxy group, and an ionic hydrophilic group. Examples of the above-described heterocyclic oxy groups include a 3-pyridyloxy group and a 3-thienyloxy group.

Silyloxy groups substituted by aliphatic groups having a carbon number of one to 20 or aromatic groups are preferred as the silyloxy groups. Examples of the above-described silyloxy groups include trimethylsilyloxy and diphenylmethylsilyloxy.

The acyloxy group includes a substituted acyloxy group. Acyloxy groups having a carbon number of one to 20 are preferred as the above-described acyloxy groups. An example of the above-described substituent group is an ionic hydrophilic group. Examples of the above-described acyloxy groups include an acetoxy group and a benzoyloxy group.

The carbamoyloxy group includes a substituted carbamoyloxy group. An example of the above-described substituent group is an alkyl group. An example of the above-described carbamoyloxy group is an N-methylcarbamoyloxy group.

The alkoxycarbonyloxy group includes a substituted alkoxycarbonyloxy group. Alkoxycarbonyloxy groups having a carbon number of two to 20 are preferred as the above-described alkoxycarbonyloxy groups. Examples of the above-described alkoxycarbonyloxy groups include a methoxycarbonyloxy group and an isopropoxycarbonyloxy group.

The aryloxycarbonyloxy group includes a substituted aryloxycarbonyloxy group. Aryloxycarbonyloxy groups having a carbon number of seven to 20 are preferred as the above-described aryloxycarbonyloxy groups. An example of the above-described aryloxycarbonyloxy groups is a phenoxycarbonyloxy group.

The amino group includes a substituted amino group. The substituent group includes an alkyl group, an aryl group, and a heterocyclic group, and the alkyl group, the aryl group, and the heterocyclic group may further have a substituent group. The alkylamino group includes a substituted alkylamino group. Alkylamino groups having a carbon number of one to 20 are preferred as the alkylamino groups. An example of the above-described substituent group is an ionic hydrophilic group. Examples of the above-described alkylamino groups include a methylamino group and a diethylamino group.

The arylamino group includes a substituted arylamino group. Arylamino groups having a carbon number of six to 20 are preferred as the above-described arylamino group. Examples of the above-described substituent group include a halogen atom and an ionic hydrophilic group. Examples of the above-described arylamino groups include a phenylamino group and a 2-chlorophenylamino group.

The heterocyclic amino group includes a substituted heterocyclic amino group. The heterocycle includes heterocycles described above as the heterocyclic groups. Heterocyclic amino groups having a carbon number of two to 20 are preferred as the above-described heterocyclic amino groups. Examples of the substituent group include an alkyl group, a halogen atom, and an ionic hydrophilic group.

The acylamino group includes a substituted acylamino group. Acylamino groups having a carbon number of two to 20 are preferred as the above-described acylamino groups. An example of the above-described substituent group is an ionic hydrophilic group. Examples of the above-described acylamino groups include an acetylamino group, a propionylamino group, a benzoylamino group, an N-phenylacetylamino group, and a 3,5-disulfobenzoylamino group.

The ureido group includes a substituted ureido group. Ureido groups having a carbon number of one to 20 are preferred as the above-described ureido groups. Examples of the above-described substituent group include an alkyl group and an aryl group. Examples of the above-described ureido groups include a 3-methylureido group, a 3,3-dimethylureido group, and a 3-phenylureido group.

The sulfamoylamino group includes a substituted sulfamoylamino group. An example of the above-described substituent group is an alkyl group. An example of the above-described sulfamoylamino group is an N,N-dipropylsulfamoylamino group.

The alkoxycarbonylamino group includes a substituted alkoxycarbonylamino group. Alkoxycarbonylamino groups having a carbon number of two to 20 are preferred as the above-described alkoxycarbonylamino groups. An example of the above-described substituent group is an ionic hydrophilic group. An example of the above-described alkoxycarbonylamino group is an ethoxycarbonylamino group.

The aryloxycarbonylamino group includes a substituted aryloxycarbonylamino group. Aryloxycarbonylamino groups having a carbon number of seven to 20 are preferred as the above-described aryloxycarbonylamino groups. An example of the above-described substituent group is an ionic hydrophilic group. An example of the above-described aryloxycarbonylamino group is a phenoxycarbonylamino group.

The alkylsulfonylamino group and the arylsulfonylamino group include a substituted alkylsulfonylamino group and a substituted arylsulfonylamino group, respectively. Alkylsulfonylamino groups and arylsulfonylamino groups having a carbon number of one to 20 are preferred as the above-described alkylsulfonylamino groups and arylsulfonylamino groups, respectively. An example of the above-described substituent groups is an ionic hydrophilic group. Examples of the above-described alkylsulfonylamino groups and arylsulfonylamino groups include a methylsulfonylamino group, an N-phenyl-methylsulfonylamino group, a phenylsulfonylamino group, and a 3-carboxyphenylsulfonylamino group.

The heterocyclic sulfonylamino group includes a substituted heterocyclic sulfonylamino group. The heterocycle includes heterocycles described above as the heterocyclic groups. Heterocyclic sulfonylamino groups having a carbon number of one to 12 are preferred as the above-described heterocyclic sulfonylamino groups. An example of the above-described substituent group is an ionic hydrophilic group. Examples of the above-described heterocyclic sulfonylamino groups include a 2-thienylsulfonylamino group and a 3-pyridylsulfonylamino group.

The alkylthio group, the arylthio group, the heterocyclic thio group include a substituted alkylthio group, a substituted arylthio group, and a substituted heterocyclic thio group, respectively. The heterocycle includes heterocycles described above as the heterocyclic groups. The above-described alkylthio group, arylthio group, and heterocyclic thio group are preferably those having a carbon number of one to 20, respectively. An example of the above-described substituent groups is an ionic hydrophilic group. Examples of the above-described alkylthio groups, arylthio groups, and heterocyclic thio groups include a methylthio group, a phenylthio group, and a 2-pyridylthio group.

The alkylsulfonyl group and the arylsulfonyl group include a substituted alkylsulfonyl group and a substituted arylsulfonyl group, respectively. Examples of the alkylsulfonyl group and the arylsulfonyl group include a methylsulfonyl group and a phenylsulfonyl group, respectively.

The heterocyclic sulfonyl group includes a substituted heterocyclic sulfonyl group. The heterocycle include heterocycles described above as the heterocyclic groups. Heterocyclic sulfonyl groups having a carbon number of one to 20 are preferred as the above-described heterocyclic sulfonyl group. An example of the above-described substituent group is an ionic hydrophilic group. Examples of the above-described heterocyclic sulfonyl groups include a 2-thienylsulfonyl group and a 3-pyridylsulfonyl group.

The alkylsulfinyl group and the arylsulfinyl group include a substituted alkylsulfinyl group and a substituted arylsulfinyl group, respectively. Examples of the alkylsulfinyl group and the arylsulfinyl group include a methylsulfinyl group and a phenylsulfinyl group, respectively.

The heterocyclic sulfinyl group includes a substituted heterocyclic sulfinyl group. The heterocycle include heterocycles described above as the heterocyclic groups. Heterocyclic sulfinyl groups having a carbon number of one to 20 are preferred as the above-described heterocyclic sulfinyl group. An example of the above-described substituent group is an ionic hydrophilic group. An example of the above-described heterocyclic sulfinyl group is a 4-pyridylsulfinyl group.

The sulfamoyl group includes a substituted sulfamoyl group. An example of the above-described substituent group is an alkyl group. Examples of the above-described sulfamoyl group include a dimethylsulfamoyl group and a di(2-hydroxyethyl)sulfamoyl group.

Of general formula (1), a particularly preferred structure is that represented by the following general formula (1a).

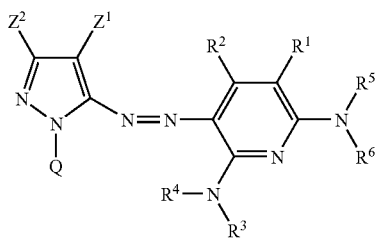

General formula (1a)

In the formula, $R^1$, $R^2$, $R^5$, and $R^6$ have the same meanings as in general formula (1).

$R^3$ and $R^4$ each independently represent a hydrogen atom or a substituent group and the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Of these, the hydrogen atom, the aromatic group, the heterocyclic group, the acyl group, the alkylsulfonyl group and the arylsulfonyl group are preferred and the hydrogen atom, the aromatic group, and the heterocyclic group are particularly preferred.

$Z^1$ represents an electron-withdrawing group having a Hammett's substituent constant $\sigma_p$ value of 0.20 or higher. $Z^1$ is preferably an electron-withdrawing group having a $\sigma_p$ value of 0.30 or higher, further preferably an electron-withdrawing group having a $\sigma_p$ value of 0.45 or higher, and particularly preferably an electron-withdrawing group having a $\sigma_p$ value of 0.60 or higher, but it is desirable that no $\sigma_p$ value exceeds 1.0. Although specific preferred substituent groups include electron-withdrawing substituent groups as shown later, particularly preferred substituent groups include acyl groups having a carbon number of two to 20, alkyloxycarbonyl groups having a carbon number of two to 20, a nitro group, a cyano group, alkylsulfonyl groups having a carbon number of one to 20, arylsulfonyl groups having a carbon number of six to 20, carbamoyl groups having a carbon number of one to 20, and halogenated alkyl groups having a carbon number of one to 20. The cyano group, the alkylsulfonyl groups having a carbon number of one to 20, and the arylsulfonyl groups having a carbon number of six to 20 are particularly preferred and the cyano group is most preferred.

$Z^2$ represents a hydrogen atom or a substituent group and the substituent group represents an aliphatic group, an aromatic group, or a heterocyclic group. $Z^2$ is preferably the aliphatic group and further preferably an alkyl group having a carbon number of one to six.

Q represents a hydrogen atom or a substituent group and the substituent group represents an aliphatic group, an aromatic group, or a heterocyclic group. Of these, Q is preferably a group comprising non-metallic atoms necessary to form five to eight-membered rings. The above-described five to eight-membered rings may be substituted, may be saturated rings or may have unsaturated bonds. Of these, the aromatic group and the heterocyclic group are particularly preferred. The non-metallic atoms include preferably a nitrogen atom, an oxygen atom, a sulfur atom, and a carbon atom. Specific examples of such ring structures include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring, a thiane ring, and the like.

Hydrogen atoms on the respective substituent groups as described in general formula (1a) may be replaced. The substituent group includes the substituent groups described in general formula (1) and the groups and ionic hydrophilic groups that exemplify G, $R^1$, and $R^2$.

The Hammett's substituent constant $\sigma_p$ value used in this description is hereinafter illustrated. The Hammett's rule is an empirical rule proposed by L. P. Hammett in 1935 in order to discuss quantitatively the effect of substituent groups on reaction or equilibrium of benzene derivatives, and the appropriateness thereof has been extensively admitted now. For the substituent constants searched for the Hammett's rule, there are a $\sigma_p$ value and a $\sigma_m$ value and these values can be seen in many monographs, which are, for example, described in detail in "Lange's Handbook of Chemistry", 12th edition, edited by J. A. Dean, 1979 (Mc Graw-Hill) and "Kagaku-no-ryoiki" Special Number 122, pages 96 to 103, 1979 (Nankodo). Although the respective substituent groups are limited or described by Hammett's substituent constant $\sigma_p$ values in this invention, this does not mean, however, that values found in the above-described monographs and known in literature are limited only to particular substituent groups. It is a matter of course that even if the value of a substituent group is unknown in literature, the substituent group that will be involved in the range measured also is involved when the value is measured based on the Hammett's rule. Furthermore, although structures that do not belong to benzene derivatives also are included in general formula (1a) of this invention, the $\sigma_p$ values are used as a measure showing the electron effect of substituent groups regardless of positions of substitution. In this invention, the $\sigma_p$ values are used in this sense.

Examples of electron-withdrawing groups having Hammett's substituent constant $\sigma_p$ values of 0.60 or higher include a cyano group, a nitro group, an alkylsulfonyl group (e.g., methylsulfonyl group), and an arylsulfonyl group (e.g., phenylsulfonyl group).

Examples of electron-withdrawing groups having Hammett's substituent constant $\sigma_p$ values of 0.45 or higher include, in addition to the above-described groups, an acyl group (e.g., acetyl group), an alkoxycarbonyl group (e.g., dodecyloxycarbonyl group), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl), and a halogenated alkyl group (e.g., trifluoromethyl).

Examples of electron-withdrawing groups having Hammett's substituent constant $\sigma_p$ values of 0.30 or higher include, in addition to the above-described groups, an acyloxy group (e.g., acetoxy), a carbamoyl group (e.g., N-ethylcarbamoyl), N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), aryl groups substituted by two or more electron-withdrawing groups having σ values of 0.15 or higher (e.g., 2,4-dinitrophenyl, pentachlorophenyl), and a heterocycle (e.g., 2-benzoxazolyl, 2-benzothiazolyl, 1-phenyl-2-benzimidazolyl).

Specific examples of electron-withdrawing groups having $\sigma_p$ values of 0.20 or higher include halogen atoms in addition to the above-described groups.

About the combination of substituent groups particularly preferred for azo dyes represented by the above-described general formula (1), $R^5$ and $R^6$ are preferably a hydrogen atom, an alkyl group, an aryl group, a heterocyclic group, a sulfonyl group, and an acyl group, further preferably the hydrogen atom, the aryl group, the heterocyclic group, and the sulfonyl group, and most preferably the hydrogen atom, the aryl group, and the heterocyclic group. However, $R^5$ and $R^6$ can not be hydrogen atoms at the same time.

G is preferably a hydrogen atom, a halogen atom, an alkyl group, a hydroxyl group, an amino group, and an acylamino group, more preferably the hydrogen atom, the halogen atom, the amino group, the acylamino group, and most preferably the hydrogen atom, the amino group, and the acylamino group.

A is preferably a pyrazole ring, an imidazole ring, an isothiazole ring, a thiadiazole ring, and a benzothiazole ring, further preferably the pyrazole ring and the isothiazole ring, and most preferably the pyrazole ring.

$B^1$ and $B^2$ each is $=CR^1—$ and $—CR^2=$, and $R^1$ and $R^2$ each are preferably a hydrogen atom, an alkyl group, a halogen atom, a cyano group, a carbamoyl group, a carboxyl group, a hydroxyl group, an alkoxy group, and an alkoxycarbonyl group and more preferably the hydrogen atom, the alkyl group, the carboxyl group, the cyano group, and the carbamoyl group.

About preferred combinations of substituent groups on compounds represented by the above-described general formula (1), a compound in which at least one of various substituent groups thereon is a preferred group as described above is preferred, a compound in which more of various substituent groups thereon are preferred groups as described above is more preferred, and a compound in which all of various substituent groups thereon are the preferred groups as described above is most preferred.

Although specific examples of azo dyes represented by the above-described general formula (1) are shown in the following table 1 to table 13, the azo dyes used in this invention are not limited by the examples as shown below.

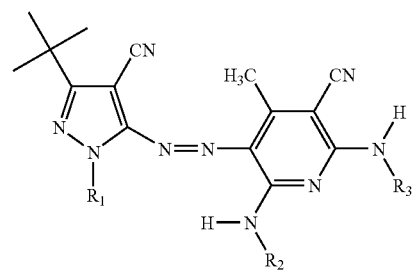

| Dye | $R_1$ | $R_2$ | $R_3$ |
|---|---|---|---|
| a-1 | ![benzothiazolyl] | ![phenyl-C8H17] —C$_8$H$_{17}$ | ![phenyl-C8H17] —C$_8$H$_{17}$ |

-continued

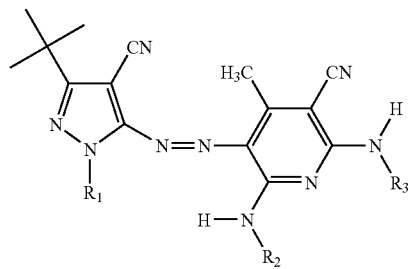

| Dye | $R_1$ | $R_2$ | $R_3$ |
|---|---|---|---|
| a-2 | 2-methyl-5-chlorobenzothiazolyl | 4-C$_8$H$_{17}$-phenyl | 2,3,5-trimethylphenyl |
| a-3 | 2-methyl-6-chlorobenzothiazolyl | 2,3,5-trimethylphenyl | 4-C$_8$H$_{17}$-phenyl |
| a-4 | 2-methylbenzothiazolyl | 2-methyl-6-OC$_8$H$_{17}$-phenyl | 4-C$_8$H$_{17}$-phenyl |
| a-5 | 2-methyl-5-nitrobenzothiazolyl | 2,4-dimethylphenyl | 2,4-dimethylphenyl |

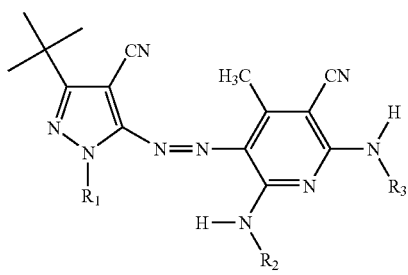

| Dye | $R_1$ | $R_2$ | $R_3$ |
|---|---|---|---|
| a-6 | 2-methylbenzothiazol-6-yl-SO$_2$NH-(CH$_2$)$_3$O-(2,4-di-tert-pentylphenyl) | 4-methylphenyl | 4-methylphenyl |

-continued

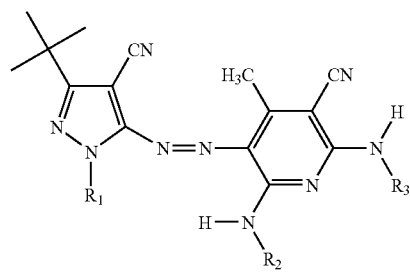

| Dye | R₁ | R₂ | R₃ |
|---|---|---|---|
| a-7 | 2-methylbenzothiazol-6-yl-SO₂NH−(CH₂)₃−OCH₂CH(C₈H₁₇)(C₆H₁₃) | 2,3,5-trimethylphenyl | 4-methylphenyl |
| a-8 | 2-methylbenzothiazol-6-yl-NHCOCH(Et)−O−(2,4-di-tert-amylphenyl) | 4-C₈H₁₇-phenyl | 4-C₈H₁₇-phenyl |
| a-9 | 2-methylbenzothiazol-6-yl-NHSO₂−(2-(n)C₈H₁₇O, 5-C₈H₁₇(t))phenyl | 2,3,5-trimethylphenyl | 4-C₈H₁₇(t)-phenyl |
| a-10 | 2-methyl-5-chloro-benzothiazol-6-yl | 2-methyl-(OC₁₂H₂₅)phenyl | 2-methyl-(OC₁₂H₂₅)phenyl |

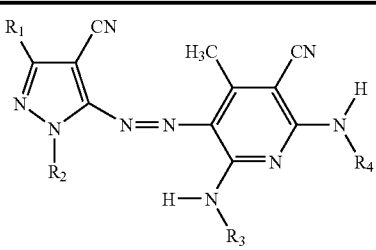

| Dye | R₁ | R₂ | R₃ | R₄ |
|---|---|---|---|---|
| a-11 | tert-butyl | 2-methylbenzothiazol-6-yl-SO₂Na | 4-methylphenyl | 4-SO₃Na-phenyl |

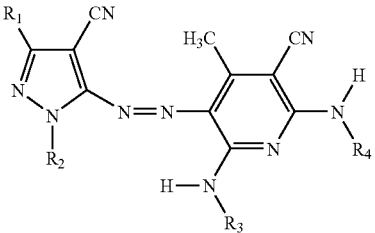

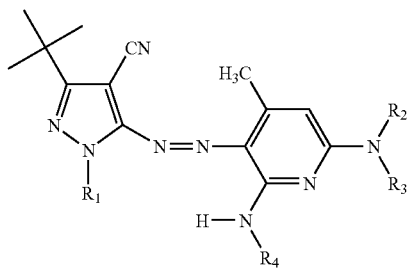

| Dye | R₁ | R₂ | R₃ | R₄ |
|---|---|---|---|---|
| a-18 | 2-benzothiazolyl | 2-benzothiazolyl | 2,3,5-trimethylphenyl | 2,4,6-trimethylphenyl |
| a-19 | 5-chloro-2-benzothiazolyl | —SO₂CH₃ | 2,3,5-trimethylphenyl | 4-methylphenyl |
| a-20 | 2-benzothiazolyl | —COCH₃ | $C_8H_{17}(t)$ | $C_8H_{17}(t)$ |
| a-21 | 6-chloro-2-benzothiazolyl | —SO₂CH₃ | 2,4-dimethylphenyl | $C_8H_{17}(t)$ |
| a-22 | 2-benzothiazolyl | H | 2,3,5-trimethylphenyl | 2,4,6-trimethylphenyl |
| a-23 | 2-benzothiazolyl | H | 2-methylphenyl | 2-methylphenyl |
| a-24 | 2-benzothiazolyl | H | 2,3-dimethylphenyl | 2,3-dimethylphenyl |

-continued
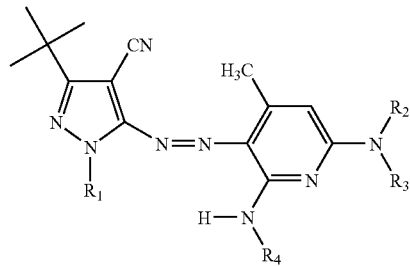
| Dye | R₁ | R₂ | R₃ | R₄ |
|---|---|---|---|---|
| a-25 | 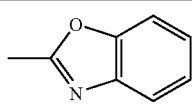 | 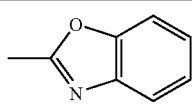 | 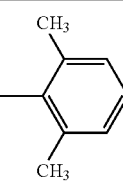 | 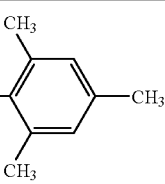 |
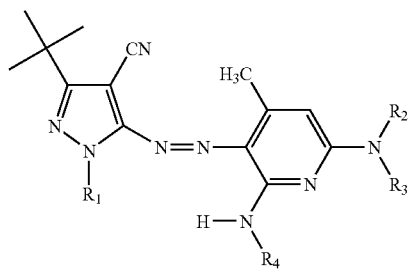
| Dye | R₁ | R₂ |
|---|---|---|
| a-26 | 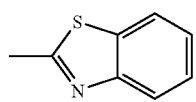 | 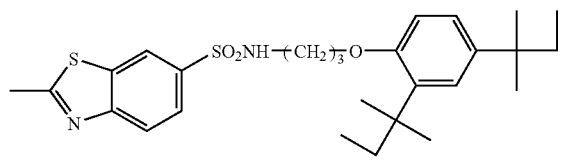 |
| a-27 | 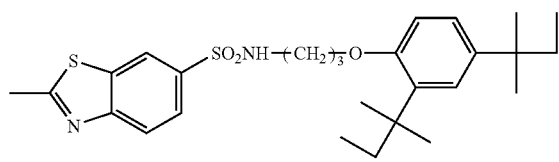 | 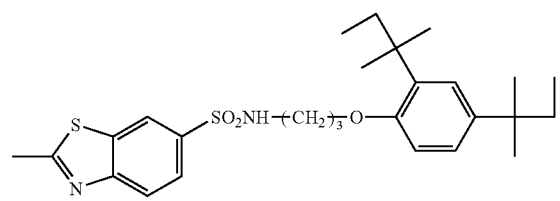 |
| a-28 | 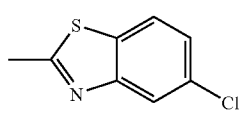 | 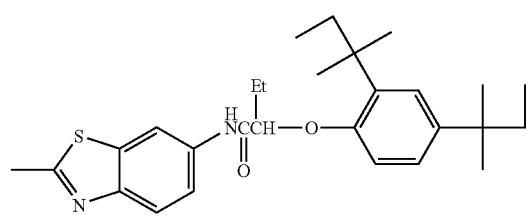 |
| a-29 | 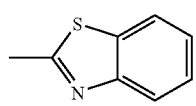 | 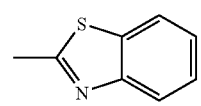 |

-continued
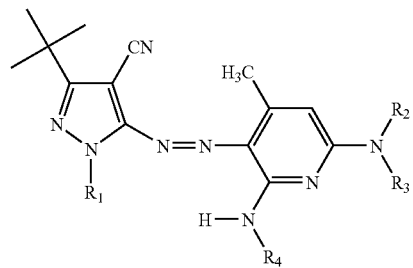
| Dye | R₃ | R₄ |
|---|---|---|
| a-30 | 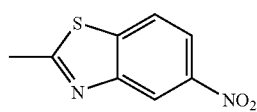 | 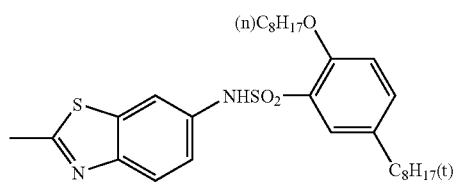 |
| a-31 | 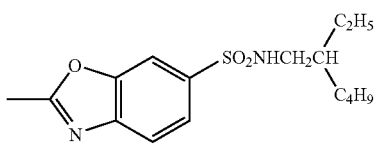 | |
| Dye | R₃ | R₄ |
|---|---|---|
| a-26 | 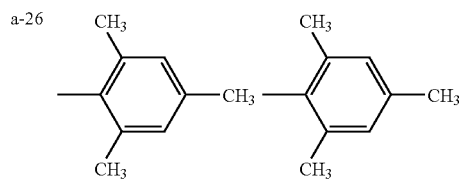 | |
| a-27 | 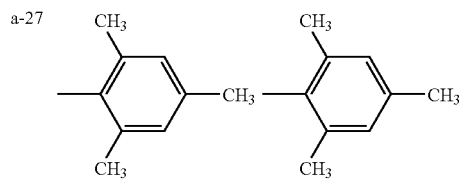 | |
| a-28 | 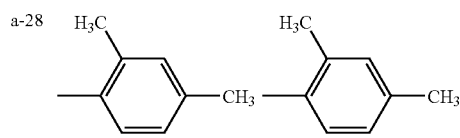 | |
| a-29 | 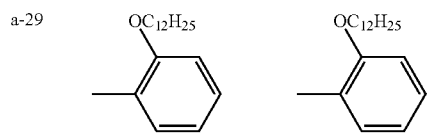 | |
| a-30 | 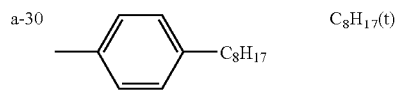 | |
| a-31 | 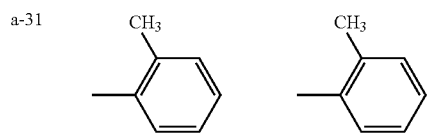 | |

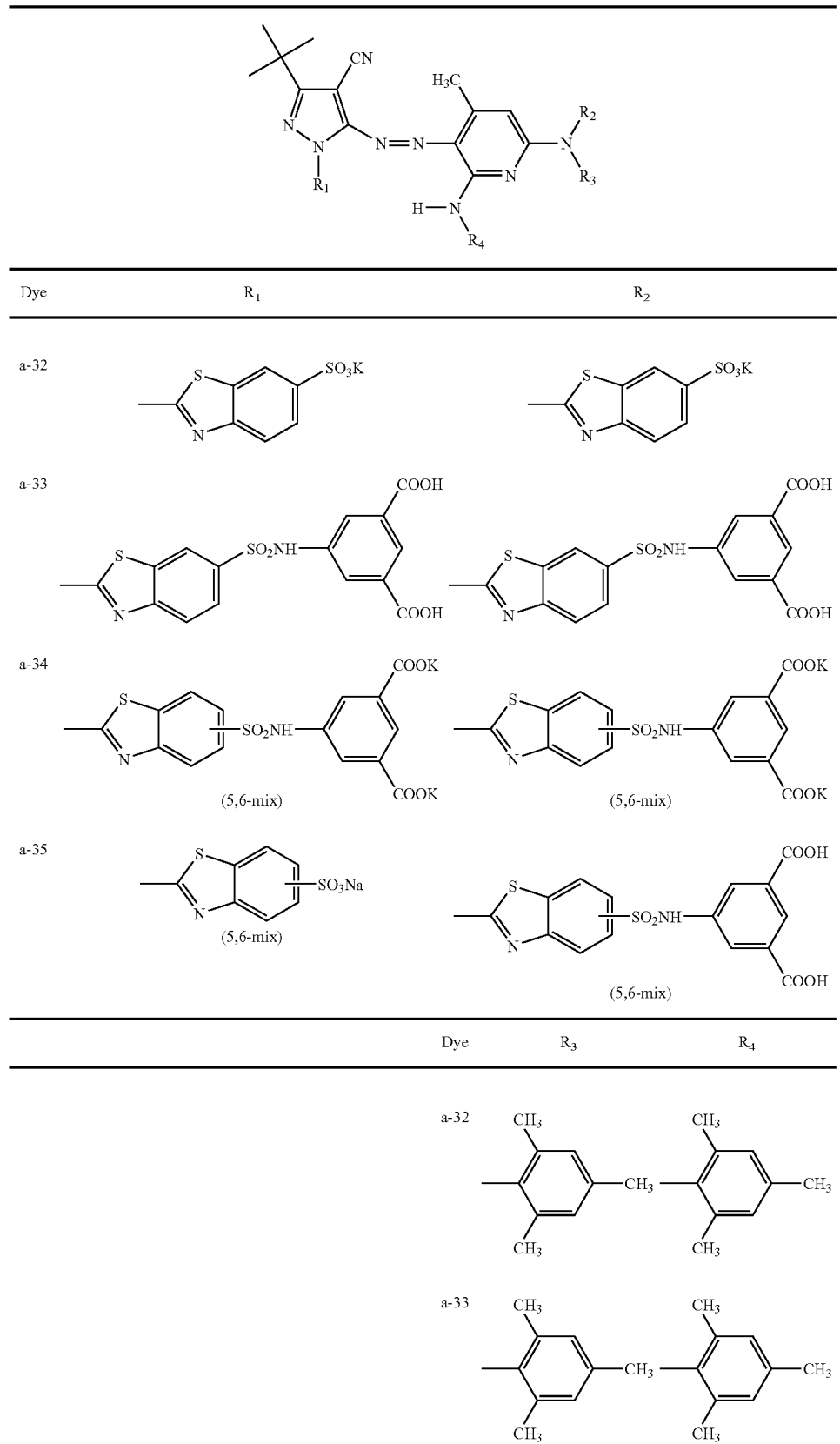

-continued
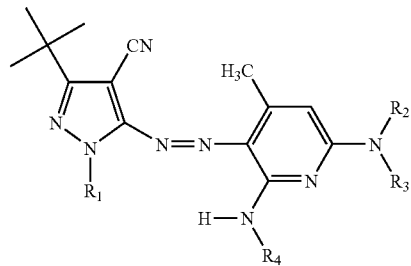
| | a-34 | |
|---|---|---|
| | 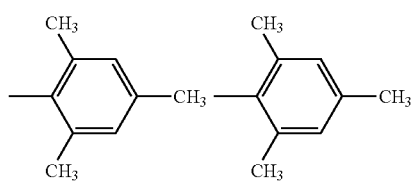 | |
| | a-35 | |
|---|---|---|
| | 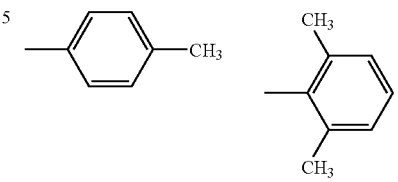 | |
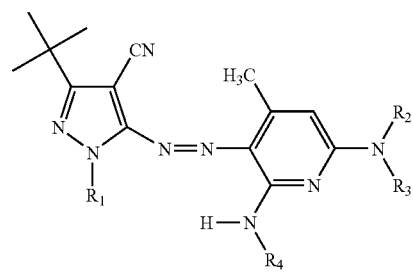
| Dye | R₁ | R₂ |
|---|---|---|
| a-36 |  | |
| a-37 | 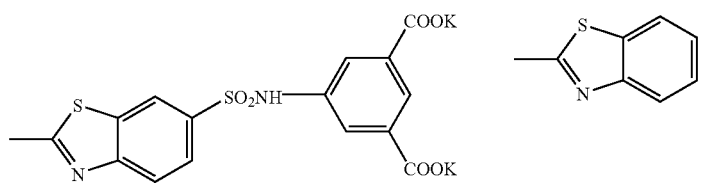 | |
| a-38 |  | |
| a-39 | 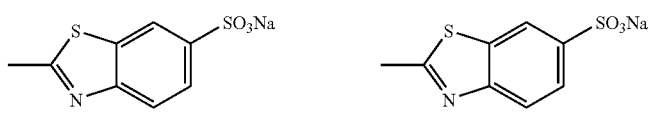 | |

-continued
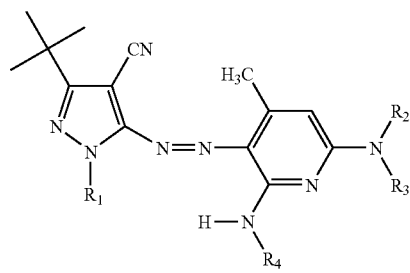
| Dye | R₃ | R₄ |
|---|---|---|
| a-40 | 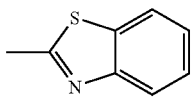 | 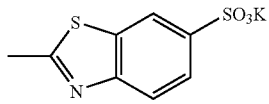 |
| a-36 | 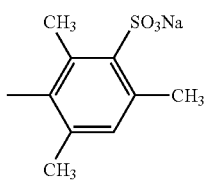 | 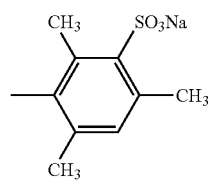 |
| a-37 | 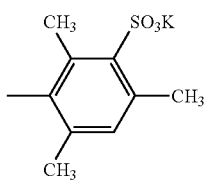 | 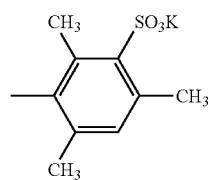 |
| a-38 | 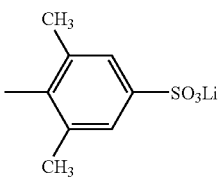 | 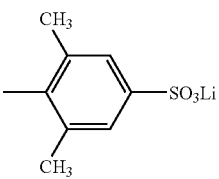 |
| a-39 | 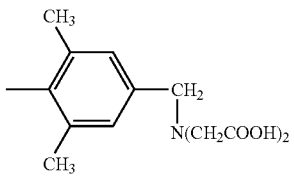 | 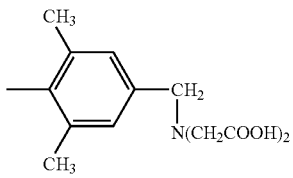 |
| a-40 | 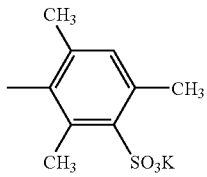 | 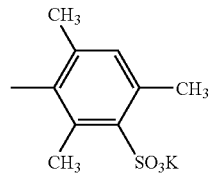 |

| Dye | R₁ | R₂ | R₃ | R₄ | R₅ | R₆ |
|---|---|---|---|---|---|---|
| a-41 | CH₃ | CN | 2-methylpyridin-yl | H | CONH₂ | SO₂CH₃ |
| a-42 | t-Bu | Br | pyrimidin-2-yl | COOEt | H | benzothiazol-2-yl |
| a-43 | pyridin-2-yl | SO₂CH₃ | 4,6-bis(NHCH₃)-1,3,5-triazin-2-yl | CONH₂ | H | 6-chloro-benzothiazol-2-yl |
| a-44 | t-Bu | CN | 2,4,5-tricyanophenyl | H | H | 5-chloro-benzothiazol-2-yl |
| a-45 | t-Bu | Br | 2,6-dichloro-4-nitrophenyl | H | CONH₂ | COCH₃ |
| a-46 | t-Bu | CN | benzothiazol-2-yl | CH₃ | H | benzothiazol-2-yl |

| Dye | R₇ | R₈ |
|---|---|---|
| a-41 | 2-methyl-6-octyloxyphenyl | 2-methylphenyl |
| a-42 | C₈H₁₇(t) | COCH₃ |
| a-43 | 4-methylphenyl | CO-t-Bu |

-continued
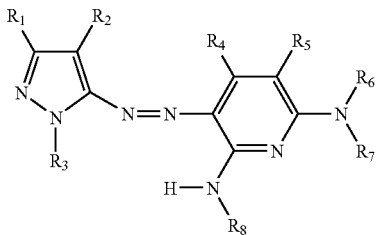
| Dye | R₁ | R₂ | | |
|---|---|---|---|---|
| a-44 | 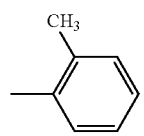 | SO₂CH₃ | | |
| a-45 | 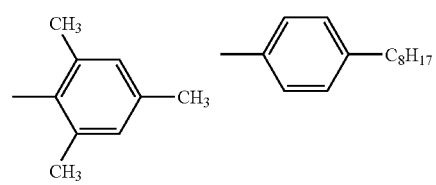 | | | |
| a-46 | 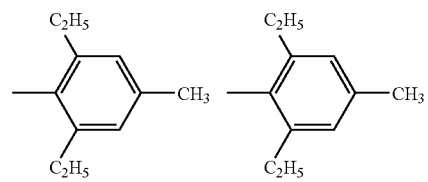 | | | |
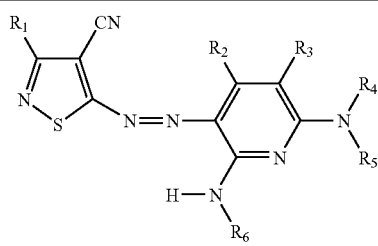
| Dye | R₁ | R₂ | R₃ | R₄ | R₅ | R₆ |
|---|---|---|---|---|---|---|
| b-1 | CH₃ | CH₃ | CN | H | 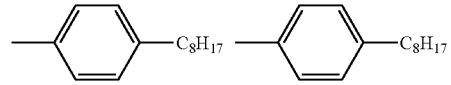 | |
| b-2 | CH₃ | CH₃ | CN | H | 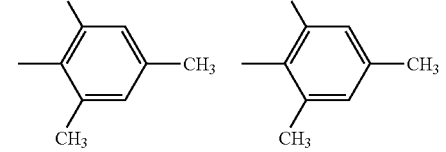 | |
| b-3 | CH₃ | CH₃ | CONH₂ | H | 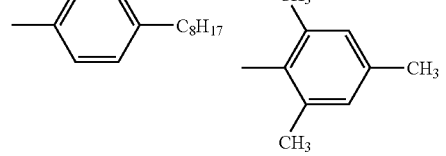 | |

-continued
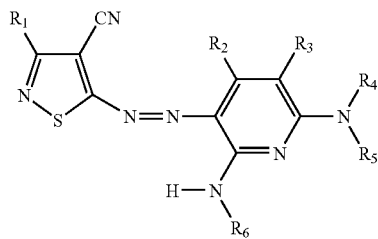
| Dye | R₁ | R₂ | R₃ | R₄ | R₅ | R₆ |
|---|---|---|---|---|---|---|
| b-4 | CH₃ | CH₃ | H | H | 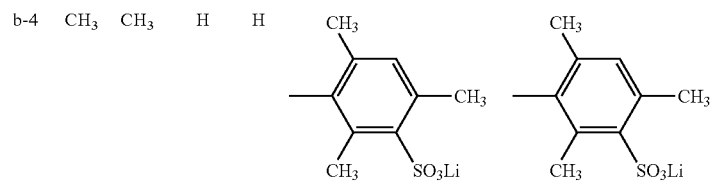 | |
| b-5 | CH₃ | H | CN | H | 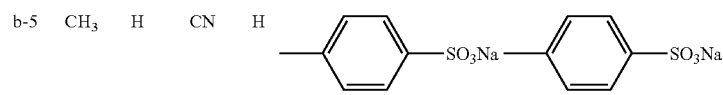 | |
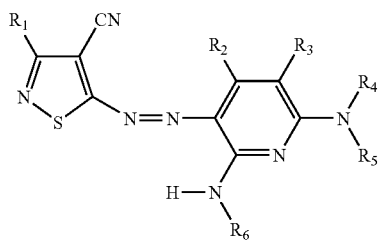
| Dye | R₁ | R₂ | R₃ | R₄ | R₅ | R₆ |
|---|---|---|---|---|---|---|
| b-6 | CH₃ | CH₃ | H | 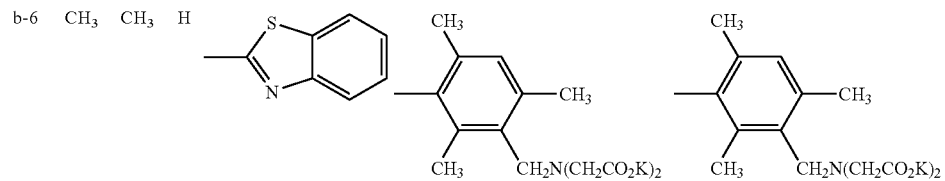 | | |
| b-7 | CH₃ | CH₃ | H | 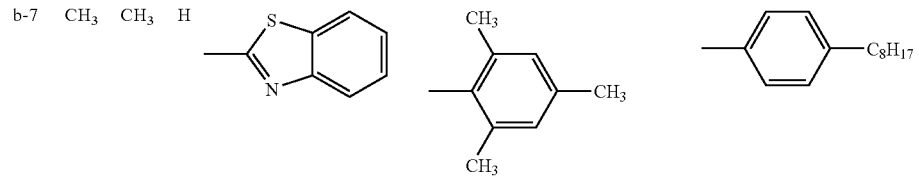 | | |
| b-8 | CH₃ | H | H | SO₂CH₃ | 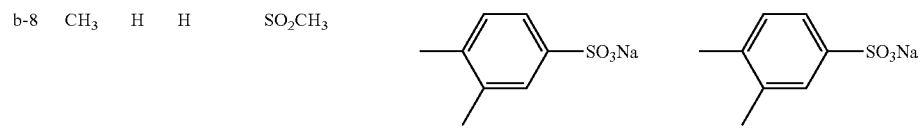 | |

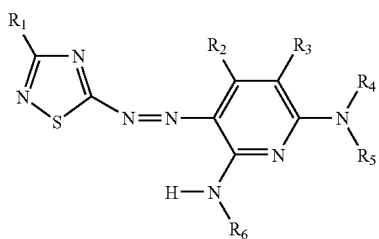

| Dye | R₁ | R₂ | R₃ | R₄ | R₅ | R₆ |
|---|---|---|---|---|---|---|
| c-1 | —SCH₃ | CH₃ | CN | H | C₈H₁₇(t) | ―⟨⟩―C₈H₁₇ |
| c-2 | ―⟨⟩ | H | CONH₂ | H | ―⟨⟩―SO₃K | ―⟨⟩―SO₃K |
| c-3 | CH₃S―CH₂CH₂―SO₃K | CH₃ | H | 2-methylbenzothiazol-6-yl-SO₃K | ―⟨⟩―SO₃K | ―⟨⟩―SO₃K |
| c-4 | —CH₃ | CH₃ | H | 2-methylbenzothiazol-6-yl-SO₂NH(CH₂)₃O-(2,4-di-t-amylphenyl) | 2,4,6-trimethylphenyl | ―⟨⟩―C₈H₁₇ |
| c-5 | ―⟨⟩ | H | H | 2-methylbenzothiazol-6-yl-NHSO₂-(2-OC₈H₁₇(n)-5-C₈H₁₇(t)-phenyl) | 2,4,6-trimethylphenyl | C₈H₁₇(t) |

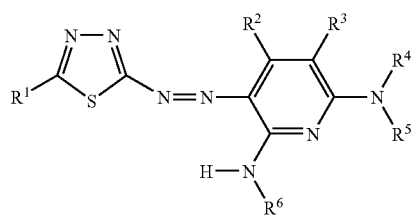

| Dye | R¹ | R² | R³ | R⁴ | R⁵ | R⁶ |
|---|---|---|---|---|---|---|
| d-1 | Me | CH₃ | CN | H | ―⟨⟩―SO₃K | ―⟨⟩―SO₃K |

-continued

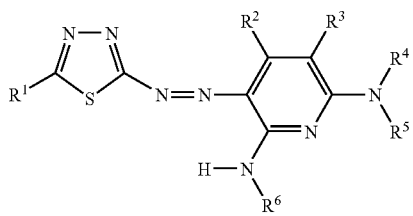

| Dye | R₁ | R₂ | R₃ | R₄ | R₅ | R₆ |
|-----|----|----|----|----|----|----|
| d-2 | Me | CH₃ | CN | H | 3,5-diethyl-4-methylphenyl | 3,5-diethyl-4-methylphenyl |
| d-3 | Me | H | H | 2-benzothiazolyl | 2,4,6-trimethyl-3-sulfo(K)phenyl | 2,4,6-trimethyl-3-sulfo(K)phenyl |
| d-4 | Ph | CH₃ | CONH₂ | H | 4-C₈H₁₇-phenyl | 4-C₈H₁₇-phenyl |
| d-5 | Ph | CH₃ | H | 2-methylbenzothiazol-6-yl-SO₂NH-(CH₂)₃-O-(2,4-di-tert-pentylphenyl) | 4-OC₄H₉(n)-phenyl | 3,5-diethyl-2,4,6-trimethylphenyl |

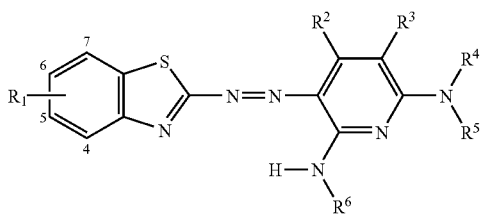

| Dye | R₁ | R₂ | R₃ | R₄ | R₅ | R₆ |
|-----|----|----|----|----|----|----|
| e-1 | 5-Cl | CH₂ | CONH₂ | H | C₈H₁₇(t) | C₈H₁₇(t) |
| e-2 | 5,6-diCl | H | H | 2-methylbenzothiazolyl | 4-C₈H₁₇-phenyl | 4-C₈H₁₇-phenyl |

-continued

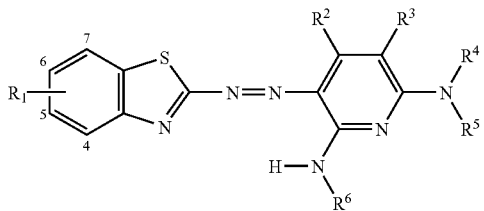

| Dye | R₁ | R₂ | R₃ | R₄ | R₅ | R₆ |
|---|---|---|---|---|---|---|
| e-3 | 5,6-diCl | $CH_3$ | H | 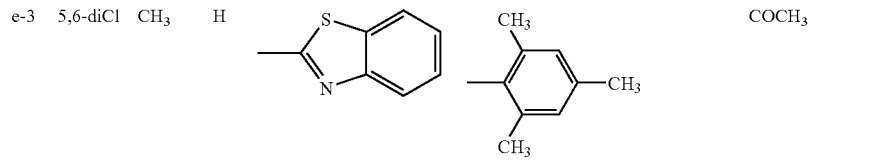 | | $COCH_3$ |
| e-4 | 5-$CH_3$ | H | CN | H | | |
| e-5 | 5-$NO_2$ | $CH_3$ | H | $SO_2CH_3$ | | | f-1

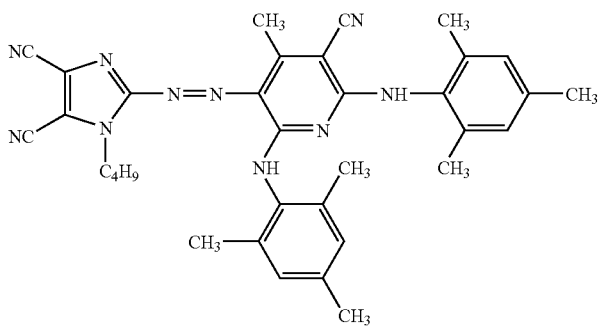

f-2

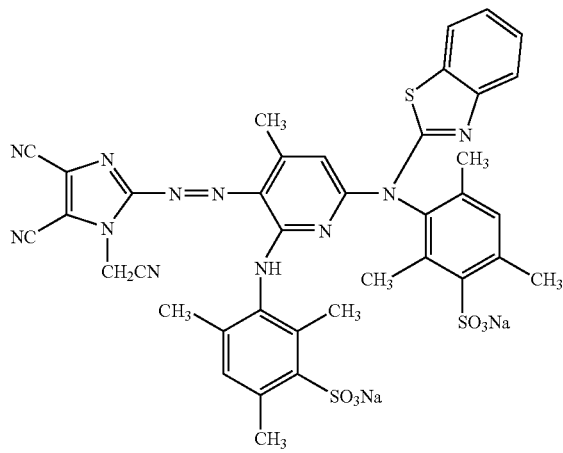

In the magenta dye having the above-described azo group used in this invention, the oxidation potential of the dye is 1.0 V or more positive vs SCE, preferably 1.1 V or more positive vs SCE, and particularly preferably 1.2 V or more positive vs SCE in the aqueous medium of ink. As a means to elevate the potential, the preferred required conditions of constitution as described above are selected, that is, selection of a dye structure having the chromophore represented by (heterocycle A)-N=N-(heterocycle B), selection of an azo dye in which an aromatic nitrogen-containing six-membered heterocycle links directly to at least one side of the azo group as a coupling component, selection of an azo dye having as an auxochrome a structure containing an aromatic ring amino group or a heterocyclic amino group, and furthermore removal of the α-hydrogen of an azo dye. Particularly, the dyes represented by the above-described general formula (1) develop higher potentials. Specific examples are described in JP Application No. 2001-254878.

The method for measuring the oxidation potential meant herein is a measuring method where an SCE (standard saturation calomel electrode) is used as a reference electrode in an aqueous solution or a water-mixed solvent system containing a dye dissolved, and various methods can be utilized including DC polarography where a graphite electrode or a platinum electrode is used as an action electrode, polarography depending upon a titration mercury electrode, cyclic voltammetry (CV), rotating ring desk electrode method, and combshaped electrode method. The oxidation potential is determined as a value to an SCE (standard saturation calomel electrode) by use of the above-described measuring methods wherein a specimen is dissolved in concentration of $1 \times 10^{-4}$ to $1 \times 10^{-6}$ mol·dm$^{-3}$ in a solvent such as dimethylformamide or acetonitrile that contains sodium perchlorate or tetrapropylammonium perchlorate as a supporting electrolyte. The supporting electrolyte and solvent used can be appropriately selected depending upon the oxidation potential or solubility of a specimen. The supporting electrolyte and solvent usable are described in Akira Fujishima et al., "*Denkikagaku Sokuteiho*", pages 101 to 118 (1984, Published by Gihodo Shuppan Co.).

Although the value of oxidation potential may be biased by several tens mV in some cases under the influence of liquid junction potential or solution resistance of a sample solution, the reproducibility of a potential value measured can be ensured by correcting the value by use of a standard sample (e.g., hydroquinone), and furthermore the same measured value can be obtained by use of any of the above-described means to measure the potential.

For the azo dyes having oxidation potentials of 1.0 V or more positive vs SCE, there is a rate constant of forced fading due to an ozone gas as another standard of oxidation resistance and the rate constants of forced fading of preferred azo dyes are $5 \times 10^{-2}$ [hour$^{-1}$] or less, preferably $3 \times 10^{-2}$ [hour$^{-1}$] or less, and more preferably $1.5 \times 10^{-2}$ [hour$^{-1}$] or less.

In measurement of the rate constants of forced fading due to an ozone gas, a coloring region of 0.90 to 1.10 in reflection density measured through a status A filter, which is color of a main spectral absorption region of the ink of an image obtained by printing on a reflection-type image-receiving medium by use of the ink, is selected as an initial density point and this initial density is taken as a starting density (=100 percent). This image is allowed to fade in an ozone fadeometer in which the ozone concentration is maintained at 5 mg/liter all the time, a time taken until the density reaches 80 percent of the initial density is measured, and the reciprocal calculated of this time [hour$^{-1}$] is taken as the rate constant of fading reaction on the supposition that the relation between the fading density and the time obeys the rate equation of first order reaction. Accordingly, although the rate constant of fading reaction found is a rate constant of fading reaction in the coloring region where printing is carried out by use of the said ink, in the present description, this value is used as a rate constant of fading reaction of ink.

Image patches for test usable include a patch of JIS cord 2223 where a black square sign is printed, a stepwise color patch of Macbeth chart, and further an arbitrary stairstep density patch by which measured areas are obtained.

The reflection density of a reflection image (stepwise color patch) printed for measurement is a density determined with the aid of measuring light passing through a status A filter with a densitometer meeting international standard ISO 5-4 (a geometric condition of reflection density).

A test chamber for measuring the rate constant of forced fading reaction due to an ozone gas has therein an ozone generator that can maintain the chamber at an ozone gas concentration of 5 mg/liter all the time (e.g., a high voltage spark system where an alternating voltage is applied to dried air), and the exposure temperature is controlled to 25° C.

This rate constant of forced fading is an index of susceptibility to oxidation under an oxidative atmosphere of environment such as photochemical smog, automobile exhaust, organic fumes from coated surfaces of furniture and carpets, and gas generated from the inside of a picture frame in a bright room and is an index where the ozone gas represents these oxidative atmospheres.

Subsequently, the color hue of magenta ink is described. The magenta ink is excellent in view of color hue since the $\lambda_{max}$ lies in 500 to 580 nm, and it is further preferable that the half band width of the maximum absorption wavelength is small at the long wave side and short wave side, that is, the absorption is sharp. This is specifically described in JP-A-2002-309133. The introduction of a methyl group into the α position enables sharpness of the absorption to develop.

[Phthalocyanine Dye]

Properties required by the ink for ink jet recording are to be excellent in both light resistance and ozone resistance and small in change of color hue and surface conditions (The generation of bronzing and the separation of dye are difficult) About the light resistance (OD 1.0), at a condition of Xe 1.1 W/m (intermittent condition) on the image-receiving paper for Epson PM photograph, it is preferable that light resistance per triacetylcellulose (TAC) filter is 90 percent or more in residual ratio of dyestuff in three days. Furthermore, it is preferable that the residual ratio of dyestuff is 85 percent or more in 14 days.

About the ozone resistance, in a monochromatic site printed so that a cyan reflection density is from 0.9 to 1.1 in the status A filter by use of an ink (cyan) monochrome, it is preferable that the residual ratio of dyestuff (density after fading/initial density×100) is 60 percent or more when kept in an atmosphere of 5-ppm ozone for 24 hr. In the ozone resistance, it is further preferable that the residual ratio of dyestuff is 70 percent or more in a day and particularly preferable that the residual ratio of dyestuff is 80 percent or more in a day. Furthermore, in five days, the residual ratio of dyestuff is preferably 25 percent or more, the residual ratio of dyestuff is more preferably 40 percent or more, and the residual ratio of dyestuff is particularly preferably 50 percent or more. Samples having different coating amounts are prepared with GTC and the amounts of Cu element contained in dyes are measured with the aid of fluorescent X-rays.

The Cu ion exists as a phthalic salt owing to decomposition of a phthalocyanine dye. It is preferable to keep the converted amount of the Cu ion existing in practical prints at 10 mg/m$^2$ or less. About the amount of Cu effused from prints, a cyan solid image having a converted amount of Cu ion of 20 mg/m² or less is formed on the whole surface and is subjected to ozone fading at the above-described conditions for ozone resistance, and then the amount of the ion effused in water is measured. Before fading, all Cu compounds are trapped in image-receiving materials. It is preferable that the amount of Cu ion effused in water is 20 percent or less of the total dye.

This invention has found that the phthalocyanine dyes having the above-described properties can be achieved by 1) elevating the oxidation potential, 2) elevating an associating property, 3) introducing an association-promoting group and strengthening a hydrogen bonding on π-π stacking, and 4) introducing no substituent group into the α-position, that is, to facilitate stacking.

The phthalocyanine dye used for conventional inks for ink jet recording is derived from the sulfonation of an unsubstituted phthalocyanine and consequently forms a mixture of compounds in which the number and position of the substituent group can not be identified and on the other hand, the feature of the ink for ink jet recording of the invention is to use a phthalocyanine dye in which the number and position of the substituent group can be identified. The first structural feature of the dye is to be a water-soluble phthalocyanine dye obtained without going through the sulfonation of an unsubstituted phthalocyanine. The second structural feature of the dye is to have electron-withdrawing groups on the β-positions of the benzene rings of phthalocyanine, and particularly preferably to have electron-withdrawing groups on the β-positions of all benzene rings. Useful dyes are specifically those substituted by sulfonyl groups (JP Application Nos. 2001-47013 and 2001-190214), those substituted by all the sulfamoyl groups (JP Application Nos. 2001-24352 and 2001-189982), those substituted by heterocyclic sulfamoyl groups (JP Application Nos. 2001-96610 and 2001-190216), those substituted by heterocyclic sulfonyl groups (JP Application Nos. 2001-76689 and 2001-190215), those substituted by particular sulfamoyl groups (JP Application No. 2001-57063), those substituted by carbonyl groups (JP Application No. 2002-012869), those having particular substituent groups for improvement in solubility and stability of ink or as a measure of bronzing, specifically those having an asymmetric carbon atom (JP Application No. 2002-012868) and those having Li salts (JP Application No. 2002-012864).

The first feature of properties of the phthalocyanine dyes used for the inks for ink jet recording of this invention is to have a high oxidation potential. The oxidation potential is preferably 1.0 V or more positive, further preferably 1.1 V or more positive, and most preferably 1.2 V or more positive. The second feature of properties thereof is to have a strong associating property. Specific examples include oil-soluble dyes whose association is prescribed (JP Application No. 2001-64413) and water-soluble dyes whose association is prescribed (JP Application No. 2001-117350).

In the relation between the number of associative groups and performance (absorbance of ink), the introduction of the associative groups promotes decrease in absorbance and shift of $\lambda_{max}$ to shorter wavelength even in a dilute solution. Furthermore, in the relation between the number of associative groups and performance (reflection OD on Epson PM 920 image-receiving paper), as the number of associative groups increases, the reflection OD decreases in the same ion strength. That is, it is thought that the association proceeds on the image-receiving paper. In the relation between the number of associative groups and performance (ozone resistance, light resistance), as the number of associative groups increases, the ozone resistance is improved. Dyes having a number of the associative groups also tend to improve the light resistance. In order to impart the above-described resistance, it is necessary to impart the above-described substituent groups X's (represents $X_1$ to $X_4$ etc.) Since the reflection OD and fastness consist in a relation of trade-off, it is necessary to elevate the light resistance without weakening the association.

Modes of the preferred ink of the invention are as follows.

1) A cyan ink having a residual color ratio of 90 percent or more in three days as light resistance at a condition of Xe 1.1 W/m (intermittent condition) on the image-receiving paper for Epson PM photograph in the presence of a TAC filter.

2) In a monochromatic site printed by use of the ink (cyan) monochrome so that the cyan reflection density in status A filter becomes from 0.9 to 1.1, a cyan ink having a residual ratio of dyestuff (density after fading/initial density×100) of 60 percent (preferably 80 percent) or more when kept in an ozone atmosphere of 5 ppm for 24 hr.

3) A cyan ink where an amount of Cu ion effused into water is 20 percent or less of the total dye after carrying out ozone fading at the conditions of the above-described 2).

4) A cyan ink where permeation of the ink into particular image-receiving paper can be achieved until 30 percent or more of the upper portion of the image-receiving layer.

Phthalocyanine dyes contained in the ink for ink jet recording of this invention are preferably water-soluble dyes having oxidation potentials more positive than 1.0, more preferably those further satisfying the above-described conditions in the resistance to ozone gas, and of these dyes, further preferably phthalocyanine dyes represented by the above-described general formula (I).

Although the phthalocyanine dyes are known as fast dyes, it is known that the dyes are inferior in resistance to ozone gas deteriorates when used as dyes for ink jet recording.

In order to decrease the reactivity to the ozone that is an electrophile, in this invention, the oxidation potential is adjusted to a value more positive than 1.0 V (vs SCE) by introducing electron-withdrawing groups into a phthalocyanine skeleton. The more positive oxidation potential is more preferred, the dyes having oxidation potentials more positive than 1.1V (vs SCE) are more preferred, and those having oxidation potentials more positive than 1.2 V (vs SCE) are most preferred.

The traders concerned can readily measure the values of oxidation potential ($E_{ox}$). The methods are described, for example, in P. Delahay, "New Instrumental Methods in Electrochemistry", (1954, Published by Interscience Publishers Co.), A. J. Bard, et al., "Electrochemical Methods", (1980, Published by John Wiley & Sons, Co.), and Akira Fujishima, et al., "*Denkikagaku Sokuteiho*", (1984, Published by Gihodo Schuppansha), and the like.

Specifically, the oxidation potential is measured as a value to SCE (standard saturation calomel electrode) by cyclic voltammetry wherein a specimen is dissolved in concentration of $1 \times 10^{-4}$ to $1 \times 10^{-6}$ mole/liter in a solvent such as dimethylformamide or acetonitrile that contains a supporting electrolyte such as sodium perchlorate or tetrapropylammonium perchlorate. Although this value may be biased in some cases by several tens mV under the influence of liquid junction potential, solution resistance of a sample solution, and the like, it is possible to ensure the reproducibility of the potential with the aid of a standard sample (e.g., hydroquinone).

In order to prescribe the potential without hesitation, in this invention, the value (vs SCE) measured in dimethylformamide containing 0.1 mole·dm$^{-3}$ of tetrapropylammonium perchlorate as a supporting electrolyte (the concentration of a dye: 0.001 mole·dm$^{-3}$) is taken as the oxidation potential of the dye.

The value of $E_{OX}$ (oxidation potential) represents the feasibility to transfer an electron from a sample to an electrode and a greater value (a more positive oxidation potential) makes it more difficult to transfer the electron from the sample to the electrode, in other words, makes oxidation more difficult. In relation to the structure of a compound, the introduction of an electron-withdrawing group makes the oxidation potential more positive and the introduction of an electron-donating group makes it lower. In order to reduce the reactivity to ozone that is an electrophile, in this invention, it is desirable to make the oxidation potential more positive by introducing the electron-withdrawing groups into the skeleton of phthalocyanine. Accordingly, by utilizing the Hammett's substituent constant $\sigma_p$ value which are a measure of an electron-withdrawing property and electron-donating property of the substituent group, it can be said that the introduction of a substituent group having a high $\sigma_p$ value such as sulfinyl group, sulfonyl group, or sulfamoyl group makes it possible to elevate the oxidation potential.

For the reason of adjusting this potential, use of the phthalocyanine dyes represented by the above-described general formula (I) is preferred.

It is evident that the phthalocyanine dyes having the above-described oxidation potentials are cyan dyes excellent in both light resistance and ozone resistance because the dyes satisfy the above-described conditions of the light resistance and ozone resistance.

The phthalocyanine dyes used in this invention (preferably, the phthalocyanine dyes represented by general formula (I)) are hereinafter illustrated in detail.

In general formula (I), $X_1$, $X_2$, $X_3$, and $X_4$ each independently represent —SO-Z, —SO$_2$-Z, —SO$_2$NR1R2, a sulfo group, —CONR1R2, or —CO$_2$R1. Of these substituent groups, —SO-Z, —SO$_2$-Z, —SO$_2$NR1R2, and —CONR1R2 are preferred, particularly —SO$_2$-Z and —SO$_2$NR1R2 are preferred, and —SO$_2$-Z is most preferred. When any of $a_1$ to $a_4$ representing the number of substituent groups represents a number of two or more, $X_1$ to $X_4$ that may exist in plurality may be the same or different and each independently represent any of the above-described substituent groups. Furthermore, $X_1$, $X_2$; $X_3$, and $X_4$ can be quite the same substituent group, respectively, or for example, $X_1$, $X_2$, $X_3$, and $X_4$ all may be —SO$_2$-Z, but different in Z, respectively, that is, they belong to the same kind, but may be partly different substituent groups where the respective Z's are different, or may contains substituent groups different from each other, for example, —SO$_2$-Z and —SO$_2$NR1NR2.

The above-described Z's each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. The substituted or unsubstituted alkyl group, the substituted or unsubstituted aryl group, and the substituted or unsubstituted heterocyclic group are preferred and of these, the substituted alkyl group, the substituted aryl group, and the substituted heterocyclic group are most preferred.

The above-described R1 and R2 each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Of these, the hydrogen atom, the substituted or unsubstituted alkyl group, the substituted or unsubstituted aryl group, and the substituted or unsubstituted heterocyclic group are preferred and of these, the hydrogen atom, the substituted alkyl group, the substituted aryl group, and the substituted heterocyclic group are further preferred. However, it is unpreferable that both R1 and R2 are hydrogen atoms.

The substituted or unsubstituted alkyl groups that R1, R2, and Z represent preferably are alkyl groups having a carbon number of one to 30. Particularly, branched alkyl groups are preferred for the reason of heightening the solubility of dye and the stability of ink, and those containing an asymmetric carbon therein (used as racemic bodies) are particularly preferred. Examples of the substituent group include the same as the substituent groups that Z, R1, R2, $Y_1$, $Y_2$, $Y_3$, and $Y_4$ can further have as described later. Of these, a hydroxyl group, an ether group, an ester group, a cyano group, an amido group, and a sulfonamido group are particularly preferred because of heightening the associating property of dye and improving the fastness thereof. In addition, it also is preferred to contain a halogen atom and an ionic hydrophilic group. The carbon number of the alkyl group contains no carbon number of the substituent group thereon and this is similarly applied to other groups also.

The substituted or unsubstituted cycloalkyl group that R1, R2, and Z represent preferably includes cycloalkyl groups having a carbon number of five to 30. The groups containing an asymmetric carbon therein (used as racemic bodies) are particularly preferred for the reason of heightening the solubility of dye and the stability of ink. Examples of the substituent group include the same as the substituent groups that Z, R1, R2, $Y_1$, $Y_2$, $Y_3$, and $Y_4$ can have further as described later. Of these, a hydroxyl group, an ether group, an ester group, a cyano group, an amido group, and a sulfonamido group are particularly preferred because of heightening the associating property of dye and improving the fastness thereof. In addition, the examples can include a halogen atom and an ionic hydrophilic group also.

The substituted or unsubstituted alkenyl group that R1, R2, and Z represent preferably includes alkenyl groups having a carbon number of two to 30. Particularly, a branched alkenyl group is preferred and a group containing an asymmetric carbon therein (used as a racemic body) is particularly preferred for the reason of heightening the solubility of dye and improving the stability of ink. Examples of the substituent group include the same as the substituent groups that Z, R1, R2, $Y_1$, $Y_2$, $Y_3$, and $Y_4$ can further have as described later. Of these, a hydroxyl group, an ether group, an ester group, a cyano group, an amido group, and a sulfonamido group are particularly preferred because of heightening the associating property of dye and improving the fastness thereof. In addition, the examples can include a halogen atom and an ionic hydrophilic group also.

The substituted or unsubstituted aralkyl group that R1, R2, and Z represent preferably includes aralkyl groups having a carbon number of seven to 30. Particularly, for the reason of heightening the solubility of dye and the stability of ink, a branched aralkyl group is preferred and a group containing an asymmetric carbon therein (used as racemic bodies) is particularly preferred. Examples of the substituent group include the same as the substituent groups that Z, R1, R2, $Y_1$, $Y_2$, $Y_3$, and $Y_4$ can further have as described layer. Of these, a hydroxyl group, an ether group, an ester group, a cyano group, an amido group, a sulfonamide group are particularly preferred because of heightening the associating property of dye and improving the fastness thereof. In addition, the examples can include a halogen atom and an ionic hydrophilic group also.

The substituted or unsubstituted aryl group that R1, R2, and Z represent preferably includes aryl groups having a carbon number of six to 30. Examples of the substituent group include the same as the substituent groups that Z, R1, R2, $Y_1$, $Y_2$, $Y_3$, and $Y_4$ can further have as described later. Of these, electron-withdrawing groups are particularly preferred because of heightening the oxidation potential of dye and improving the fastness thereof. The electron-withdrawing groups are groups having positive Hammett's substituent constant $\sigma_p$ values. Of these, a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group, and a quaternary ammonium group are preferred, and the cyano group, the carboxyl group, the sulfamoyl group, the carbamoyl group, the sulfonyl group, the imido group, the acyl group, the sulfo group, and the quaternary ammonium group are further preferred.

The heterocyclic group that R1, R2, and Z represent preferably is of a five-membered or six-membered ring, which may further be condensed. Furthermore, the group can be an aromatic heterocyclic group or a non-aromatic heterocyclic group. Although the heterocyclic group represented by R1, R2, and Z is exemplified below in the form of heterocycle where positions of substitution are omitted, the positions of substitution are not limited, for example, pyridine can be substituted at the 2-, 3-, and 4-positions. Examples of the heterocyclic group include Pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isooxazole, benzisooxazole, pyrrolidine, piperidine, piperazine, imidazolidine, thiazoline, and the like. Of these, the aromatic heterocyclic groups are preferred and the preferred examples, if they are exemplified similarly to the preceding examples, include pyridine, pyradine, pyrimidine, pyridazine, triazine, pyrazole, imidazole, benzimidazole, triazole, thiazole, benzothiazole, isothiazole, benzisothiazole, thiadiazole, and the like. These groups may have substituent groups and examples of the substituent groups include the same as the substituent groups that Z, R1, R2, $Y_1$, $Y_2$, $Y_3$, and $Y_4$ can further have as described later. Preferred substituent groups are identical with the above-described substituent groups on aryl groups and more preferred substituent groups are identical with the more preferred substituent groups on aryl groups as described above, respectively.

$Y_1$, $Y_2$, $Y_3$, and $Y_4$ each independently include a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, an ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfolyl group, an acyl group, a carboxyl group, or a sulfo group, and the respective groups may further have substituent groups.

Of these groups, the hydrogen atom, the halogen atom, the alkyl group, the aryl group, the cyano group, the alkoxy group, the amido group, the ureido group, the sulfonamido group, the carbamoyl group, the sulfamoyl group, the alkoxycarbonyl group, the carboxyl group, and the sulfo group are preferred, particularly the hydrogen atom, the halogen atom, the cyano group, the carboxyl group, and the sulfo group are preferred, and the hydrogen atom is most preferred.

When Z, R1, R2, $Y_1$, $Y_2$, $Y_3$, and $Y_4$ are groups that can have further substituent groups, it is possible to have further the following substituent groups.

Examples of the substituent groups include straight chain or branched chain alkyl groups having a carbon number of one to 12, straight chain or branched chain aralkyl groups having a carbon number of seven to 18, straight chain or branched chain alkenyl groups having a carbon number of two to 12, straight chain or branched chain alkynyl groups having a carbon number of two to 12, straight chain or branched chain cycloalkyl groups having a carbon number of three to 12, and straight chain or branched chain cycloalkenyl groups having a carbon number of three to 12 (Of these, groups having branched chains are preferred for the reason of improving the solubility of dye and the stability of ink, and the groups containing asymmetric carbons are particularly preferred. Specific examples of the respective groups as described above: for example, methyl, ethyl, propyl, isopropyl, sec-butyl, t-butyl, 2-ethylhexyl, 2-methylsulfonylethyl, 3-phenoxypropyl, trifluoromethyl, and cyclopentyl), a halogen atom (e.g., chlorine atom and bromine atom), an aryl group (e.g., phenyl, 4-t-butylphenyl, and 2,4-di-t-amylphenyl), a heterocyclic group (e.g., imidazolyl, pyrazolyl, triazolyl, 2-furyl, 2-thienyl, 2-pyrimidinyl, and 2-benzotiazolyl), a cyano group, a hydroxyl group, a nitro group, a carboxyl group, an amino group, an alkyloxy group (e.g., methoxy, ethoxy, 2-methoxyethoxy, and 2-methanesulfonylethoxy), an aryloxy group (e.g., phenoxy, 2-methylphenoxy, 4-t-butylphenoxy, 3-nitrophenoxy, 3-t-butoxycarbamoylphenoxy, and 3-methoxycarbamoyl), an acylamino group (e.g., acetamido, benzamido, and 4-(3-t-butyl-4-hydroxyphenoxy)butaneamido), an alkylamino group (e.g., methylamino, butylamino, diethylamino, and methylbutylamino), an anilino group (e.g., phenylamino and 2-chloroanilino), an ureido group (e.g., phenylureido, methylureido, and N,N-dibutylureido), a sulfamoylamino group (e.g., N,N-dipropylsulfamoylamino), an alkylthio group (e.g., methylthio, octylthio and 2-phenoxyethylthio), an arylthio group (e.g., phenylthio, 2-butoxy-5-t-octylphenylthio, and 2-carboxyphenylthio), an alkyloxycarbonylamino group (e.g., methoxycarbonylamino), a sulfonamido group (e.g., methanesulfonamido, benzenesulfonamido, and p-toluenesulfonamido), a carbamoyl group (e.g., N-ethylcarbamoyl and N,N-dibutylcarbamoyl), a sulfamoyl group (e.g., N-ethylsulfamoyl, N,N-dipropylsulfamoyl, and N-phenylsulfamoyl), a sulfonyl group (e.g., methanesulfonyl, octanesulfonyl, benzenesulfonyl, and toluenesulfonyl), an alkyloxycarbonyl group (e.g., methoxycarbonyl and butoxycarbonyl), a heterocyclic oxy group (e.g., 1-phenyltetrazole-5-oxy and 2-tetrahydropyranyloxy), an azo group (e.g., phenylazo, 4-methoxyphenylazo, 4-pivaloylaminophenylazo, and 2-hydroxy-4-propanoylphenylazo), an acyloxy group (e.g., acetoxy), a carbamoyloxy group (e.g., N-methylcarbamoyloxy and N-phenylcarbamoyloxy), a silyloxy group (e.g., trimethylsilyloxy and dibutylmethylsilyloxy), an aryloxycarbonylamino group (e.g., phenoxycarbonylamino), an imido group (e.g., N-succinimido and N-phthalimido), a heterocyclic thio group (e.g., 2-benzothiazolylthio, 2,4-di-phenoxy-1,3,5-triazole-6-thio, and 2-pyridylthio), a sulfinyl group (e.g., 3-phenoxypropylsulfinyl), a phosphonyl group (e.g., phenoxyphosphonyl, octyloxyphosphonyl, and phenylphosphonyl), an aryloxycarbonyl group (e.g., phenoxycarbonyl), an acyl group (e.g., acetyl, 3-phenylpropanoyl, and benzoyl), and anionic hydrophilic group (e.g., carboxyl group, sulfo group, phosphono group, and quaternary ammonium group).

When the phthalocyanine dyes represented by the above-described general formula (I) are water-soluble, it is preferable that the dyes have an ionic hydrophilic group. The ionic hydrophilic group includes a sulfo group, a carboxyl group, a phosphono group, an ammonium group, and the like. The ionic hydrophilic group is preferably the carboxyl group, the phosphono group, and the sulfo group and particularly preferably the carboxyl group and the sulfo group. The carboxyl group, the phosphono group, and the sulfo group may be in the form of salt and examples of counter ions to form the salt include an ammonium ion, an alkali metal ion (e.g., lithium ion, sodium ion, and potassium ion), and an organic cation (e.g., tetramethylammonium ion, tetramethylquanidinium ion, and tetramethylphosphonium). Of the counter ions, the alkali metal salt is preferred and a lithium salt is particularly preferred because of heightening the solubility of dye and improving the stability of ink.

About the number of ionic hydrophilic groups, it is preferred to contain at least two ionic hydrophilic groups in a molecule of the phthalocyanine dye, and it is particularly preferred to contain at least two sulfo groups and/or carboxyl groups.

$a_1$ to $a_4$ and $b_1$ to $b_4$ represent the number of substituent groups $X_1$ to $X_4$ and $Y_1$ to $Y_4$, respectively. $a_1$ to $a_4$ each independently represent an integer of zero to four, but all thereof can not be zero at the same time. $b_1$ to $b_4$ each independently represent an integer of zero to four. When any of $a_1$ to $a_4$ and $b_1$ to $b_4$ is an integer of two or more, it means that any of $X_1$ to $X_4$ and $Y_1$ to $Y_4$ exists in plurality and then they may be the same or different.

$a_1$ and $b_1$ meet a relation of $a_1+b_1=4$. Combinations of $a_1$ representing 1 or 2 and $b_1$ representing 3 or 2 are particularly preferred and of these, the combination of $a_1$ representing 1 and $b_1$ representing 3 is most preferred.

The respective combinations of $a_1$ and $b_1$, $a_1$ and $b_1$, and $a_1$ and $b_1$ also have relation similar to the combination of $a_1$ and $b_1$ and preferred combinations thereof also are similar.

M represents a hydrogen atom, a metallic element, or an oxide, a hydroxide, or a halide thereof.

Preferred M includes, in addition to the hydrogen atom, as the metallic element Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi, and the like. The oxide preferably includes VO, GeO, and the like.

The hydroxide preferably includes $Si(OH)_2$, $Cr(OH)_2$, $Sn(OH)_2$, and the like. Furthermore, the halide includes AlCl, $SiCl_2$, VCl, $VCl_2$, VOCl, FeCl, GaCl, ZrCl, and the like. Of these, Cu, Ni, Zn, Al, and the like are preferred and Cu is most preferred.

Pc (phthalocyanine ring) may form a dimer (e.g., Pc-M-L-M-Pc) or a trimer through L (divalent connecting group), and then the respective M's may be the same or different.

The divalent connecting group represented by L preferably includes an oxy group —O—, a thio group —S—, a carbonyl group —CO—, a sulfonyl group —SO$_2$—, an imino group —NH—, a methylene group —CH$_2$—, and a group formed by combining these groups.

About combinations of preferred substituent groups on the compounds represented by the above-described general formula (I), a compound in which at least one of various substituent groups is a preferred group as described above is preferred, a compound in which more of various substituent groups are preferred groups as described above is more preferred, and a compound in which all of various substituent groups are preferred groups as described above is most preferred.

Of the phthalocyanine dyes represented by the above-described general formula (I), the phthalocyanine dyes having structures represented by the above-described general formula (II) are further preferred. The phthalocyanine dyes represented by general formula (II) of this invention are hereinafter described in detail.

In the above-described general formula (II), $X_{11}$ to $X_{14}$ and $Y_{11}$ to $Y_{18}$ have the same meanings as $X_1$ to $X_4$ and $Y_1$ to $Y_4$, and preferred examples thereof also are similar. Furthermore, $M_1$ has the same meaning as M in general formula (I) and preferred examples also are similar.

In general formula (II), $a_{11}$ to $a_{14}$ each independently represent an integer of one or two, preferably $4 \leq a_{11}+a_{12}+a_{13}+a_{14} \leq 6$ is satisfied, and the case of $a_{11}=a_{12}=a_{13}=a_{14}=1$ is particularly preferred.

$X_{11}$, $X_{12}$, $X_{13}$, and $X_{14}$ can be the very same substituent group, respectively, or, for example, all $X_{11}$, $X_{12}$, $X_{13}$, and $X_{14}$ are —SO$_2$-Z, but different in Z, that is, may be substituent groups of the same kind but substituent groups different partly, or may be substituent groups different from one another, for example, —SO$_2$Z and —SO$_2$NR1R2.

About the phthalocyanine dyes represented by general formula (II), the combinations of particularly preferred substituent groups are as follows.

$X_{11}$ to $X_{14}$ each independently are preferably —SO-Z, —SO$_2$-Z, —SO$_2$NR1R2, or —CONR1R2, particularly preferably —SO$_2$-Z or —SO$_2$NR1R2, and most preferably —SO$_2$-Z.

Z's each independently are preferably a substituted or unsubstituted alkyl group, a substituted or unsubstituted aryl group, and a substituted or unsubstituted heterocyclic group and of these, the substituted alkyl group, the substituted aryl group, and the substituted heterocyclic group are most preferred. Particularly, the substituent group containing an asymmetric carbon therein (used as a racemic body) is preferred for the reason of increasing the solubility of dye and the stability of ink. Furthermore, it is preferable that the substituent groups contain therein a hydroxyl group, an ether group, an ester group, a cyano group, an amido group, and a sulfonamido group for the reason of heightening the associating property and improving the fastness.

R1 and R2 each independently are preferably a hydrogen atom, a substituted or unsubstituted alkyl group, a substituted or unsubstituted aryl group, and a substituted or unsubstituted heterocyclic group and of these, more preferably the hydrogen atom, the substituted alkyl group, the substituted aryl group, and the substituted heterocyclic group. However, it is unpreferable that R1 and R2 are hydrogen atoms at the same time. A substituent group containing an asymmetric carbon therein (used as a racemic body) is preferred for the reason of heightening the solubility of dye and the stability of ink. Furthermore, it is preferable that a substituent group contains therein a hydroxyl group, an ether group, an ester group, a cyano group, an amido group, or a sulfonamido group for the reason of heightening the associating property and improving the fastness.

$Y_{11}$ to $Y_{18}$ each independently are preferably a hydrogen atom, a halogen atom, an alkyl group, an aryl group, a cyano group, an alkoxy group, an amido group, an ureido group, a sulfonamido group, a carbamoyl group, a sulfamoyl group, an alkoxycarbonyl group, a carboxyl group, and a sulfo group, particularly preferably the hydrogen atom, the halogen atom, the cyano group, the carboxyl group, and the sulfo group, and most preferably the hydrogen atom.

$a_{11}$ to $a_{14}$ each independently are preferably one or two and particularly preferably all of them represent one.

$M_1$ represents a hydrogen atom, a metallic element, or a oxide, a hydroxide, or a halide thereof, particularly preferably Cu, Ni, Zn or Al, and of these, most preferably Cu.

When the phthalocyanine dyes represented by the above-described general formula (II) are water-soluble, it is preferable that the dyes have an ionic hydrophilic group. The ionic hydrophilic group includes a sulfo group, a carboxyl group, a phosphono group, a quaternary ammonium group, and the like. Of the above-described ionic hydrophilic groups, the carboxyl group, the phosphono group, and the sulfo group are preferred, and particularly the carboxyl group and the sulfo group are preferred. The carboxyl group, the phosphono group, and the sulfo group may be in the form of salt, and examples of counter ions forming the salt include an ammonium ion, an alkali metal ion (e.g., lithium ion, sodium ion, and potassium ion), and an organic cation (e.g., tetramethylammonium ion, tetramethylguanidium ion, and tetramethylphosphonium ion). Of the counter ions, the alkali metal salt is preferred, and the lithium salt is particularly preferred because of heightening the solubility of dye and improving the stability of ink.

It is preferable that the number of ionic hydrophilic groups is at least two per molecule of the phthalocyanine dye and it is particularly preferable to contain at least two sulfo groups and/or carboxyl groups.

About combinations of preferred substituent groups on the compounds represented by the above-described general formula (II), a compound in which at least one of various substituent groups is one of the above-described preferred groups is preferred, a compound in which more of various substituent groups are the above-described preferred groups is more preferred, and a compound in which all of substituent groups are the above-described preferable groups is most preferred.

As chemical structures of the phthalocyanine dyes of this invention, it is preferable that at least one electron-withdrawing group such as sulfinyl group, sulfonyl group, and sulfamoyl group is introduced to the respective four benzene rings contained in the phthalocyanine so that $\sigma_p$ values of the substituent groups contained in the whole phthalocyanine skeleton become 1.6 or more in total.

The Hammett's substituent constant $\sigma_p$ value will be illustrated a little. The Hammett's rule is an empirical rule proposed by L. P. Hammett in 1935 in order to discuss quantitatively the effect of substituent groups on reactions or equilibrium of benzene derivatives, and the appropriateness thereof is extensively admitted now. For substituent constants searched for the Hammett's rule, there are a $\sigma_p$ value and a $\sigma_m$ value, and these values can be seen in many monographs and, for example, described in detail in "Lange's Handbook of Chemistry", 12th edition, edited by J. A. Dean, 1979 (Mc Graw-Hill) and "Kagaku-no-ryoiki" Special Number 122, pages 96 to 103, 1979 (Nankodo).

A phthalocyanine derivative represented by the above-described general formula (I) in general is a mixture of analogous compounds in which substituent groups $X_n$ (n=1 to 4) and $Y_m$ (m=1 to 4) are different inevitably in position introduced and number introduced depending upon the processes of synthesis and accordingly, a general formula represents statistically and averagely a mixture of analogous compounds in many cases. In this invention, when the mixtures of analogous compounds are divided into three groups as shown below, some particular mixtures have been found to be particularly preferred. That is, the analogous mixtures of phthalocyanine dyes represented by the above-described general formulas (I) and (II) are classified into the following three groups on the bases of the positions of substitution and defined. The positions of $Y_{11}$, $Y_{12}$, $Y_{13}$, $Y_{14}$, $Y_{15}$, $Y_{16}$, $Y_{17}$, and $Y_{18}$ in formula (II) are taken as 1-, 4-, 5-, 8-, 9-, 12-, 13-, and 16-positions, respectively.

(1) β-position substitution type: phthalocyanine dyes having particular substituent groups in 2- and/or 3-positions, 6-and/or 7-positions, 10- and/or 11-positions, and 14- and 15-positions.

(2) α-position substitution type: phthalocyanine dyes having particular substituent groups in 1- and/or 4-positions, 5- and/or 8-positions, 9- and/or 12-positions, and 13- and/or 16-positions.

(3) α and β-position-mixed substitution type: phthalocyanine dyes having particular substituent groups irregularly in 1- to 16-positions.

When derivatives of the phthalocyanine dye different in structure (particularly, different in the position of substitution) are described in the present description, the terms β-position substitution type, α-position substitution type, and α and β-position-mixed substitution type are used as described above.

The phthalocyanine derivatives used in this invention can be synthesized by methods described or cited in Shirai and Kobayashi, "*Futalocianin-Kagaku-to-Kino-*", pages 1 to 62, published by IPC Co., C. C. Leznoff and A. B. P. Lever, "Phthalocyanines—Properties and Applications", pages 1 to 54, published by VCH, and the like, and by combinations with methods analogous thereto.

The phthalocyanine compounds represented by general formula (I) of this invention can be synthesized, for example, through sulfonation, sulfochlorination, or amidation of an unsubstituted phthalocyanine compound as described in PCT International Publication Nos. WO00/17275, WO00/08103, WO00/08101, and WO98/41853, JP-A-10-36471, and the like. In this case, the sulfonation can occur in all positions of phthalocyanine nucleus and in addition, the number of the sulfonation undergone also is difficult to control. Accordingly, in the case where sulfo groups are introduced under these reaction conditions, the position and the number of sulfo groups introduced into a product can not be identified, and a mixture of compounds different in number of substituent groups and in position of substitution is inevitably produced. When the compound of this invention is synthesized from it as a starting material, the number and the position of substitution of heterocycle-substituted sulfamoyl group can not be identified and accordingly, the compound of this invention is obtained as an α and β-position-mixed substitution type mixture containing some compounds different in number of substituent groups or in position of substitution.

As described above, for example, the introduction of a number of electron-withdrawing groups such as sulfamoyl group into the phthalocyanine nucleus heightens the oxidation potential to increase the ozone resistance. According to the above-described method of synthesis, phthalocyanine dyes in which the number of electron-withdrawing groups introduced is few, that is, the oxidation potential is negative are inevitably mixed. Accordingly, in order to improve the ozone resistance, the adoption of a method of synthesis where the formation of compounds having negative oxidation potentials is inhibited is more preferred.

It is possible to derive the phthalocyanine compounds represented by general formula (II) of this invention, for example, from reaction of a phthalonitrile derivative (compound P) and/or a diiminoisoindoline derivative (compound Q) represented by the following formulas with a metallic derivative represented by general formula (III) or from a tetrasulfophthalocyanine compound obtained by reaction of a 4-sulfophthalonitrile derivative (compound R) represented by the following formula with a metallic derivative represented by general formula (III).

In the above-described respective formulas, $X_p$ corresponds to $X_{11}$, $X_{12}$, $X_{13}$, or $X_{14}$ in the above-described general formula (II). Furthermore, $Y_q$ and $Y_{q'}$ correspond to $Y_{11}$, $Y_{12}$, $Y_{13}$, $Y_{14}$, $Y_{15}$, $Y_{16}$, $Y_{17}$, or $Y_{18}$ in the above-described general formula (II), respectively. In compound R, M' represents a cation.

The cation that M' represents is an alkali metal ion such as Li, Na, and K or an organic cation such as triethylammonium ion and pyridinium ion.

$$M\text{-}(Y)_d \qquad \text{General formula (III)}$$

In general formula (III), M has the same meaning as M in general formulas (I) and (II), Y represents a monovalent or divalent ligand such as halogen atom, acetate anion, acetylacetnate, or oxygen, and d is an integer of one to four.

That is, according to the above-described method of synthesis, desired substituent groups can be introduced by a

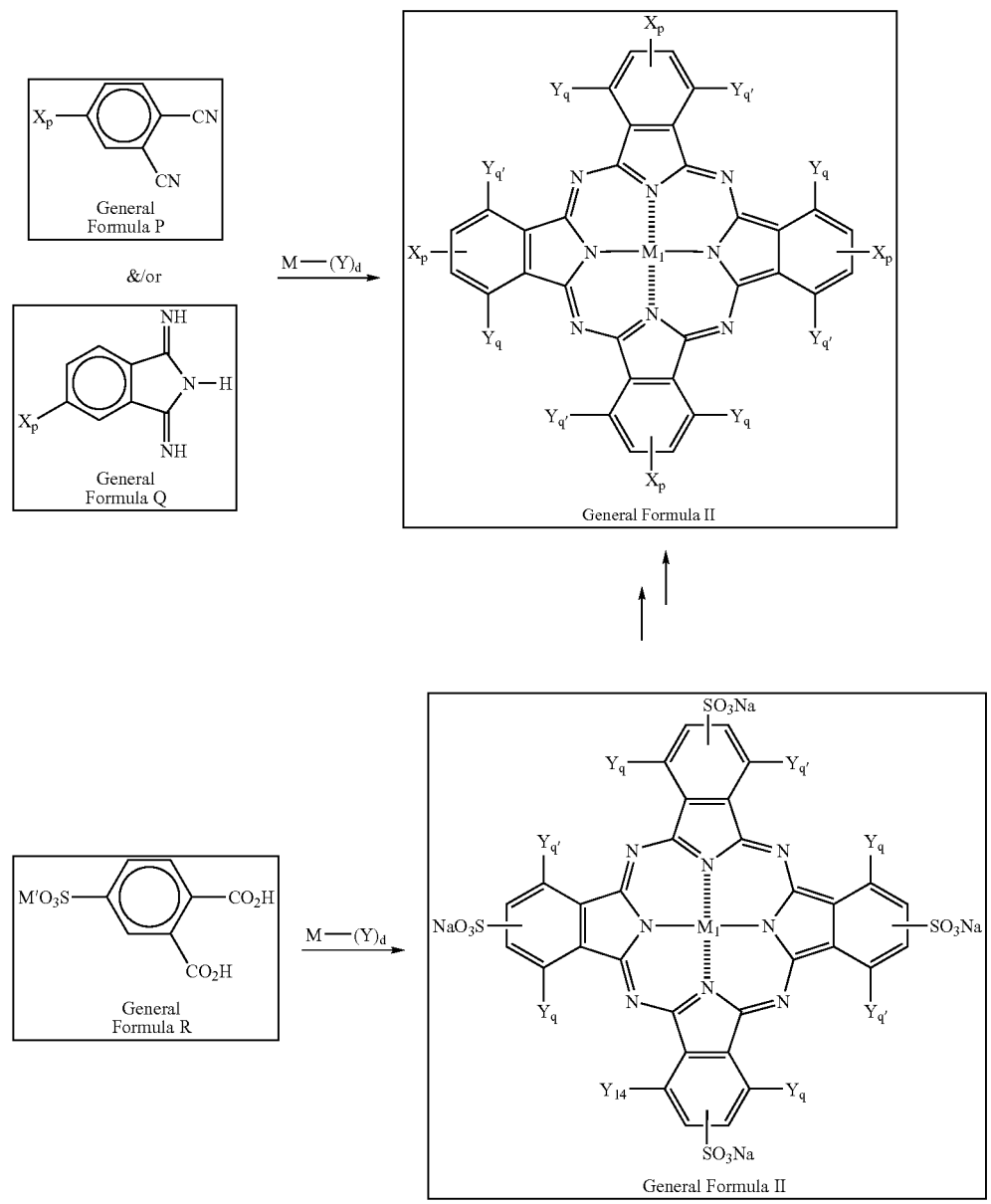

specific number. When the introduction of a number of electron-withdrawing groups is desired to raise the oxidation potential, the method of synthesis as described above is extremely superior to the method as described already for synthesizing the phthalocyanine compounds of general formula (I).

The phthalocyanine compounds represented by the above-described general formula (II) thus obtained are usually mixtures of compounds represented by the following general formulas (a)-1 to (a)-4 that are isomers as to the respective positions of substitution of $X_p$, that is, to form the β-position substitution type.

General formula (a)-1

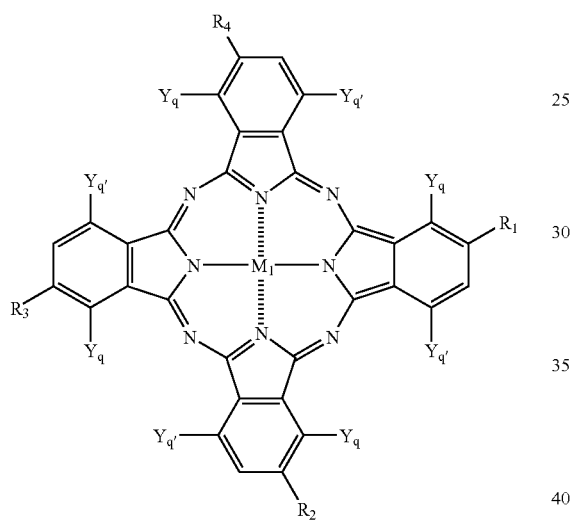

General formula (a)-2

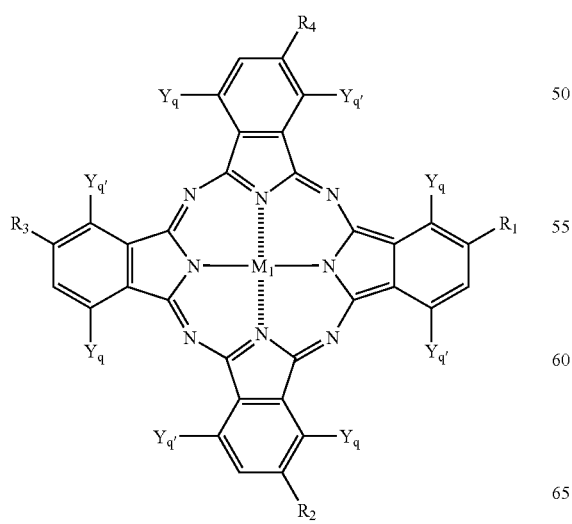

-continued

General formula (a)-3

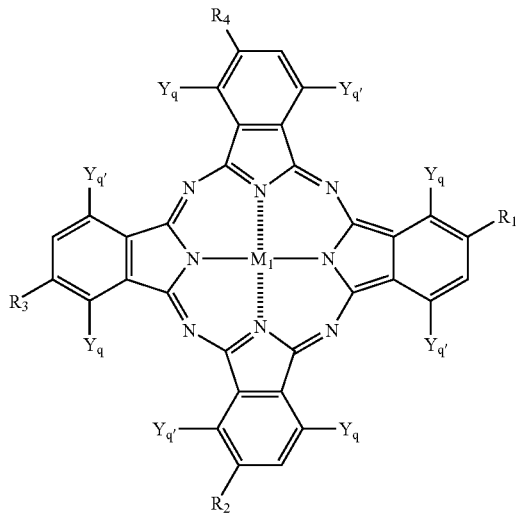

General formula (a)-4

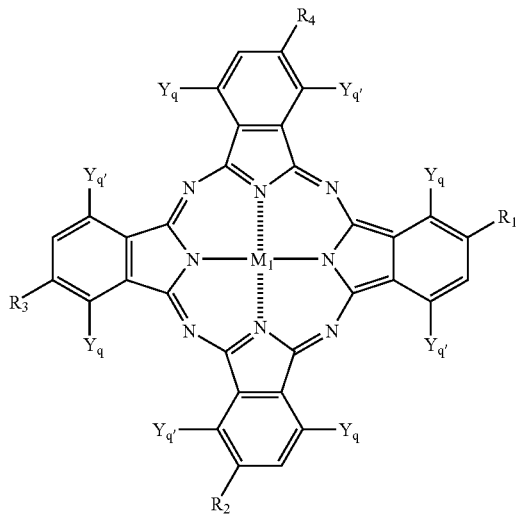

In the above-described method of synthesis, use of the very same substituent group as $X_p$ can lead to synthesis of a phthalocyanine dye of β-position substitution type where $X_{11}$, $X_{12}$, $X_{13}$, and $X_{14}$ are the very same substituent group. On the other hand, use of combinations of different substituent groups as $X_p$ enables synthesis of a dye having substituent groups of the same kind but substituent groups partly different from one another or a dye having substituent groups of different kinds from one another. Of the dyes of general formula (II), these dyes having electron-withdrawing substituent groups different from one another are particularly preferred because the solubility and associating property of dye and the keeping stability of ink can be adjusted.

In this invention, it has been found that the oxidation potential more positive than 1.0 V (vs SCE) is very important to improvement in fastness in all substitution types, and significance of this effect has never been foreseen from the above-described background art. Furthermore, the β-position substitution type showed a tendency to be apparently excellent in color hue, light resistance, ozone gas resistance, and the like as compared with the α and β-position-mixed substitution type, though details of the cause are unknown.

Specific examples of the phthalocyanine dye represented by the above-described general formulas (I) and (II) (exemplified compounds I-1 to I-12 and 101 to 190) are shown below, but the phthalocyanine dyes used in this invention are not to be construed as limited to the following examples.

Exemplified Compounds

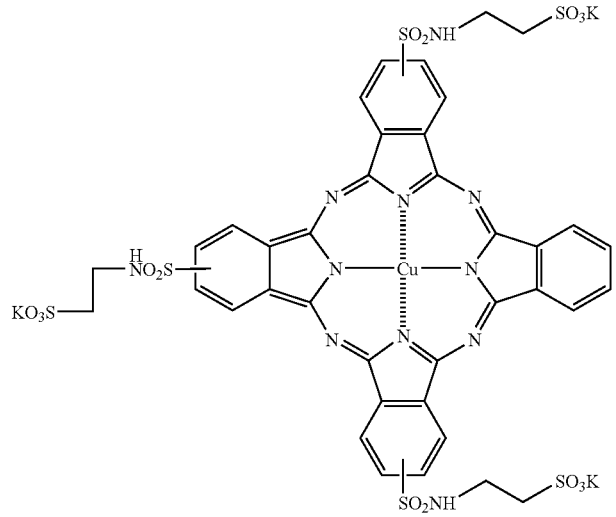

(I-1)

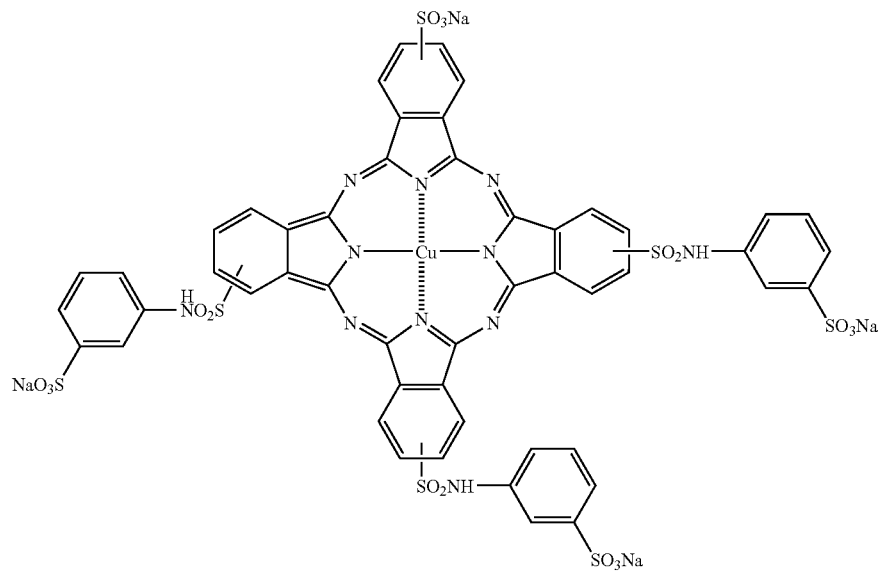

(I-2)

-continued
(I-3)
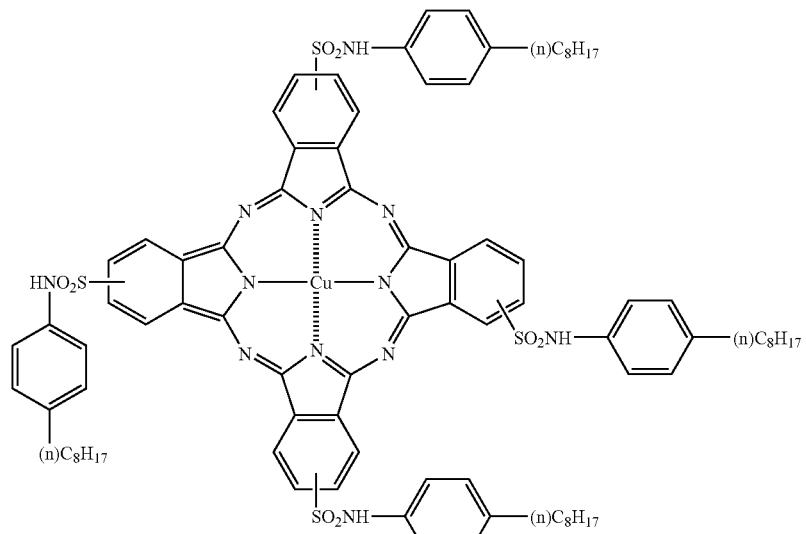
(I-4)
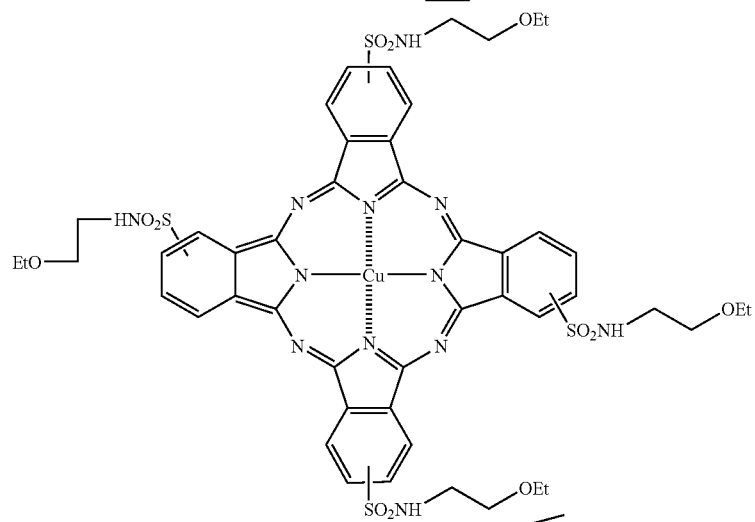
(I-5)
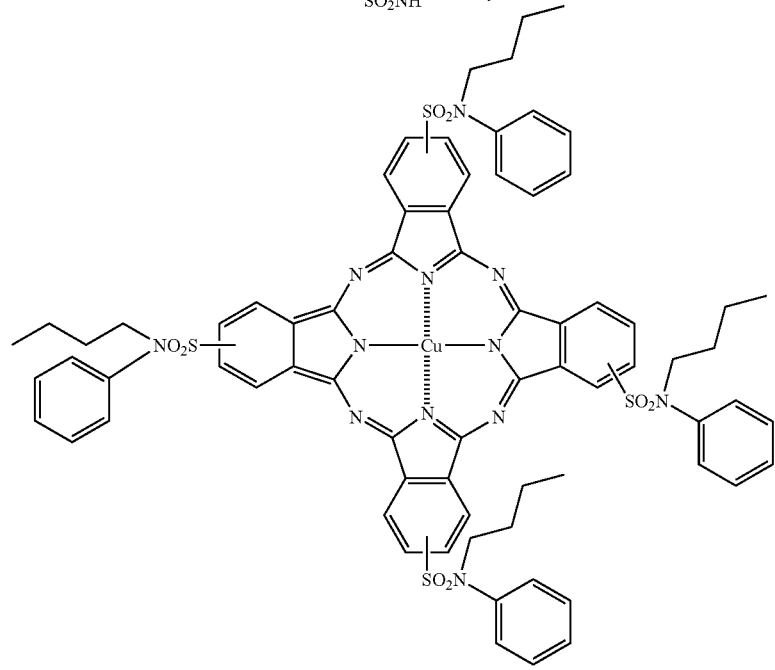

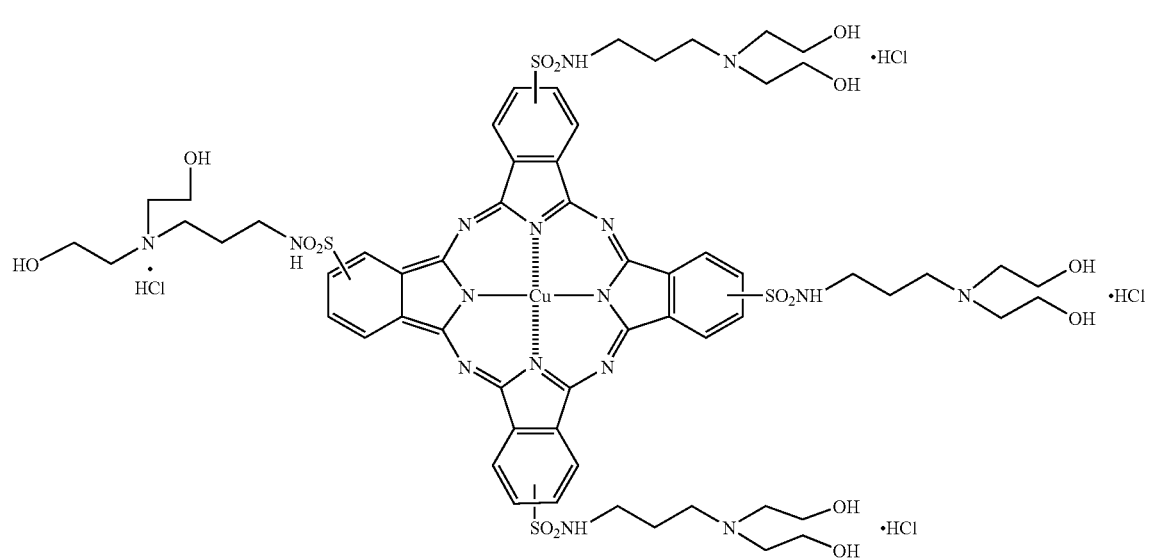
(I-6)
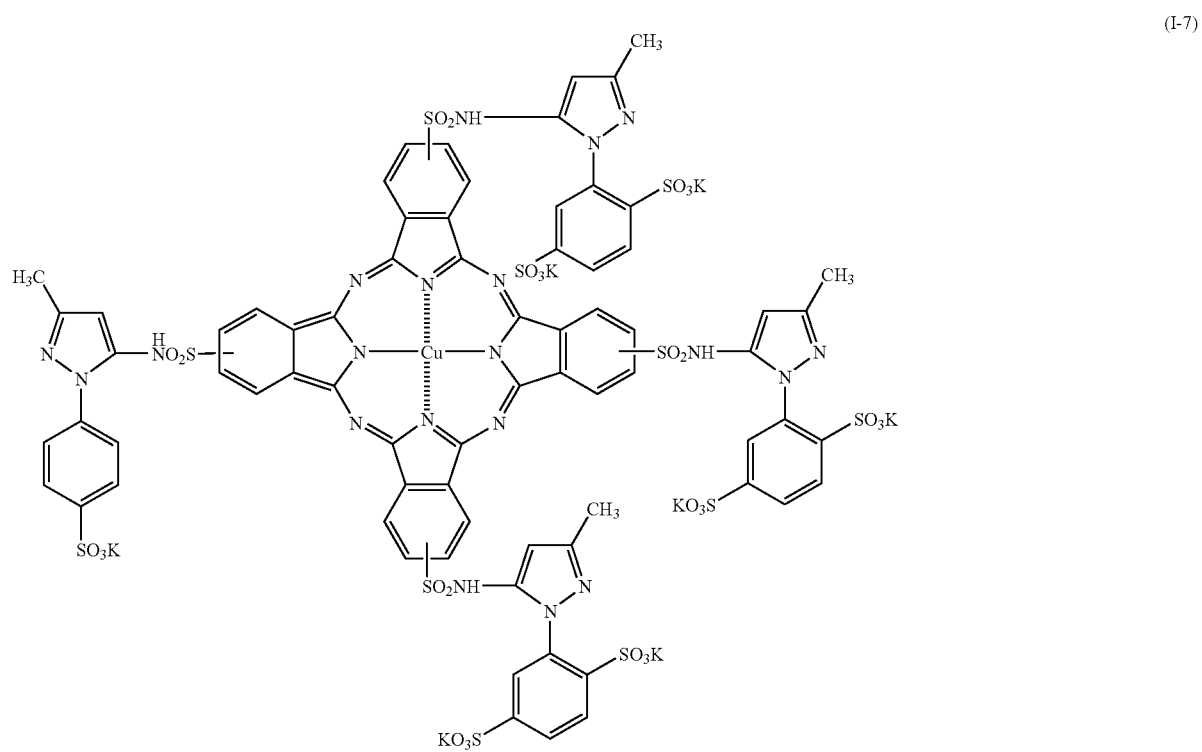
(I-7)

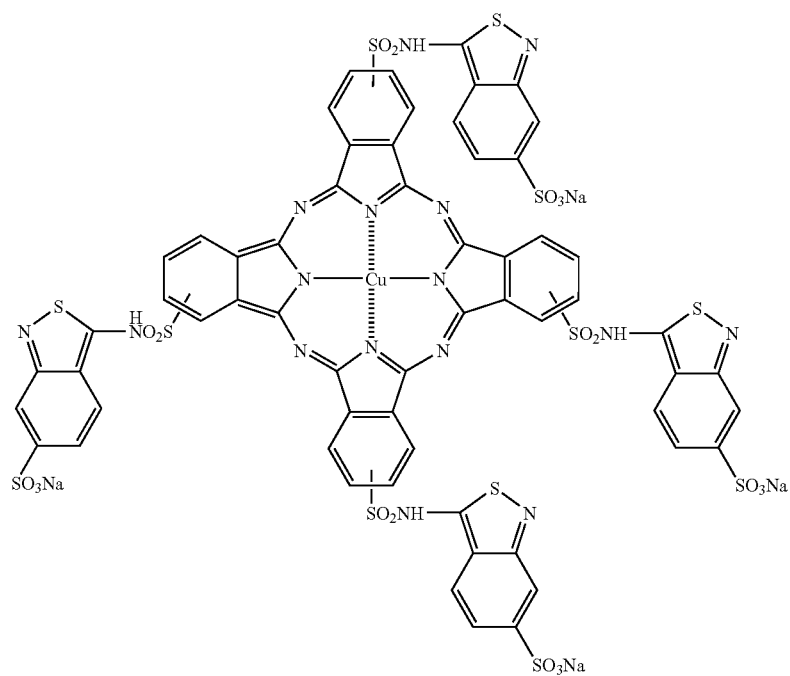
(I-8)
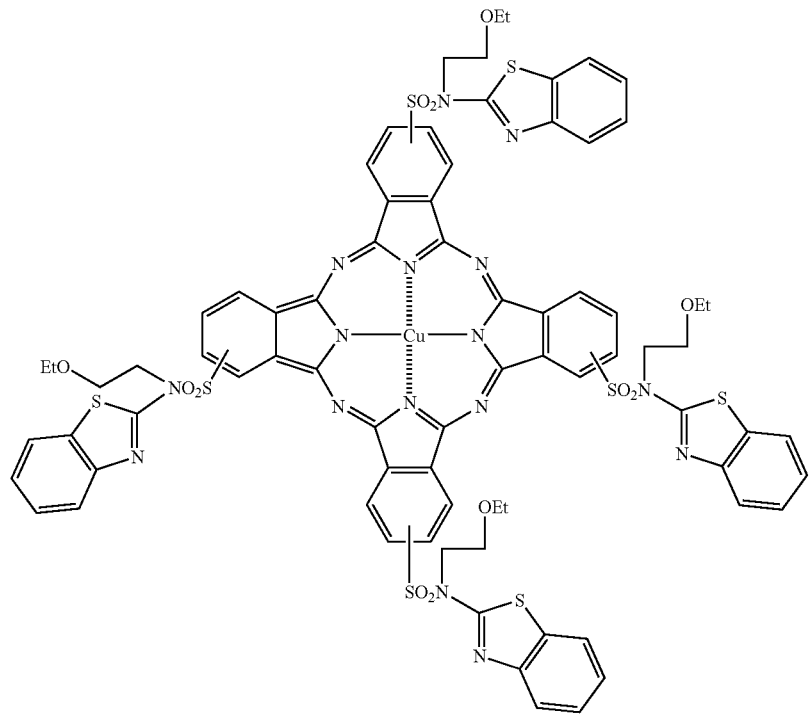
(I-9)

(I-10)
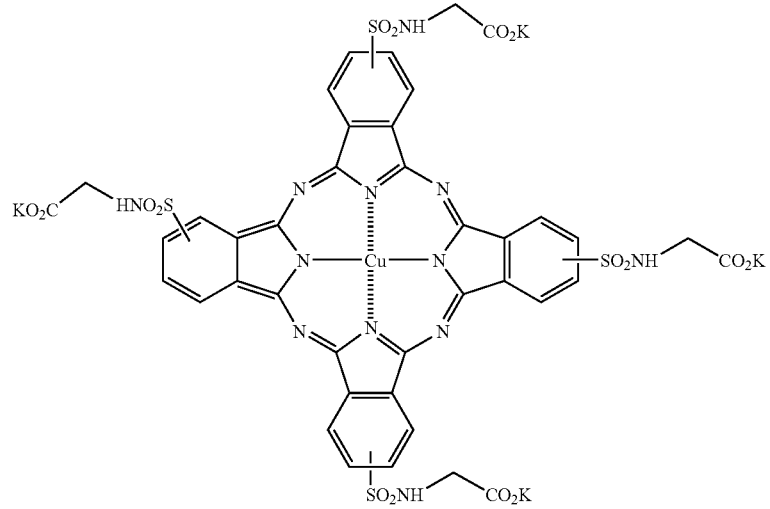
(I-11)
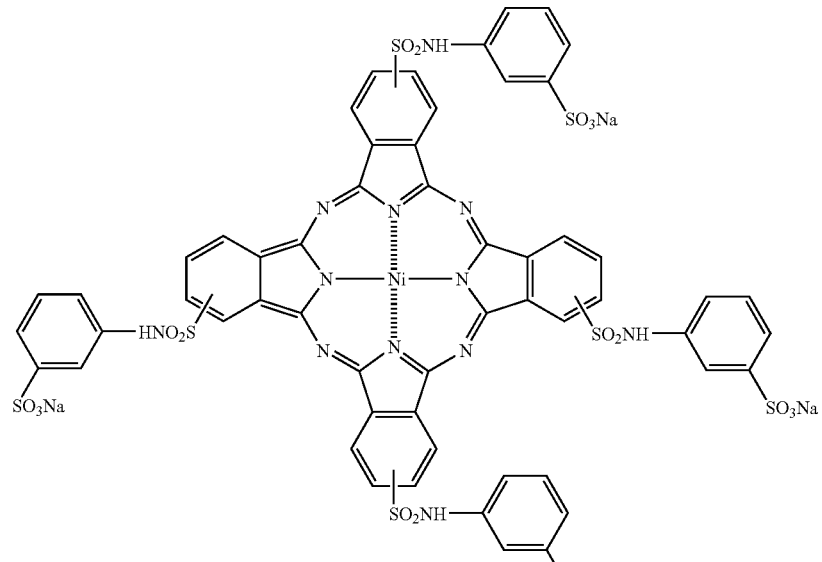
(I-12)
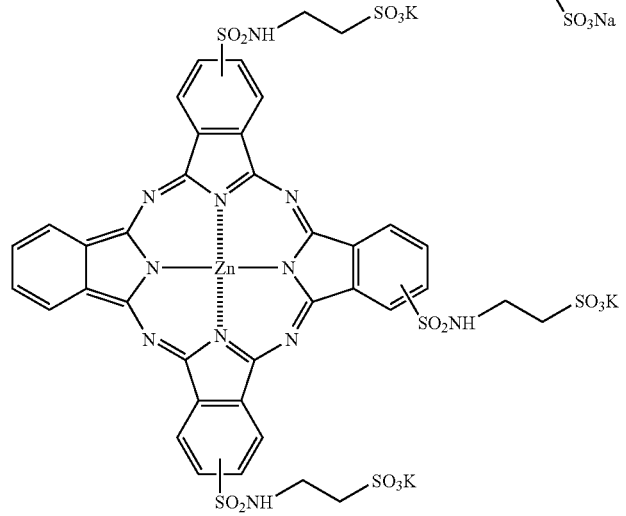

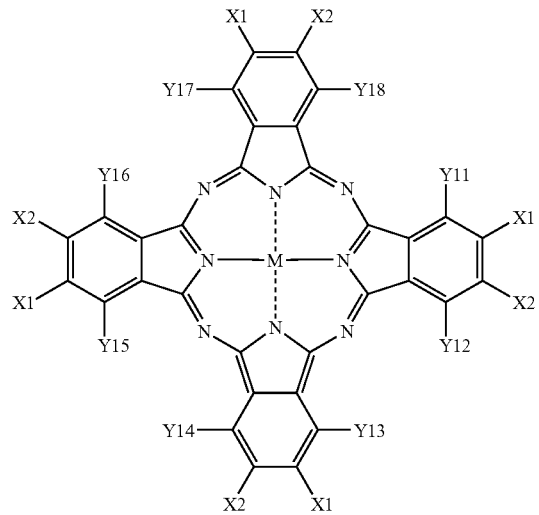

In the table, specific examples of the respective groups (X1, X2), (Y11, Y12), (Y13, Y14), (Y15, Y16), and (Y17, Y18) each independently are out of order:

| No. | M | X1 | X2 | Y11, Y12 | Y13, Y14 | Y15, Y16 | Y17, Y18 |
|---|---|---|---|---|---|---|---|
| 101 | Cu | —SO$_2$—NH—CH$_2$—CH$_2$—SO$_3$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |
| 105 | Ni | —SO$_2$—NH—CH$_2$—CH$_2$—CO—NH—CH(CH$_2$—COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$—OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_5$—CO$_2$K | —H | —H, —H | —H, —H | —H, —H | —H, —H |

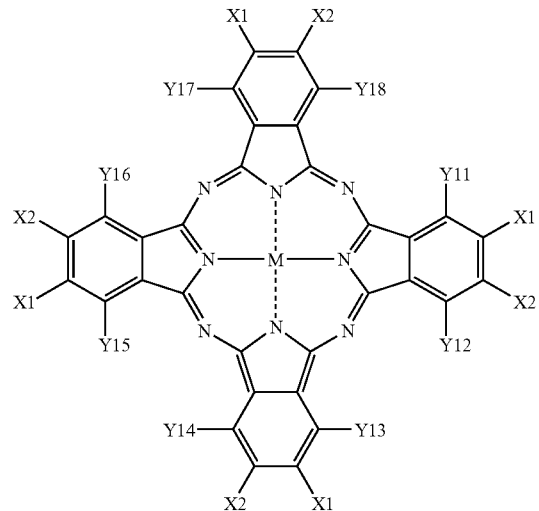

In the table, specific examples of the respective groups (X1, X2), (Y11, Y12), (Y13, Y14), (Y15, Y16), and (Y17, Y18) each independently are out of order.

| No. | M | X1 | X2 | Y11, Y12 | Y13, Y14 | Y15, Y16 | Y17, Y18 |
|---|---|---|---|---|---|---|---|
| 111 | Cu | —SO$_2$—NH—CH$_2$—CH$_2$—CH$_2$—SO$_2$—NH—CH$_2$CH(OH)—CH$_2$—SO$_3$Li | —H | —H, —H | —H, —H | —H, —H | —H, —H |
| 112 | Cu | —SO$_2$—NH—CH$_2$—CH$_2$—CH$_2$—SO$_2$NH—CH$_2$—CH(OH)—CH$_3$ | —SO$_3$Li | —H, —H | —H, —H | —H, —H | —H, —H |
| 113 | Cu | —SO$_2$—CH$_2$—CH(OH)—CH$_2$SO$_3$K | —H | —H, —H | —H, —H | —H, —H | —H, —H |
| 114 | Cu | —SO$_2$—CH$_2$—CH(OH)—CH$_3$ | —SO$_3$Li | —H, —H | —H, —H | —H, —H | —H, —H |
| 115 | Cu | —SO$_2$NH(CH$_2$)$_3$$\oplus$N(CH$_3$)(CH$_2$CH$_2$OH)$_2$·CH$_3$-C$_6$H$_4$-SO$_3$$^\ominus$ | —H | —H, —H | —H, —H | —H, —H | —H, —H |
| 116 | Cu | —CO—NH—CH$_2$—CH(OH)—CH$_2$SO$_3$K | —H | —H, —H | —H, —H | —H, —H | —H, —H |
| 117 | Cu | —CO—NH—CH(COOLi)—CH$_2$CH$_2$SO$_3$Li | —H | —H, —H | —H, —H | —H, —H | —H, —H |

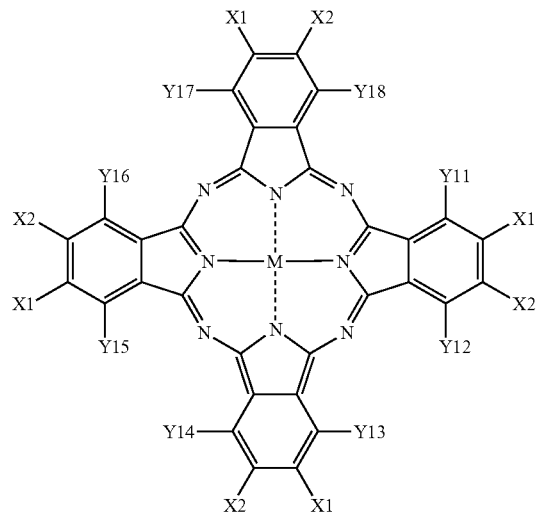

In the table, specific examples of the respective groups (X1, X2), (Y11, Y12), (Y13, Y14), (Y15, Y16), and (Y17, Y18) each independently are out of order.

| No. | M | X1 | X2 | Y11, Y12 | Y13, Y14 | Y15, Y16 | Y17, Y18 |
|---|---|---|---|---|---|---|---|
| 118 | Cu | —SO$_2$CH$_2$CH$_2$CH(CH$_3$)(SO$_3$Li) | —H | —H, —H | —H, —H | —H, —H | —H, —H |
| 119 | Cu | —SO$_2$—CH$_2$—CH(OH)—CH$_2$—SO$_3$Na | —H | —H, —H | —H, —H | —H, —H | —H, —H |
| 120 | Cu | —SO$_2$—CH$_2$—CH$_2$—CH(CH$_3$)—COOLi | —H | —H, —H | —H, —H | —H, —H | —H, —H |
| 121 | Cu | —SO$_2$(CH$_2$)$_3$SO$_2$NHCH$_2$—CH(OH)—CH$_2$—SO$_3$Li | —H | —H, —H | —H, —H | —H, —H | —H, —H |
| 122 | Cu | —CO$_2$CH$_2$CH$_2$CH$_2$SO$_2$—NH—CH$_2$—CH(OH)—CH$_2$—SO$_3$Li | —H | —H, —H | —H, —H | —H, —H | —H, —H |
| 123 | Cu | —SO$_2$NH—C$_8$H$_{17}$(t) | —H | —H, —H | —H, —H | —H, —H | —H, —H |
| 124 | Cu | —SO$_2$—NH—CH$_2$—CH(CH$_2$CH$_3$)—CH$_2$CH$_2$—CH$_3$ | —H | —H, —H | —H, —H | —H, —H | —H, —H |

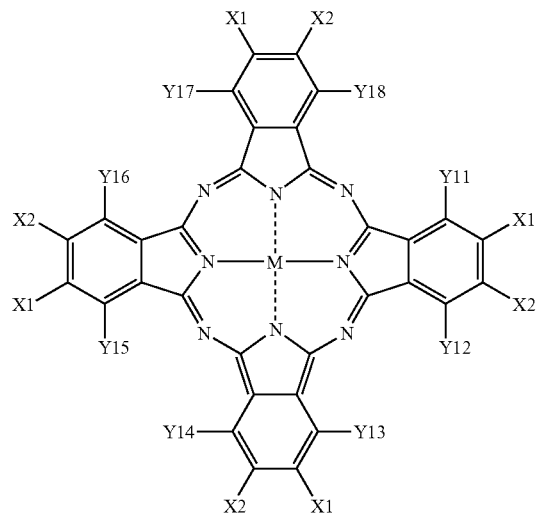

In the table, specific examples of the respective groups (X1, X2), (Y11, Y12), (Y13, Y14), (Y15, Y16) and (Y17, Y18) each independently are out of order.

| No. | M | X1 | X2 | Y11, Y12 | Y13, Y14 | Y15, Y16 | Y17, Y18 |
|---|---|---|---|---|---|---|---|
| 125 | Cu | —SO$_2$CH$_2$CH$_2$CH$_2$SO$_2$—NH—CH$_2$—CH(CH$_3$)—CH$_2$—CH$_3$ | —H | —H, —H | —H, —H | —H, —H | —H, —H |
| 126 | Cu | —SO$_2$—CH$_2$—CH$_2$—CH$_2$—CO$_2$—CH(CH$_3$)—CH$_2$—O—CH$_3$ | —H | —H, —H | —H, —H | —H, —H | —H, —H |
| 127 | Cu | —SO$_2$CH$_2$CH$_2$CH$_2$SO$_2$NHCH$_2$CH$_2$CH$_2$O—CH(CH$_3$)(CH$_3$) | —H | —H, —H | —H, —H | —H, —H | —H, —H |
| 128 | Zn | —SO$_2$—CH$_2$—CH(O—CH$_3$)—CH$_2$—O—CH$_2$ | —CN | —H, —H | —H, —H | —H, —H | —H, —H |
| 129 | Cu | —CO—NH—CH$_2$—CH(CH$_2$CH$_3$)—CH$_2$—CH$_2$—CH$_2$CH$_3$ | —H | —Cl, —H | —Cl, —H | —Cl, —H | —Cl, —H |
| 130 | Cu | —CO$_2$—CH(CH$_3$)—CH$_2$—O—C$_4$H$_9$(t) | —H | —H, —H | —H, —H | —H, —H | —H, —H |
| 131 | Cu | —SO$_2$—CH$_2$—CH$_2$—CH(CH$_3$)—SO$_2$—NH—(2,5-SO$_3$Li-C$_6$H$_3$)—SO$_3$Li | —H | —H, —H | —H, —H | —H, —H | —H, —H |

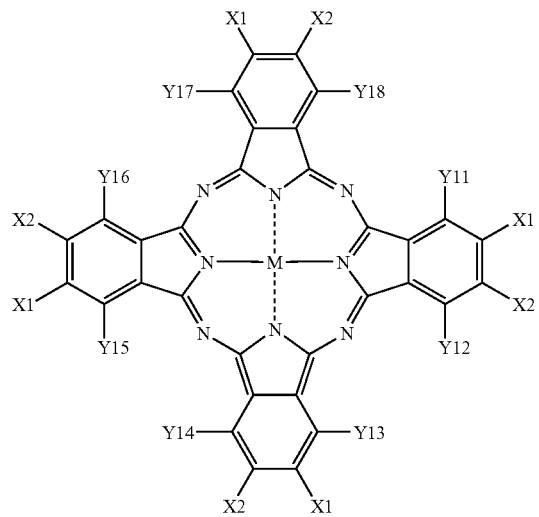
In the table, specific examples of the respective groups (X1, X2), (Y11, Y12), (Y13, Y14), (Y15, Y16), and (Y17, Y18) each independently are out of order.
| No. | M | X1 | X2 | Y11, Y12 | Y13, Y14 | Y15, Y16 | Y17, Y18 |
|---|---|---|---|---|---|---|---|
| 132 | Cu | —SO₂NH—C₆H₃(CO₂C₆H₁₃(n))₂ | —H | —H, —H | —H, —H | —H, —H | —H, —H |
| 133 | Cu | —SO₂NH—C₆H₃(OCH₂CH₂OCH₃)(SO₂NHCH₂CH(C₂H₅)C₄H₉) | —H | —H, —H | —H, —H | —H, —H | —H, —H |
| 134 | Cu | —SO₂NH—C₆H₄—SO₂—NH—CH₂—CH(CH₂CH₃)—CH₂CH₂—CH₂—CH₃ | —H | —H, —H | —H, —H | —H, —H | —H, —H |
| 135 | Cu | —SO₂—C₆H₄—CO₂Na | —H | —H, —H | —H, —H | —H, —H | —H, —H |
| 136 | Cu | —SO₂N(C₄H₉(n))(C₆H₅) | —H | —H, —H | —H, —H | —H, —H | —H, —H |

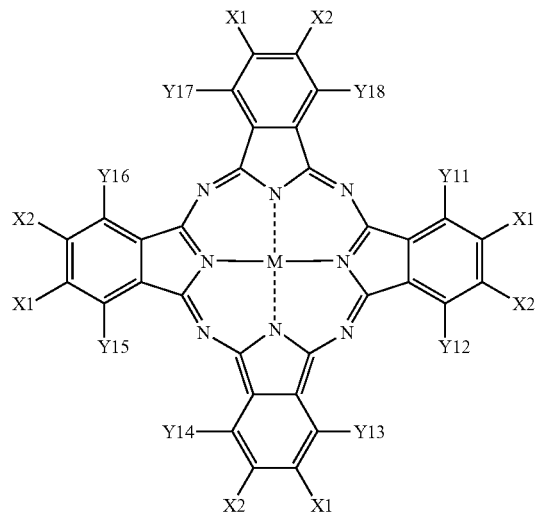

In the table, specific examples of the respective groups (X1, X2), (Y11, Y12), (Y13, Y14), (Y15, Y16), and (Y17, Y18) each independently are out of order.

| No. | M | X1 | X2 | Y11, Y12 | Y13, Y14 | Y15, Y16 | Y17, Y18 |
|---|---|---|---|---|---|---|---|
| 137 | Cu | —SO$_2$—(benzothiazole-2-yl with 6-SO$_3$Li) | —H | —H, —H | —H, —H | —H, —H | —H, —H |
| 138 | Cu | —SO$_2$NH—(3-methyl-pyrazol-5-yl)-N1-(2-SO$_3$Li, 5-SO$_3$Li phenyl) | —H | —H, —H | —H, —H | —H, —H | —H, —H |
| 139 | Cu | —SO$_2$(CH$_2$)$_3$—NH—C(=O)—(phenyl with CO$_2$Li, CO$_2$Li) | —Cl | —H, —H | —H, —H | —H, —H | —H, —H |
| 140 | Cu | —CO$_2$—CH$_2$CH$_2$CH$_2$—NH—(1,3,5-triazine-2,4-diyl)(NH—CH$_2$—CH$_2$—CH(CH$_3$)—SO$_3$Li)$_2$ | —H | —H, —H | —H, —H | —H, —H | —H, —H |

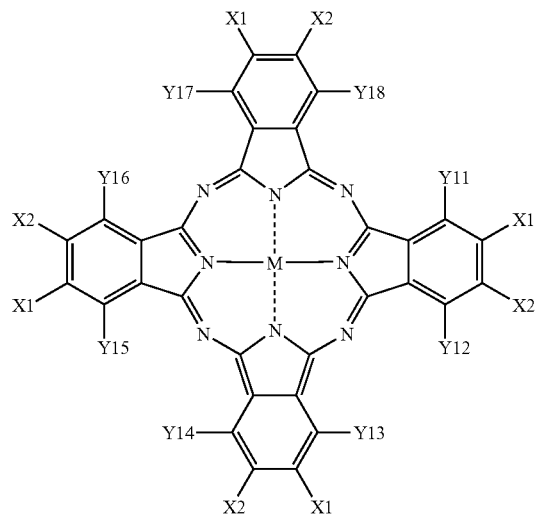

In the table, specific examples of the respective groups (X1, X2), (Y11, Y12), (Y13, Y14), (Y15, Y16), and (Y17, Y18) each independently are out of order

| No. | M | X1 | X2 | Y11, Y12 | Y13, Y14 | Y15, Y16 | Y17, Y18 |
|---|---|---|---|---|---|---|---|
| 141 | Cu | —SO$_2$NH—CH(COONa)—CH$_2$—CO—N—(CH$_2$CH$_2$OH)$_2$ | —H | —H, —H | —H, —H | —H, —H | —H, —H |
| 142 | Cu | —SO$_2$NH—C$_6$H$_4$—NHC(O)—C$_6$H$_4$—SO$_3$Li | —H | —H, —H | —H, —H | —H, —H | —H, —H |
| 143 | Cu | —CO—NH—CH$_2$—CH(OH)—CO—NH—CH(COOK)—CH$_2$CH$_2$—SO$_3$K | —H | —H, —H | —H, —H | —H, —H | —H, —H |
| 144 | Cu | —SO$_2$—CH$_2$CH$_2$CH$_2$—NH—CO—C$_6$H$_4$—CO—NH—CH(COOLi)—CH$_2$—COOLi | —H | —H, —H | —H, —H | —H, —H | —H, —H |
| 145 | Cu | —SO$_2$CH$_2$CH$_2$OCH$_2$CH$_2$OCH$_2$CH$_2$SO$_3$Li | —H | —H, —H | —H, —H | —H, —H | —H, —H |

$M—Pc(Xp_1)_m(Xp_2)_n$

In the table, introduction positions of the respective substituent groups ($X_{p1}$) and ($X_{p2}$) in β-position substituent group type are out of order.

| No. | M | Xp$_1$ | m |
|---|---|---|---|
| 146 | Cu | —SO$_2$—NH—CH$_2$—CH(CH$_3$)—SO$_3$Li | 3 |
| 147 | Cu | —SO$_2$—NH—CH$_2$—CH$_2$SO$_3$Li | 3 |
| 148 | Cu | —SO$_2$—NH—CH$_2$—CH(CH$_3$)—SO$_3$Li | 3 |

-continued

M—Pc(Xp₁)ₘ(Xp₂)ₙ
In the table, introduction positions of the respective substituent groups (Xp₁) and (Xp₂) in β-position substituent group type are out of order.

| No. | M | Xp₁ | m |
|---|---|---|---|
| 149 | Cu | —SO₂—NH—CH₂—CH(CH₃)—SO₃Li | 2 |
| 150 | Cu | —SO₂—NH—CH₂—CH₂—SO₂—NH—CH₂CH₂—COONa | 3 |
| 151 | Cu | —SO₂—NH—C₆H₄—SO₂NH—CH₂—CH(OH)—SO₃Li | 3 |
| 152 | Cu | —SO₂—CH₂—CH₂—CH(CH₃)—SO₃Li | 2.5 |
| 153 | Cu | —SO₂—CH₂—CH₂—CH(CH₃)—SO₃Na | 2 |
| 154 | Cu | —SO₂—CH₂—CH₂—CH₂—SO₃Li | 3 |
| 155 | Cu | —SO₂—CH₂—CH₂—CH₂—COOK | 2 |
| 156 | Cu | —SO₂—CH₂—CH₂—CH₂—SO₃Li | 3 |
| 157 | Cu | —SO₂—CH₂—CH₂—O—CH₂—CH₂—SO₃Li | 2 |

| No. | Xp₂ | n |
|---|---|---|
| 146 | —SO₂—NH—CH₂—CH(OH)—CH₃ | 1 |
| 147 | —SO₂—NH—CH₂—CH₂—CH₂—SO₂—NH—CH₂—CH(OH)—CH₃ | 1 |
| 148 | —SO₂NH—CH₂—CH₂—SO₂—NH—CH₂—CH₂—O—CH₂—CH₂—OH | 1 |
| 149 | —SO₂—NH—CH₂—CH₂—CH₂—CO—N(CH₂—CH₂—OH)₂ | 2 |
| 150 | —SO₂NH—CH(CH₃)—CH₂OH | 1 |
| 151 | —SO₂NH—CH₂—CH₂—O—CH₂—CH₂—OH | 1 |
| 152 | —SO₂—CH₂—CH₂—O—CH₂—CH₂—OH | 1.5 |
| 153 | —SO₂—CH₂—CH₂—CH₂—CO—N(CH₂—CH₂—OH)₂ | 2 |
| 154 | —SO₂—CH₂—CH₂—CH₂—SO₂—NH—CH₂—CH(OH)—CH₃ | 1 |
| 155 | —SO₂—CH₂—CH₂—CH₂—SO₂—NH—CH₂—CH(OH)—CH₂—COOK | 2 |
| 156 | —SO₂—CH₂—CH(OH)—CH₂—SO₃Li | 1 |
| 157 | —SO₂—CH₂—CH₂—CH₂—CO₂—CH₂—CH₂—CH(OH)—CH₂—COOK | 2 |

$$M\text{—}Pc(X_{p1})_m(X_{p2})_n$$

In the table, introduction positions of the respective substituent groups $(X_{p1})$ and $(X_{p2})$ in β-position substituent group type are out of order.

| No. | M | $X_{p1}$ | m |
|---|---|---|---|
| 158 | Cu | —SO$_2$—CH$_2$—CH(OH)—CH$_2$SO$_3$Li | 3 |
| 159 | Cu | —SO$_2$NHCH$_2$CH$_2$—SO$_3$Li | 3 |
| 160 | Cu | —SO$_2$—CH$_2$—CH$_2$—O—CH$_2$—CH$_2$—O—CH$_2$—CH$_2$—SO$_3$Na | 3 |
| 161 | Cu | —SO$_2$CH$_2$CH$_2$CH$_2$SO$_3$Li | 3 |
| 162 | Cu | —SO$_2$CH$_2$CH$_2$CH$_2$SO$_3$Li | 2 |
| 163 | Cu | —SO$_2$CH$_2$CH$_2$CH$_2$SO$_3$K | 3 |
| 164 | Cu | —SO$_2$CH$_2$CH$_2$CH$_2$SO$_3$Li | 2 |
| 165 | Cu | —CO—NH—CH$_2$—CH$_2$—SO$_3$K | 3 |
| 166 | Cu | —CO—NH—CH$_2$—CH$_2$—SO$_2$—NH—CH$_2$—CH$_2$—COONa | 3 |
| 167 | Cu | —SO$_2$(CH$_2$)$_3$SO$_2$NHCH$_2$—CH(OH)—CH$_2$CO$_2$Li | 2.5 |
| 168 | Cu | —CO$_2$—CH$_2$—CH$_2$—CH(CH$_3$)—SO$_3$Na | 2 |
| 169 | Cu | —CO$_2$—CH$_2$—CH$_2$—CH$_2$—SO$_3$Li | 3 |
| 170 | Cu | —CO$_2$—CH$_2$—CH$_2$—CH$_2$COOK | 2 |

| No. | $X_{p2}$ | n |
|---|---|---|
| 158 | —SO$_2$—CH$_2$—C$_6$H$_4$—SO$_2$NH—CH$_2$—CH(OH)—CH$_2$—OH | 1 |
| 159 | —SO$_2$—CH$_2$—CH$_2$—CH$_2$—SO$_2$—NH—CH$_2$—CH(OH)—CH$_3$ | 1 |
| 160 | —SO$_2$—CH$_2$—CH$_2$—CH$_2$—CO—NH—CH(CH$_2$—CH$_2$—COONa)—CH$_2$—COONa | 1 |
| 161 | —SO$_2$CH$_2$CH$_2$CH$_2$SO$_2$NHCH$_2$—CH(OH)—CH$_2$SO$_3$Li | 1 |
| 162 | —SO$_2$CH$_2$CH$_2$OCH$_2$CH$_2$OCH$_2$CH$_2$OH | 2 |
| 163 | —SO$_2$CH$_2$CH$_2$CH$_2$SO$_2$NH—CH(CH$_3$)—CH$_2$—OH | 1 |
| 164 | —SO$_2$CH$_2$CH$_2$CH$_2$SO$_2$N(CH$_2$CH$_2$OH)$_2$ | 2 |
| 165 | —CO—NH—CH$_2$—CH$_2$—O—CH$_2$—CH$_2$—OH | 1 |
| 166 | —CO—NH—CH$_2$—CH(OH)—CH$_3$ | 1 |
| 167 | —CO—NH—CH$_2$—CH$_2$—CH$_2$—CO—N(CH$_2$—CH$_2$—OH)$_2$ | 1.5 |
| 168 | —CO—CH$_2$—CH$_2$—CH$_2$—CO—N(CH$_2$—CH$_2$—OH)$_2$ | 2 |
| 169 | —CO$_2$—CH$_2$—CH$_2$—CH$_2$—SO$_2$—NH—CH$_2$—CH(OH)—CH$_3$ | 1 |
| 170 | —CO$_2$—CH$_2$—CH$_2$—CH$_2$—SO$_2$—NH—CH$_2$—CH(OH)—CH$_2$—COOK | 2 |

$$M-Pc(Xp_1)_m(Xp_2)_n$$

In the table, introduction positions of the respective substituent groups $(X_{p1})$ and $(X_{p2})$ in β-position substituent group type are out of order.

| No. | M | Xp$_1$ | m |
|---|---|---|---|
| 171 | Cu | —CO$_2$—CH$_2$—CH$_2$—O—CH$_2$—CH$_2$—O—CH$_2$—CH$_2$—SO$_3$Na | 3 |
| 172 | Cu | —SO$_2$CH$_2$CH$_2$OCH$_2$CH$_2$O—CH$_2$CH$_2$SO$_3$K | 2 |
| 173 | Cu | —SO$_2$(CH$_2$)$_3$SO$_2$NHCH$_2$CH(OH)CH$_2$OH | 2 |
| 174 | Cu | —SO$_2$(CH$_2$)$_3$SO$_2$NHCH$_2$—CH(OH)—CH$_2$SO$_3$K | 3 |
| 175 | Cu | —SO$_2$(CH$_2$)$_3$SO$_2$NH(CH$_2$)$_3$N(CH$_2$CH$_2$OH)$_2$ | 2 |
| 176 | Cu | —SO$_2$—CH$_2$—CH$_2$—CH$_2$—SO$_2$—NH—CH$_2$—CH(OH)—CH$_3$ | 3 |
| 177 | Cu | —SO$_2$—CH$_2$—CH$_2$—O—CH$_2$—CH$_2$—O—CH$_3$ | 2 |
| 178 | Cu | —SO$_2$—CH$_2$—CH$_2$—O—CH$_2$—CH$_2$—O—CH$_2$—CH$_2$—OH | 3 |
| 179 | Cu | —SO$_2$—CH$_2$—CH(CH$_2$CH$_3$)—CH$_2$CH$_2$—CH$_2$CH$_3$ | 2 |
| 180 | Cu | —SO$_2$—CH$_2$—CH$_2$—CH$_2$—SO$_2$—NH—CH$_2$—CH(O—CH$_3$)—CH$_3$ | 3 |
| 181 | Cu | —SO$_2$—CH$_2$—CH$_2$—CH$_2$—CO$_2$—NH—CH(CH$_3$)—CH$_2$—CH$_3$ | 3 |
| 182 | Cu | —SO$_2$—CH$_2$—CH$_2$—CH$_2$—SO$_2$NH—CH$_2$—CH(OH)—CH$_3$ | 2.5 |

| No. | Xp$_2$ | n |
|---|---|---|
| 171 | —SO$_2$—CH$_2$—C$_6$H$_4$—SO$_2$NH—CH$_2$—CH(OH)—CH$_2$—OH | 1 |
| 172 | —CO$_2$—CH$_2$—CH$_2$—CH$_2$—CO$_2$—CH$_2$—CH$_2$—CH(OH)—CH$_2$—COOK | 2 |
| 173 | —CO$_2$—CH$_2$—CH(OH)—CH$_2$—SO$_3$Li | 2 |
| 174 | —CO$_2$—CH$_2$—CH$_2$—CH$_2$—SO$_2$—NH—CH$_2$—CH(OH)—CH$_3$ | 1 |
| 175 | —CO$_2$—CH$_2$—CH$_2$—CH$_2$—CO—N(CH$_2$—CH$_2$—COOLi)(CH$_2$—COOLi) | 2 |
| 176 | —SO$_2$—CH$_2$—CH$_2$—CH$_2$—SO$_2$—NH—CH$_2$—CH(CH$_2$CH$_3$)—CH$_2$CH$_2$—CH$_2$CH$_3$ | 1 |
| 177 | —SO$_2$—CH$_2$—CH$_2$—CH$_2$—SO$_2$—NH—CH$_2$—CH(OH)—CH$_3$ | 1 |

-continued $$M\text{—}Pc(Xp_1)_m(Xp_2)_n$$
In the table, introduction positions of the respective substituent groups $(X_{p1})$ and $(X_{p2})$ in β-position substituent group type are out of order.

| No. | | | |
|---|---|---|---|
| 178 | —SO$_2$—CH$_2$—CH$_2$—CH$_2$—CO$_2$—CH$_2$—CH(CH$_2$CH$_3$)—CH$_2$CH$_2$—CH$_2$CH$_3$ | | 1 |
| 179 | —SO$_2$—CH$_2$—CH$_2$—CH$_2$—SO$_2$—NH—CH$_2$—CH(O—CH$_3$)—CH$_3$ | | 2 |
| 180 | —SO$_2$NH—CH$_2$—CH$_2$—SO$_2$NH—CH$_2$—CH$_2$—O—CH$_2$—CH$_2$—OH | | 1 |
| 181 | —SO$_2$—CH$_2$—CH$_2$—CH$_2$—SO$_2$—NH—CH—(CH$_3$)$_2$ | | 1 |
| 182 | —SO$_2$—CH$_2$—CH$_2$—CH$_2$—CO$_2$—NH—CH(CH$_3$)—CH$_2$—CH$_3$ | | 1.5 |

$$M\text{—}Pc(Xp_1)_m(Xp_2)_n$$
In the table, introduction positions of the respective substituent groups $(X_{p1})$ and $(X_{p2})$ in β-position substituent group type are out of order.

| No. | M | $Xp_1$ | m |
|---|---|---|---|
| 183 | Cu | —SO$_2$—CH$_2$—CH$_2$—CH$_2$—CO$_2$—NH—CH(CH$_3$)—CH$_2$—CH$_3$ | 2 |
| 184 | Cu | —SO$_2$—CH$_2$—CH$_2$—CH$_2$—SO$_2$—NH—CH$_2$—CH(OH)—CH$_3$ | 3 |
| 185 | Cu | —SO$_2$—CH$_2$—CH$_2$—CH$_2$—SO$_2$—NH—CH$_2$—CH(OH)—CH$_3$ | 3 |
| 186 | Cu | —SO$_2$—CH$_2$—CH$_2$—CH$_2$—CO$_2$—NH—CH(CH$_3$)—CH$_2$—CH$_3$ | 3 |
| 187 | Cu | —SO$_2$—CH$_2$—CH$_2$—CH$_2$—SO$_2$—NH—CH—(CH$_3$)$_2$ | 3 |
| 188 | Cu | —CO$_2$—CH$_2$—CH$_2$—CH$_2$—CO$_2$—NH—CH(CH$_3$)—CH$_2$—CH$_3$ | 3 |
| 189 | Cu | —CO—NH—CH$_2$—CH$_2$—SO$_2$—NH—CH—(CH$_3$)$_2$ | 3 |
| 190 | Cu | —CO—NH—CH$_2$—CH(CH$_2$CH$_3$)—CH$_2$—CH$_2$—CH$_2$CH$_3$ | 3 |

| No. | $Xp_2$ | n |
|---|---|---|
| 183 | —SO$_2$—CH$_2$—CH$_2$—CH$_2$—SO$_2$—NH—(CH$_2$)$_3$—CH$_2$—O—CH$_2$CH$_2$—OH | 2 |
| 184 | —SO$_2$—CH$_2$—CH$_2$—O—CH$_2$—CH$_2$—O—CH$_3$ | 1 |
| 185 | —SO$_2$—CH$_2$—CH$_2$—O—CH$_2$—CH$_2$—O—CH$_2$—CH$_2$—O—CH$_3$ | 1 |
| 186 | —SO$_2$—CH$_2$—CH$_2$—O—CH$_2$—CH$_2$—O—CH$_2$—CH$_2$—OH | 1 |
| 187 | —CO$_2$—CH$_2$—CH(CH$_2$CH$_3$)—CH$_2$—CH$_2$—CH$_2$CH$_3$ | 1 |
| 188 | —CO$_2$—CH$_2$—CH$_2$—O—CH$_2$—CH$_2$—O—CH$_3$ | 1 |

-continued

M—Pc(X$_{p1}$)$_m$(X$_{p2}$)$_n$
In the table, introduction positions of the respective substituent groups (X$_{p1}$) and (X$_{p2}$) in β-position substituent group type are out of order.

| 189 | —SO$_2$—NH—CH$_2$—CH(CH$_2$CH$_3$)—CH$_2$—CH$_2$—CH$_2$—CH$_3$ | 1 |
| 190 | —CO—NH—CH$_2$—CH$_2$—O—CH$_2$—CH$_2$—O—CH$_3$ | 1 |

The structure of the phthalocyanine compounds of compound Nos. 146 to 190 represented by M-Pc(X$_{p1}$)$_m$(X$_{p2}$)$_n$ is as follows

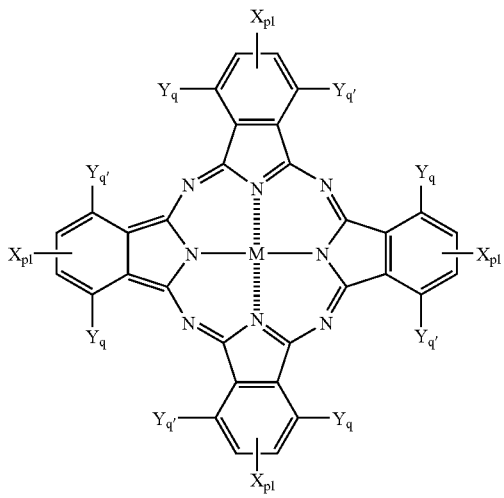

(Each independently X$_{pi}$ = X$_{p1}$ or X$_{p2}$)

The phthalocyanine dyes represented by the above-described general formula (I) can be synthesized according to the above-described patents. Furthermore, the phthalocyanine dyes represented by general formula (II) can be synthesized according to methods described in the respective descriptions of JP-A-2001-226275, JP-A-2001-96610, JP-A-2001-47013, and JP-A-2001-193638 in addition to the methods of synthesis as described above. Furthermore, starting materials, dye intermediates, and processes of synthesis are not limited to these.

[Ink]

The ink for ink jet recording of this invention (The ink also is called the ink of this invention) is prepared by dissolving or dispersing at least one of the above-described azo dyes or phthalocyanine dyes in an aqueous medium and is a magenta ink or a cyan ink containing the azo dye or phthalocyanine dye preferably in an amount of 0.2 to 20 mass percent and more preferably 0.5 to 15 mass percent.

In addition of the above-described particular azo dyes or phthalocyanine dyes relating to this invention, other dyes also can be added thereto for the purpose of adjusting color tones. Furthermore, in order to compose an ink set for full colors, a yellow ink and a black ink are used together with the inks of this invention, and the respective dyestuffs are used for the inks. Moreover, other magenta inks and cyan inks than those of this invention also can be used. Examples of the dyestuffs usable jointly include the following dyestuffs.

The yellow dyestuffs include, for example, aryl or heteryl azo dyestuffs having as coupling components phenols, naphthols, anilines, pyrazolones, pyridones, or open-chain type active methylene compounds; for example, azo methine dyestuffs having open-chain type active methylene compounds as coupling components; for example, methine dyestuffs such as benzylidene dyestuff or monomethineoxonol dyestuff; and for example, quinone-series dyestuffs such as naphthoquinone dyestuff or anthraquinone dyestuff; and as other dyestuff species, quinophthalone dyestuffs, nitro and nitroso dyestuffs, acrydine dyestuffs, acrydinone dyestuffs, and the like. These dyestuffs may be those assuming a yellow color for the first time by dissociating a part of the chromophore and in this case, the counter cations may be inorganic cations such as alkali metal ion or ammonium ion, organic cations such as pyridinium ion or quaternary ammonium ion, or moreover, polymer cations containing these cations in partial structures.

The magenta dyestuffs include, for example, aryl or heteryl azo dyestuffs having phenols, naphthols, or anilines as coupling components; for example, azo methine dyestuffs having pyrazolones or pyrazolotriazoles as coupling components; for example, methine dyestuffs such as arylidene dyestuff, styryl dyestuff, merocyanine dyestuff, or oxonol dyestuff; carbonium dyestuffs such as diphenylmethane dyestuff, triphenylmethane dyestuff, or xanthene dyestuff; for example, quinone dyestuffs such as naphthoquinone, anthraquinone, or anthrapyridone; and for example, condensed polycyclic dyestuffs such as dioxazine dyestuff. These dyestuffs may be those assuming a magenta color for the first time by dissociating a part of the chromophore and in this case, the counter cations may be inorganic cations such as alkali metal ion or ammonium ion, organic cations such as pyridinium ion or quaternary ammonium ion, or moreover polymer cations containing these cations in partial structures.

The cyan dyestuffs include, for example, azomethine dyestuffs such as indoaniline dyestuff or indophenol dyestuff; polymethine dyestuffs such as cyanine dyestuff, oxonol dyestuff, or merocyanine dyestuff; carbonium dyestuffs such as diphenylmethane dyestuff, triphenylmethane dyestuff, or xanthene dyestuff; phthalocyanine dyestuffs; anthraquinone dyestuffs; aryl or heteryl azo dyestuffs having, for example, phenols, naphthols, or anilines as coupling components, and indigo and thioindigo dyestuffs. These dyestuffs may be those assuming a cyan color for the first time by dissociating a part of the chromophore and in this case, the counter ions may be inorganic cations such as alkali metal ion or ammonium ion, inorganic cations such as pyridinium ion or quaternary ammonium ion, and moreover polymer cations containing these cations in partial structures.

Furthermore, black dyestuffs such as polyazo dyestuff also can be used.

Other water-soluble dyes include a direct cotton dye, an acid dye, a food dye, a basic dye, a reactive dye, and the like. Preferred dyes include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, and 247;

C.I. Direct violet 7, 9, 47, 48, 51, 66, 90, 93, 94, 95, 98, 100, and 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288 289, and 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397;

C.I. Acid Violet 5, 34, 43, 47, 48, 90, 103, and 126;

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 271, 277, 278, 279, 280, 288, 290, and 326;

C.I. Acid Black 7, 24, 29, 48, 52:1, and 172;

C.I. Reactive Red 3, 13, 17, 19, 21, 22, 23, 24, 29, 35, 37, 40, 41, 43, 45, 49, and 55;

C.I. Reactive Violet 1, 3, 4, 5, 6, 7, 8, 9, 16, 17, 22, 23, 24, 26, 27, 33, and 34;

C.I. Reactive Yellow 2, 3, 13, 14, 15, 17, 18, 23, 24, 25, 26, 27, 29, 35, 37, 41, and 42;

C.I. Reactive Blue 2, 3, 5, 8, 10, 13, 14, 15, 17, 18, 19, 21, 25, 26, 27, 28, 29, and 38;

C.I. Reactive Black 4, 5, 8, 14, 21, 23, 26, 31, 32, and 34;

C.I. Basic Red 12, 13, 14, 15, 18, 22, 23, 24, 25, 27, 29, 35, 36, 38, 39, 45, and 46;

C.I. Basic Violet 1, 2, 3, 7, 10, 15, 16, 20, 21, 25, 27, 28, 35, 37, 39, 40, and 48;

C.I. Basic Yellow 1, 2, 4, 11, 13, 14, 15, 19, 21, 23, 24, 25, 28, 29, 32, 36, 39, and 40;

C.I. Basic Blue 1, 3, 5, 7, 9, 22, 26, 41, 45, 46, 47, 54, 57, 60, 62, 65, 66, 69, and 71; and C.I. Basic Black 8, and the like.

The dyestuffs including the azo dyes or the phthalocyanine dyes used in this invention are substantially water-soluble or water-dispersible. Specifically, the water solubility of the dyestuffs including the respective dyes is preferably 2 mass percent or more and more preferably 5 mass percent or more at 20° C.

Furthermore, pigment also can be simultaneously used for the inks of this invention and other inks used in combination with these inks for an ink set.

Pigments used in this invention include pigments on the market and further known pigments described in various literatures. As the literatures, there are "Color Index" (edited by The Society of Dyers and Colourists), "*Kaiteishinpan Ganryo Binran*" (edited by Nippon Ganryo Gijutsu kyokai, 1989), "*Saishin Ganryo Oyo Gijutsu*" (published by CMC Shuppan, 1986), "*Insatsu Inki Gijutsu*" (edited by CMC Shuppan, 1984), W. Herbst and K. Hunger, "Industrial Organic Pigments" (VCH Verlagsgesellschaft, 1993), and the like. Specifically, the pigments include, as organic pigments, azo pigments (azo lake pigment, insoluble azo pigment, condensed azo pigment, and chelated azo pigment), polycyclic pigments (phthalocyanine pigment, anthraquinone pigment, perylene and perynone pigment, indigo pigment, quinacridone pigment, dioxazine pigment, isoindolinone pigment, quinophthalone pigment, diketopyrrolopyrrole pigment, etc.), in-mold decorating lake pigments (lake pigment of acid or basic dye), azine pigments, and the like, and as inorganic pigments, C.I. Pigment Yellow 34, 37, 42, 53, etc. as yellow pigments, C.I. Pigment Red 101, 108, etc. as red pigments, C.I. Pigment Blue 27, 29, 17:1, etc. as blue pigments, C.I. Pigment Black 7, magnetite, etc. as black pigments, and C.I. Pigment White 4, 6, 18, 21, etc. as white pigments.

Pigments having color tones desirable for image formation include preferably, as blue or cyan pigments, phthalocyanine pigments, anthraquinone-series indanthrone pigments (e.g., C.I. Pigment Blue 60, etc.), and in-mold decorating lake pigment-series triarylcarbonium pigments and particularly, most preferably the phthalocyanine pigments (as preferable examples, copper phthalocyanine such as C.I. Pigment Blue 15:1, 15:2, 15:3, 15:4, 15:6, monochloro or lowly chlorinated copper phthalocyanine, pigments described in European Patent No. 860,475 as aluminum phthalocyanine, non-metallic phthalocyanine of C.I. Pigment Blue 16, phthalocyanines containing Zn, Ni, or Ti as central metal, and of these, C.I. Pigment Blue 15:3 and 15:4, and the aluminum phthalocyanine) are most preferred.

Red or violet pigments used preferably are azo pigments (as preferred examples, C.I. Pigment Red 3, 5, 11, 22, 38, 48:1, 48:2, 48:3, 48:4, 49:1, 52:1, 53:1, 57:1, 63:2, 144, 146, 184, etc. and of these, preferably C.I. Pigment Red 57:1, 146, and 184), quinacridone pigments (as preferred examples, C.I. Pigment Red 122, 192, 202, 207, and 209, C.I. Pigment Violet 19 and 42 and of these, preferably C.I. Pigment Red 122), in-mold decorating lake pigment-series triarylcarbonium pigments (as preferred examples, xanthene-series C.I. Pigment Red 81:1 and C.I. Pigment Violet 1, 2, 3, 27, and 39), dioxazine-series pigments (for example, C.I. Pigment Violet 23 and 37), diketopyrrolopyrrole pigments (for example, C.I. Pigment Red 254), perylene pigments (for example, C.I. Pigment Violet 29), anthraquinone pigments (for example, C.I. Pigment Violet 5:1, 31, and 33), and thioindigo-series pigments (for example, C.I. Pigment Red 38 and 88).

Yellow pigments used preferably are azo pigments (as preferred examples, monoazo pigment-series C.I. Pigment Yellow 1, 3, 74, and 98, disazo pigment-series C.I. Pigment Yellow 12, 13, 14, 16, 17, and 83, combined azo-series C.I. Pigment Yellow 93, 94, 95, 128, and 155, benzimidazolone-series C.I. Pigment Yellow 120, 151, 154, 156, 180, etc. and of these, preferably those prepared from benzidine-series compounds as starting materials), isoindoline and isoindolinone-series pigments (as preferred examples, C.I. Pigment Yellow 109, 110, 137, 139, etc.), quinophthalone pigments (as preferred examples, C.I. Pigment Yellow 138, etc.), and flavanthrone pigments (for example, C.I. Pigment Yellow 24, etc.).

Preferred black pigments include inorganic pigments (as preferred examples, carbon black and magnetite) and aniline black.

Furthermore, orange pigments (C.I. Pigment Orange 13, 16, etc.) or green pigments (C.I. Pigment Green 7, etc.) also can be used.

The pigments used in this technique may be the aforesaid bare pigments or may be pigments having undergone a surface treatment. Methods of the surface treatment include a method of coating surface with a resin or a wax, a method of allowing a surfactant to adhere, and a method of allowing a reactive substance (e.g., silane coupling agents, epoxy compounds, radicals generated from polyisocyanate or diazonium salt, etc.) to bond to the surface of pigment, which are described in the following literatures.

(1) *Kinzokusekken-no-seisitsu to Oyo* (Saiwai Shobo)
(2) *Insatsu-inki Insatsu* (CMC Shuppan, 1984)
(3) *Saishin Ganryo Oyo Gijutsu* (CMC Shuppan, 1986)
(4) U.S. Pat. Nos. 5,554,739 and 5,571,311
(5) JP-A-9-151342, JP-A-10-140065, JP-A-10-292143, and JP-A-11-166145

Particularly, self-dispersible pigments prepared by acting diazonium salts on carbon black as described in the US patents of the above (4) and encapsulated pigments prepared according to methods of the Japanese Patents of the above (5) are particularly effective because dispersion stability is obtained without using an excess dispersant in ink.

In this invention, the pigments can be further dispersed by use of a dispersant. Various known dispersants, for example, low molecular dispersants of surfactant type or high molecule-type dispersants, can be used according to pigments used. Examples of the dispersants include those described in JP-A-3-69949, European Patent No. 549,486, and the like. When a dispersant is used, a pigment derivative called a synergist may be added to promote the adsorption of the dispersant on pigment.

The particle size of pigments usable in this invention is preferably in the range of from 0.01 to 10 μm and further preferably from 0.05 to 1 μm after dispersion.

Known techniques for dispersion used in the preparation of ink or the preparation of toner can be used as methods for dispersing the pigment. Dispersing machines includes a vertical or horizontal agitator mill, an attritor, a colloid mill, a ball mill, a triple roll mill, a pearl mill, a super mill, an impeller, a disperser, a KD mill, a dynatron, a pressure kneader, and the like. Details are described in "*Saishin Ganryo Oyo Gijutsu*" (CMC Shuppan, 1986).

The ink of this invention is further characterized by containing at least one selected from compounds represented by the following general formula (A) and compounds represented by the following general formula (B).

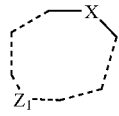

General formula (A)

In the formula, X represents a group containing carbonyl or a heteroatom. $Z_1$ represents a group of atoms that can form a cyclic organic substance.

General Formula (B)

$X^1$—Y-Z

In the formula, $X^1$ represents a group shown by —$N(Q_1)$-$Q_2$. Z represents a group shown by —$N(Q_1)$-$Q_2$ or a group shown by —O-$Q_3$. Y represents a group shown by —W-$(G)_k$-$(H)_n$—. Herein, W and H represent a group shown by —CO—, —$SO_2$—, or —$PO(Q_4)$—. G represents a divalent connecting group. $Q_1$ to $Q_4$ represent any of a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group, and a heteroarylamino group. X and Z may combine with each other to form a ring. k and n represent 0 or 1, respectively.

In general formula (A), X represents a group containing carbonyl or a heteroatom.

Examples of X include a carbonyl group, an oxycarbonyl group, a carbonic ester group, an amido group, an urethane group, an ureido group, an amino group, an imino group, an ether group, a thioether group, a phosphoric acid derivative group, a phosphonic acid derivative group, a sulfonyl group, a sulfonamido group, a sulfonylurea group, and the like, and of these, the amido group is preferred.

$Z_1$ represents a group of atoms that can form a cyclic organic substance. Although $Z_1$ may be a ring formed solely by carbon atoms, $Z_1$ may further contain a heteroatom in a ring of carbon atoms. The ring may have or may not have aromaticity. Furthermore, the ring may form a compound condensed with a plurality of rings.

The compounds represented by general formula (A) can have various substituent groups in structures. Examples of the substituent groups include an alkyl group (that has preferably a carbon number of one to 20, more preferably a carbon number of one to 12, and particularly preferably a carbon number of one to eight and includes, for example, methyl, ethyl, isopropyl, tert-butyl, n-octyl, n-decyl, n-hexadecyl, cyclopropyl, cyclopentyl, cyclohexyl, etc.), an alkyenyl group (that has preferably a carbon number of two to 20, more preferably a carbon number of two to 12, and particularly preferably a carbon number of two to eight and includes, for example, vinyl, allyl, 2-butenyl, 3-pentenyl, etc.), an alkynyl group (that has preferably a carbon number of two to 20, more preferably a carbon number of two to 12, and particularly preferably a carbon number of two to eight and includes, for example, propargyl, 3-pentinyl, etc.), an aryl group (that has preferably a carbon number of six to 30, more preferably a carbon number of six to 20, and particularly preferably a carbon number of six to 12 and includes, for example, phenyl, p-methylphenyl, naphthyl, etc.), an amino group (that has preferably a carbon number of zero to 20, more preferably a carbon number of zero to 12, and particularly preferably a carbon number of zero to six and includes, for example, amino, methylamino, dimethylamino, diethylamino, diphenylamino, dibenzylamino, etc.), an alkoxy group (that has preferably a carbon number of one to 20, more preferably a carbon number of one to 12, and particularly preferably a carbon number of one to eight and includes, for example, methoxy, ethoxy, butoxy, etc.), an aryloxy group (that has preferably a carbon number of six to 20, more preferably a carbon number of six to 16, and particularly preferably a carbon number of six to 12 and includes, for example, phenyloxy, 2-naphthyloxy, etc.), an acyl group (that has preferably a carbon number of one to 20, more preferably a carbon number of one to 16, and particularly preferably a carbon number of one to 12 and includes, for example, acetyl, benzoyl, formyl, pivaloyl, etc.), an alkoxycarbonyl group (that has a carbon number of two to 20, more preferably a carbon number of two to 16, and particularly preferably a carbon number of two to 12 and includes, for example, methoxycarbonyl, ethoxycarbonyl, etc.), an aryloxycarbonyl group (that has preferably a carbon number of seven to 20, more preferably a carbon number of seven to 16, and particularly preferably a carbon number of seven to 10 and includes for example, phenyloxylcarbonyl, etc.), an acyloxy group (that has preferably a carbon number of two to 20, more preferably a carbon number of two to 16, and particularly preferably a carbon number of two to 10 and includes, for example, acetoxy, benzoyloxy, etc.), an acylamino group (that has preferably a carbon number of two to 20, more preferably a carbon number of two to 16, and particularly preferably a carbon number of two to 10 and includes, for example, acetylamino, benzoylamino, etc.), an alkoxycarbonylamino group (that has preferably a carbon number of two to 20, more preferably a carbon number of two to 16, and particularly preferably a carbon number of two to 12 and includes, for example, methoxycarbonylamino, etc.), an aryloxycarbonylamino group (that has preferably a carbon number of seven to 20, more preferably a carbon number of seven to 16, and particularly preferably a carbon number of seven to 12 and includes, for example, phenyloxycarbonylamino, etc.), a sulfonylamino group (that has preferably a carbon number of one to 20, more preferably a carbon number of one to 16, and particularly preferably a carbon number of one to 12 and includes, for example, methylsulfonylamino, phenylsulfonylamino, etc.), a sulfamoyl group (that has preferably a carbon number of zero to 20, more preferably a carbon number of zero to 16, and particularly preferably a carbon number of zero to 12 and includes, for example, sulfamoyl, methylsulfamoyl, dimethylsulfamoyl, phenylsulfamoyl, etc.), a carbamoyl group (that has preferably a carbon number of one to 20, more preferably a carbon number of one to 16, and particularly preferably a carbon number of one to 12 and includes, for example, carbamoyl, methylcarbamoyl, diethylcarbamoyl, phenylcarbamoyl, etc.), an alkylthio group (that has preferably a carbon number of one to 20, more preferably a carbon number of one to 16, and particularly preferably a carbon number of one to 12 and includes, for example, methylthio, ethylthio, etc.), an arylthio (that has preferably a carbon number of six to 20, more preferably a carbon number of six to 16, and particularly preferably a carbon number of six to 12 and includes, for example, phenylthio, etc.), a sulfonyl group (that has preferably a carbon number of one to 20, more preferably a carbon number of one to 16, and particularly preferably a carbon number of one to 12 and includes, for example, mesyl, tosyl, etc.), a sulfinyl group (that has preferably a carbon number of one to 20, more preferably a carbon number of one to 16, and particularly preferably a carbon number of one to 12 and includes, for example, methylsufinyl, phenylsulfinyl, etc.), an ureido group (that has preferably a carbon number of one to 20, more preferably a carbon number of one to 16, and particularly preferably a carbon number of one to 12 and includes, for example, ureido, methylureido, phenylureido, etc), a phosphoric amido group (that has preferably a carbon number of one to 20, more preferably a carbon number of one to 16, and particularly preferably a carbon number of one to 12 and includes, for example, diethyl phosphoric amido, phenyl phosphoric amido, etc.), a hydroxy group, a mercapto group, a halogen atom (e.g., fluorine atom, chlorine atom, bromine atom, and iodine atom), a cyano group, a sulfo group, a carboxyl group, a nitro group, a hydroxamic acid group, a sulfino group, a hydrazino group, an imino group, a heterocyclic group (that has preferably a carbon number of one to 30 and more preferably a carbon number of one to 12 and includes those containing, for example, a nitrogen atom, an oxygen atom, or a sulfur atom as a heteroatom, and specifically, imidazolyl, pyridyl, quinolyl, furyl, thienyl, piperidyl, morpholino, benzoxazolyl, benzimidazolyl, benzothiazolyl, carbazolyl, azepinyl, etc.), and a silyl group (that has preferably a carbon number of three to 40, more preferably a carbon number of three to 30, and particularly preferably a carbon number of three to 24 and includes, for example, trimethylsilyl, triphenylsilyl, etc.), and the like. These substituent groups may be further substituted. When there exist two or more substituent groups, the substituent groups may be the same or different from each other. Furthermore, if possible, the substituent groups may combine with each other to form a ring.

The compounds represented by general formula (A) are preferably monocyclic and preferably liquid under the conditions of ordinary temperatures and normal pressures. Furthermore, although the various compounds of oil-soluble structure or water-soluble structure can be used, water-soluble compounds are preferred.

As shown below, compounds used preferably as the compounds represented by general formula (A) include cyclohexanone, cyclopentanone, ethylene carbonate, γ-butyrolactone, propylene carbonate, 2-pyrrolidone, ε-caprolactam, tetrahydrofuran, 1,4-dioxane, 1,3-dimethylimidazolidinone, N-methylpyrrolidone, ethylene urea, sulfolane, pyridine, pyrazine, morpholine, 1-methyl-2-pyrridone, 2-methyl-2-oxazoline, 2-ethyl-2-oxazoline, 2,4,4-trimethyl-2-oxazoline, and the like, but it is a matter of course that this invention is not limited by these.

The amount of the compounds represented by general formula (A) can be used in a wide range, preferably from 0.001 to 50 mass percent and particularly preferably from 0.1 to 10 mass percent of ink.

Subsequently, the compounds represented by general formula (B) are illustrated.

$$X^1-Y-Z$$

In the compounds represented by general formula (B), $X^1$ represents a group shown by $-N(Q_1)-Q_2$. Z represents a group shown by $-N(Q_1)-Q_2$ or a group shown by $-O-Q_3$. Y represents a group shown by $-W-(G)_k-(H)_n-$.

Herein, W and H represent $-CO-$, $-SO_2-$, and $-PO(Q_4)-$ and preferably the carbonyl group or the sulfonyl group.

G represents a divalent connecting group. The divalent connecting group preferably includes an alkylene group, an alkenylene group, an alkynylene group, an arylene group, an ether group, an imino group, an alkylimino group, a thioether group, a group represented by -V- (V represents a heterocycle), and the like.

The alkylene group that G represents has preferably a carbon number of one to 20 and include, for example, a methylene group, an ethylene group, a 1,3-propylene group, a 1,2-propylene group, a 1,4-butylene group, a 1,6-hexylene group, a 1,8-octylene group, and the like.

The alkenylene group has preferably a carbon number of one to 20 and includes, for example, a vinylene group and the like.

The arylene group has preferably a carbon number of one to 20 and include, for example, a 1,2-phenylene group, a 1,3-phenylene group, a 1,4-phenylene group, a 1,8-naphthylene group, a 1,5-naphthylene group, a 2,6-naphthylene group, and the like.

The ether group, the imino group, the alkylimino group, the thioether group, the group represented by -V- (V represents a heterocycle), and the like are included.

$Q_1$ to $Q_4$ represent any of a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group, and a heteroarylamino group.

The alkyl group that $Q_1$ to $Q_4$ represent has preferably a carbon number of one to 30 and more preferably a carbon number of one to 15 and includes, for example, a methyl group, a t-butyl group, a cyclohexyl group, and the like.

The alkenyl group has preferably a carbon number of two to 30 and more preferably a carbon number of two to 15. Examples of the alkenyl group include a vinyl group, a 1-propenyl group, a 1-buten-2-yl group, a cyclohexen-1-yl, and the like.

The alkynyl group has preferably a carbon number of two to 30 and more preferably a carbon number of two to 15, and examples thereof include an ethynyl group, a 1-propynyl group, and the like.

The aryl group has preferably a carbon number of six to 30 and more preferably a carbon number of six to 15, and examples thereof include a phenyl group, a tolyl group, a xylyl group, a naphthyl group, a biphenylyl group, a pyrenyl group, and the like.

The heterocyclic group and the heteroaryl group are preferably of a five or six-membered ring and may be condensed with other rings. The heteroatom includes, for example, a nitrogen atom, an oxygen atom, and a sulfur atom. These groups have preferably a carbon number of two to 30 and more preferably a carbon number of two to 15. Examples of these groups include a pyridyl group, a piperidyl group, an oxazolyl group, an oxadiazolyl group, a tetrahydrofuryl group, a thienyl group, and the like.

The alkoxy group has preferably a carbon number of one to 30 and more preferably a carbon number of one to 15. Examples of the group include a methoxy group, an ethoxy group, a cyclohexyloxy group, and the like.

The aryloxy group has preferably a carbon number of six to 30 and more preferably a carbon number of six to 15. Examples of the group include a phenoxy group, a 1-naphthoxy group, a 4-phenylphenoxy group, and the like.

Examples of heterocycles in the heterocyclic oxy group, the heteroaryloxy group, the heterocyclic amino group, and a heteroarylamino group are similar to those as described above.

The amino groups in the alkylamino group, the arylamino group, the heterocyclic amino group, and the heteroarylamino group can be either of primary and secondary amino groups.

The respective groups of these G and $Q_1$ to $Q_2$ can have substituent groups in the case where substitution is possible, and examples of the substituent groups include a halogen atom, a cyano group, a formyl group, an alkyl group, an alkenyl group, an alkynyl group, an aryl group, a heterocyclic group, primary to tertiary amino groups, an imino group, an alkoxy group, an aryloxy group, an alkylthio group, an arylthio group, a carbonamido group, a sulfonamido group, a carbamoyl group, a sulfamoyl group, an alkylcarbonyl group, an arylcarbonyl group, an alkylsulfonyl group, an arylsulfonyl group, an alkoxycarbonyl group, an aryloxycarbonyl group, an alkylcarbonyloxy group, an arylcarbonyloxy group, an urethane group, an ureido group, and a carbonic ester group. Of these, the alkyl group, the aryl group, the alkoxy group, and the aryloxy group are preferred, and the alkyl group and aryl group are particularly preferred.

When the substituent group is the halogen atom, the halogen atom is preferably a fluorine atom, a chlorine atom, a bromine atom, and an iodine atom.

When the substituent group is the alkyl group, the alkyl group has preferably a carbon number of one to 30 and more preferably a carbon number of one to 15. Examples of the alkyl group include a methyl group, a t-butyl group, a cyclohexyl group, and the like.

The alkenyl group has preferably a carbon number of two to 30 and more preferably a carbon number of two to 15, and examples thereof include a vinyl group, a 1-propenyl group, a 1-buten-2-yl group, a cyclohexen-1-yl, and the like.

The alkynyl group has preferably a carbon number of two to 30 and more preferably a carbon number of two to 15, and examples thereof include an ethynyl group, a 1-propynyl group, and the like.

The aryl group has preferably a carbon number of six to 30 and more preferably a carbon number of six to 15, and examples thereof include a phenyl group, a tolyl group, a xylyl group, a naphthyl group, a biphenylyl group, a pyrenyl group, and the like.

The heterocyclic group is preferably of a five or six-membered ring and may be condensed with other rings. The heteroatom includes, for example, a nitrogen atom, an oxygen atom, and a sulfur atom. The heterocyclic group has preferably a carbon number of two to 30 and more preferably a carbon number of two to 15, and examples thereof include a pyridyl group, a piperidyl group, an oxazolyl group, an oxadiazolyl group, a tetrahydrofuryl group, a thienyl group, and the like.

The primary to tertiary amino groups include an amino group, an alkylamino group, an arylamino group, a dialkylamino group, diarylamino group, an alkylarylamino group, a heterocyclic amino group, a bisheterocyclic amino group, and the like, a tertiary amino group is preferred, the amino groups have preferably a carbon number of one to 30 and more preferably a carbon number of one to 16, and examples thereof include a dimehylamino group, a diphenylamino group, a phenylnaphthylamino group, and the like.

The imino group is a group represented by —$CR_{11}$=$NR_{12}$ or —N=$CR_{13}R_{14}$ and herein, $R_{11}$ to $R_{14}$ are hydrogen atoms or groups selected from an alkyl group, an aryl group, a heterocyclic group, an alkoxy group, an aryloxy group, and primary to tertiary amino groups. The imino group has preferably a carbon number of one to 30 and more preferably a carbon number of one to 15.

The alkoxy group has preferably a carbon number of one to 30 and more preferably a carbon number of one to 15, and examples thereof include a methoxy group, an ethoxy group, a cyclohexyloxy group, and the like.

The aryloxy group has preferably a carbon number of six to 30 and more preferably a carbon number of six to 15, and examples thereof include a phenoxy group, a 1-naphthoxy group, a 4-phenylphenoxy group, and the like.

The alkylthio group has preferably a carbon number of one to 30 and more preferably a carbon number of one to 15, and examples thereof include a methythio group, an ethylthio group, a cyclohexylthio group, and the like.

The arylthio group has preferably a carbon number of six to 30 and more preferably a carbon number of six to 15, and examples thereof include a phenylthio group, a tolylthio group, and the like.

The carbonamido group has preferably a carbon number of one to 30 and more preferably a carbon number of one to 15, and examples thereof include an acetamido group, a benzoylamido group, an N-methylbenzoylamido group, and the like.

The sulfonamido group has preferably a carbon number of one to 30 and more preferably a carbon number of one to 15, and examples thereof include a methanesulfonamido group, a benzenesulfonamido group, p-toluenesulfonamido group, and the like.

The carbamoyl group has preferably a carbon number of one to 30 and more preferably a carbon number of one to 15. Examples of the carbamoyl group include an unsubstituted carbamoyl group, a methylcarbamoyl group, a dimethylcarbamoyl group, a phenylcarbamoyl group, a diphenylcarbamoyl group, a dioctylcarbamoyl group, and the like.

The sulfamoyl group has preferably a carbon number of one to 30 and more preferably a carbon number of one to 15, and examples thereof include an unsubstituted sulfamoyl group, a methylsulfamoyl group, a dimethylsulfamoyl group, a phenylsulfamoyl group, a diphenylsulfamoyl group, a dioctylsulfamoyl group, and the like.

The alkylcarbonyl group has preferably a carbon number of one to 30 and more preferably a carbon number of one to 15, and examples thereof include an acetyl group, a propionyl group, a butyroyl group, a lauroyl group, and the like.

The arylcarbonyl group has preferably a carbon number of six to 30 and more preferably a carbon number of six to 15, and examples thereof include a benzoyl group, a naphthoyl group, and the like.

The alkylsulfonyl group has preferably a carbon number of one to 30 and more preferably a carbon number of one to 15, and examples thereof include a methanesulfonyl group, an ethanesulfonyl group, and the like.

The arylsulfonyl group has preferably a carbon number of six to 30 and more preferably a carbon number of six to 15, and examples thereof include a benzenesulfonyl group, a p-toluenesulfonyl group, a 1-naphthalenesulfonyl group, and the like.

The alkoxycarbonyl group has preferably a carbon number of one to 30 and more preferably a carbon number of one to 15, and examples thereof include a methoxycarbonyl group, an ethoxycarbonyl group, a butoxycarbonyl group, and the like.

The aryloxycarbonyl group has preferably a carbon number of six to 30 and more preferably a carbon number of six to 15, and examples thereof include a phenoxycarbonyl group, a 1-naphthoxycarbonyl group, and the like.

The alkylcarbonyloxy group has preferably a carbon number of one to 30 and more preferably a carbon number of one to 15, and examples thereof include an acetoxy group, a propionyloxy group, a butyroyloxy group, and the like.

The arylcarbonyloxy group has preferably a carbon number of six to 30 and more preferably a carbon number of six to 15, and examples thereof include a benzoyloxy group, a 1-naphthoyloxy group, and the like.

The urethane group has preferably a carbon number of one to 30 and more preferably a carbon number of one to 15, and examples thereof include a methoxycarbonamido group, a phenoxycarbonamido group, a methylaminocarbonamido group, and the like.

The ureido group has preferably a carbon number of one to 30 and more preferably a carbon number of one to 15, and examples thereof include a methylaminocarbonamido group, a dimethylaminocarbonamido group, a diphenylaminocarbonamido group, and the like.

The carbonic ester group has preferably a carbon number of one to 30 and more preferably a carbon number of one to 15, and examples thereof include a methoxycarbonyloxy group, a phenoxycarbonyloxy group, and the like.

Of these substituent groups, the alkyl group, the aryl group, the alkoxy group, and the aryloxy group are preferred and the alkyl group and the aryl group are particularly preferred.

$X^1$ and Z are preferably hydrogen atoms or amino groups substituted by alkyl groups. $X^1$ and Z may combine with each other to form a ring. k and n represent zero or one, respectively, and preferably zero.

An amount of the compound represented by general formula (B) may be preferably used in a wide range, but is preferably from 0.1 to 80 mass percent and more preferably from one to 50 mass percent of ink.

Although specific examples of the compound represented by general formula (B) are shown below, it is a matter of course that this invention is not to be construed as limited by these examples.

(Specific Examples)
Urea
Methylurea
N,N'-Dimethylurea
Tetramethylurea
Ethylurea
Tetraethylurea
Ethyleneurea
Imidazolidinone
Sulfonylurea
Oxamide
Hexamethylphosphotriamide (HMPA)
Oxazolidinone
4-Isopropyloxazolidinone
2-Methyl-2-oxazoline
2-Ethyl-2-oxazoline
Hydroxyurea
Tetrahydro-2-pyrimidone
Semicarbazide
Biuret
Glycoluril
Hydantoin
1-Methylhydantoin
5,5-Dimethylhydantoin
5-Hydantoin acetate
Allantoin
Parabanic acid
Urazol
4-Methylurazol
5,6-Dihydrouracil
Barbituric acid
1,3-Dimethylbarbituric acid
Dimethyloxamide
Malondiamide
Succinamide
Adipamide
Sebacic amide
Fumaramide
2-Oxazolidone
3-Methyl-2-oxazolidinone
2,5-Oxazolidinedione It is preferable that the ink for ink jet recording of this invention contains a surfactant, thereby to adjust liquid properties of the ink, improving discharge stability of the ink and exerting an excellent effect on improvement in water resistance of image and prevention of the printed ink from blurring.

Examples of the surfactant include an anionic surfactant such as sodium dodecyl sulfate, sodium dodecyloxysulfonate, and sodium alkylbenzenesulfonate, a cationic surfactant such as cetylpyridinium chloride, trimethylcetylammonium chloride, and tetrabutylammonium chloride, and a nonionic surfactant such as polyoxyethylene nonylphenyl ether, polyoxyethylene naphthyl ether, and polyoxyethylene octylphenyl ether. Of these, the nonionic surfactants are particularly preferably used.

The content of the surfactant in ink is from 0.001 to 15 mass percent, preferably from 0.005 to 10 mass percent, and more preferably from 0.01 to 5 mass percent.

The ink for ink jet recording of this invention can be prepared by dissolving and/or dispersing the above-described azo dye or phthalocyanine dye and surfactant in an aqueous medium. In this invention, the "aqueous medium" means water or a mixture of water and a small amount of a water-miscible organic solvent to which additives such as wetting agent or stabilizer are added as needed.

Examples of the water-miscible organic solvent usable in this invention include alcohols (e.g., methanol, ethanol, propanol, isopropanol, butanol, isobutanol, sec-butanol, t-butanol, pentanol, hexanol, cyclohexanol, and benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, trietylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone) Two or more of the above-described water-miscible organic solvents can be jointly used.

In the preparation of the ink of this invention, in the case of a water-soluble ink, first, it is preferably dissolved in water. Then, various solvents and additives are added, dissolved, and mixed to make a uniform ink liquid.

As methods of dissolution, various methods can be used, including dissolution by agitation, dissolution by irradiation with an ultrasonic wave, and dissolution by shaking. Of these, the method of agitation is particularly preferably used. When the agitation is carried out, in this field, various agitation systems such as agitation where shearing force is utilized with the aid of known fluid agitation, a contrarotating agitator, or a dissolver can be used. On the other hand, a method of agitation where shearing force to the bottom surface of a vessel is utilized like a magnetic stirrer also is preferably utilized.

When the above-described azo dyes or phthalocyanine dyes are oil-soluble dyes, the uniform ink liquid can be prepared by dissolving the oil-soluble dye in a high boiling organic solvent and then emulsifying and dispersing the resulting solution in an aqueous medium.

The boiling points of high boiling organic solvents used in this invention are 150° C. or higher and preferably 170° C. or higher.

Examples of such high boiling organic solvents include phthalic esters (e.g., dibutyl phthalate, dioctyl phthalate, dicyclohexyl phthalate, di-2-ethylhexyl phthalate, decyl phthalate, bis(2,4-di-tert-amylphenyl)isophthalate, and bis (1,1-diethylpropyl) phthalate), esters of phosphoric acid or phosphonic acid (e.g., diphenyl phosphate, triphenyl phosphate, tricresyl phosphate, 2-ethylhexyl diphenyl phosphate, dioctyl butyl phosphate, tricyclohexyl phosphate, tri-2-ethylhexyl phosphate, tridodecyl phosphate, and di-2-ethylhexyl phenyl phosphate), benzoic esters (e.g., 2-ethylhexylbenzoate, 2,4-dichlorobenzoate, dodecylbenzoate, and 2-ethylhexyl p-hydroxybenzoate), amides (e.g., N,N-diethyldodecaneamide and N,N-diethyllaurylamide), alcohols or phenols (isostearyl alcohol, 2,4-di-tert-amylphenol, etc.), aliphatic acid esters (e.g., dibutoxyethyl succinate, di-2-ethylhexyl succinate, 2-hexyldecyl tetradecanoate, tributyl citrate, diethyl azelate, isostearyl lactate, and trioctyl citrate), aniline derivatives (N,N-dibutyl-2-butoxy-5-tert-octylaniline, etc.), chlorinated paraffins (paraffins having chlorine contents of 10 to 80 percent), trimesic esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, and 4-(4-dodecyloxyphenylsulfonyl)phenol), carboxylic acids (e.g., 2-(2,4-di-tert-amylphenoxybutyric acid and 2-ethoxyoctanedecanoic acid), alkyl phosphates (e.g., di-(2-ethylhexyl)phosphate and diphenyl phosphate), and the like. The mass ratio of the high-boiling organic solvents used to the oil-soluble dyes is from 0.01 to 3 and preferably from 0.01 to 1.0.

These high boiling organic solvents can be used singly or as mixtures of some solvents [e.g., tricresyl phosphate and dibutyl phthalate, trioctyl phosphate and di(2-ethylhexyl) sebacate, and dibutyl phthalate and poly(N-t-butylacrylamide)].

Other compounds than the compounds as described above as the high boiling organic solvents used in the invention and/or methods for synthesizing these high boiling organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, and 5,013,639, European Patent Nos. 276,319A, 286,253A, 289,820A, 309,158A, 309,159A, 309, 160A, 509,311A, and 510,576A, East Germany Patent Nos. 147,009, 157,147, 159,573, and 225,240A, British Patent No. 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, JP-A-4-346338, and the like.

The mass ratio of the above-described high-boiling organic solvents used to the oil-soluble dyes is from 0.01 to 3.0 and preferably from 0.01 to 1.0.

In the invention, the oil-soluble dyes and high-boiling organic solvents are emulsified and dispersed in aqueous media and used. In the emulsification dispersion, low-boiling organic solvents can be used in some cases in view of emulsifiability. The low-boiling organic solvents are organic solvents having boiling points of about 30° C. or higher to about 150° C. or lower at ordinary pressures. Examples of such solvents used preferably include esters (e.g., ethyl acetate, butyl acetate, ethyl propionate, β-ethoxyethyl acetate, and methyl cellosolve acetate), alcohols (e.g., isopropyl alcohol, n-butyl alcohol, and sec-butyl alcohol), ketones (e.g., methyl isobutyl ketone, methyl ethyl ketone, and cyclohexanone), amides (e.g., dimethylformamide and N-methylpyrrolidone), ethers (e.g., tetrahydrofuran and dioxane), and the like, but are not limited to these solvents.

The emulsification dispersion is carried out in order to make fine droplets of an oil phase by dispersing, in an aqueous phase containing mainly water, the oil phase having a dye dissolved in a high-boiling organic solvent or in a mixed solvent thereof with a low-boiling organic solvent in some cases. Additives such as surfactant, wetting agent, dye stabilizer, emulsion stabilizer, or antiseptic agent as described later can be added as needed to either of the aqueous phase and the oil phase or to both of them.

Although a method of adding the oil phase to the aqueous phase in general is used as a method for emulsification, a method of adding dropwise the aqueous phase to the oil phase, the so-called phase reversal of emulsion, also can be preferably used. When the azo dyes or phthalocyanine dyes used in the invention are water-soluble and the additives are oil-soluble, the above-described method of emulsification can be applied.

In the emulsification dispersion, various surfactants can be used. Examples of the surfactants used preferably include anionic surfactants such as fatty acid salt, alkyl sulfuric ester salt, alkylbenzenesulfonic salt, alkylnaphthalenesulfonic salt, dialkyl sulfosuccinic salt, alkyl phosphoric ester salt, formalin condensation product of naphthalenesulfonic acid, or polyoxyethylene alkyl sulfuric ester salt and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkylamine, glycerin fatty acid ester, oxyethylene oxypropylene block copolymer, and the like. Furthermore, SURFYNOLS (Air Products & Chemicals Co.) which is an acetylene-series polyoxyethylene oxide surfactant also is preferably used. In addition, amine oxide-type amphoteric surfactants such as N,N-dimethyl-N-alkylamine oxide also are preferred. Furthermore, substances described as surfactants in JP-A-59-157636 (pages 37 and 38) and Research Disclosure No. 308119 (1989) also can be used.

For the purpose of promoting stabilization immediately after emulsification, water-soluble polymers also can be jointly used with the above-described surfactants. Polyvinyl alcohol, polyvinylpyrrolidone, polyethylene oxide, polyacrylic acid, polyacrylamide, or copolymers of these are preferably used as the water-soluble polymers. Furthermore, use of natural water-soluble polymers such as polysaccharide, casein, or gelatin also is preferred. In order to stabilize dispersions of dye, furthermore, polyvinyls obtained by polymerization of acrylic esters, methacrylic esters, vinyl esters, acrylamides, methacrylamides, olefins, styrenes, vinyl ethers, or acrylonitriles, or polyurethanes, polyesters, polyamides, polyureas, polycarbonates or the like that are not substantially dissolved in aqueous media also can be jointly used. It is preferable that these polymers contain —$SO_3^-$ or —$COO^-$. In the joint use of these polymers that are substantially undissolved in the aqueous media, the polymers can be used preferably in amounts of 20 mass percent or less and more preferably in amounts of 10 mass percent or less of the high-boiling organic solvents.

In the case where an aqueous ink is prepared by dispersing an oil-soluble dye and a high-boiling organic solvent by emulsification dispersion, control of the particle size thereof is particularly important. In order to heighten color purity and density in the formation of image through ink jet, it is essential to reduce an average particle size. The size is preferably 1 μm or less and more preferably from 5 to 100 nm in volume average particle diameter.

The volume average particle diameter and particle size distribution of the above-described dispersed particles can be readily measured according to known methods as described in *Jikken Kagaku Koza*, 4th edition, pages 417 and 418, as well as a static light-scattering method, a dynamic light-scattering method, or a method of centrifugal sedimentation. For example, the particle concentration in ink is diluted with distilled water so as to become from 0.1 to 1 mass percent, and the volume average particle diameter of the resulting diluted ink is easily measured with a commercially available volume average particle diameter-measuring instrument (e.g., MICROTRACK UPA (Produced by Nikkiso K. K.)). Furthermore, the dynamic light-scattering method where the laser Doppler effect is utilized is particularly preferred because the measurement of particle sizes can be achieved until smaller sizes.

The volume average particle diameter is an average particle diameter weighed with particle volume and is a value where in an aggregate of particles the sum of the respective particle diameters multiplied by the respective particle volumes is divided by the total volume of particles. The volume average particle diameter is described in So-ichi Muroi, "*Kobunshi Ratekkusu no Kagaku*" (Published by Kobunshi Kankokai), page 119.

It has become clear that the presence of coarse particles also has a very large effect on the printing capabilities. That is, it has been found out that the nozzle of a head is clogged with the coarse particles or badly soiled, even if it is not clogged, to generate yore in discharging or non-discharging of ink, exerting a serious influence on the printing capabilities. In order to prevent this fault, it is important, as to the ink prepared, to limit the number of particles having diameters of 5 μm or larger to 10 or less per μl of ink and the number of particles having diameters of 1 μm or larger to 1000 or less per μl of ink.

In order to remove these coarse particles, known methods of centrifugal separation, microfiltration, or the like can be used. These means of separation can be used immediately after emulsification dispersion or immediately before charging ink into an ink cartridge after various additives such as wetting agent or surfactant are added to the emulsified dispersion.

As an effective means of reducing the average particle size and removing coarse particles, mechanical emulsifying apparatus can be used.

Although known apparatus such as simple stirrer, impeller-agitating system, in-line agitating system, a mill system including colloid mill, or ultrasonic wave system can be used as the emulsifying apparatus, use of a high-pressure homogenizer is particularly preferred.

The detailed mechanism of the high-pressure homogenizer is described in U.S. Pat. No. 4,533,254, JP-A-6-47264, and the like and the commercially available apparatus thereof includes Gaulin homogenizer (A.P.V. Gaulin Inc.), Microfluidizer (Microfluidex Inc.), Altimizer (Sugino Machine K.K.), and the like.

A high-pressure homogenizer equipped with a mechanism for dividing finely particles in an ultra-high pressure jet stream as described recently in U.S. Pat. No. 5,720,551 is particularly effective for the emulsification dispersion of the invention. An example of the emulsifying apparatus where this ultra-high pressure jet stream is used includes De BEE 2000 (BEE INTERNATIONAL Ltd.).

The pressure on emulsifying in a high-pressure emulsification dispersion apparatus is 50 MPa or higher, preferably 60 MPa or higher, and further preferably 180 MPa or higher.

For example, in a method of allowing an emulsion to pass through a high-pressure homogenizer after emulsifying in an agitating emulsifier, joint use of two or more kinds of emulsifiers is particularly preferred. Furthermore, a method of allowing an emulsion to pass through a high-pressure homogenizer again after adding additives such as wetting agent and surfactant after emulsifying and dispersing in these emulsifiers and before charging ink into a cartridge also is a preferred method.

In the case where the low-boiling organic solvent is contained in addition to the high-boiling organic solvent, it is preferable to remove the low-boiling solvent in view of the stability and the safety and sanitation of the resulting emulsion. In order to remove the low-boiling solvent, various known methods can be used according to the kinds of solvents. That is, the methods include evaporation, vacuum evaporation, ultrafiltration, and the like. It is preferable to remove the low-boiling organic solvent as fast as possible immediately after emulsifying.

Methods for preparing inks for ink jet recording are described in detail in JP-A-5-148436, JP-A-5-295312, JP-A-7-97541, JP-A-7-82515, and JP-A-7-118584 and also can be utilized for the preparation of the ink for ink jet recording of the invention.

For the ink for ink jet recording obtained in the invention, a dryness preventive for preventing ink from clogging due to drying of discharging ink at the jet orifice, a penetration promoter that allows ink to penetrate much better into paper, a ultraviolet absorber, an antioxidant, a viscosity modifier, a surface tension modifier, a dispersant, a dispersion stabilizer, a mildew proofing agent, an anti-corrosive agent, a pH adjuster, an antifoaming agent, a chelating agent, and the like can be appropriately selected and used in appropriate quantities.

The dryness preventives used in the invention are preferably water-soluble organic solvents having vapor pressures lower than water. Specific examples of such dryness preventives include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane, lower alkyl ethers of polyhydric alcohols such as ethylene glycol monomethyl (or ethyl) ether, diethylene glycol monomethyl (or ethyl) ether, and triethylene glycol monoethyl (or butyl) ether, heterocycles such as 2-pyrrolidone, N-methyl-2-pyrrolidone, 1,3-dimethyl-2-imidazolidinone, and N-ethylmorpholine, sulfur-containing compounds such as sulfolane, dimethyl sulfoxide, and 3-sulfolene, polyfunctional compounds such as diacetone alcohol and diethanolamine, and urea derivatives. Of these, polyhydric alcohols such as glycerin and diethylene glycol are more preferred. The above-described dryness preventives can be used singly or as mixtures of two or more thereof. It is preferable to contain these dryness preventives in amounts of 10 to 50 mass percent of ink.

The penetration promoters used in the invention are alcohols such as ethanol, isopropanol, butanol, di(tri)ethylene glycol monobutyl ether, and 1,2-hexanediol, sodium lauryl sulfate, sodium oleate, nonionic surfactants, and the like. These penetration promoters, when 10 to 30 mass percent thereof is contained in ink, exert a sufficient effect, and it is preferable to use the penetration promoters within the range of amounts thereof that does not cause blurring in printing or kaminuke (print through).

The ultraviolet absorbers used to improve the keeping quality of image in the invention include benzotriazole-series compounds as described in JP-A-58-185677, JP-A-61-190537, JP-A-2-782, JP-A-5-197075, and JP-A-9-34057, benzophenone-series compounds as described in JP-A-46-2784, JP-A-5-194483, and U.S. Pat. No. 3,214,463, cinnamic acid-series compounds as described in JP-B-48-30492, JP-B-56-21141, and JP-A-10-88106, triazine-series compounds as described in JP-A-4-298503, JP-A-8-53427, JP-A-8-239368, JP-A-10-182621, and JP-T-501291, and compounds absorbing ultraviolet light and emitting fluorescence, the so-called fluorescent brightening agents, represented by compounds as described in Research Disclosure No. 24239 and stilbene-series and benzoxazole-series compounds.

Various organic or metal complex-series fading preventives can be used as the antioxidants used to improve the keeping quality of image in the invention. The organic fading preventives include hydroquinones, alkoxyphenols, dialkoxyphenols, phenols, anilines, amines, indanes, chromans, alkoxyanilines, heterocycles, and the like and the metal complex-series fading preventives include nickel complexes, zinc complexes, and the like. More specifically, compounds as described in patents cited in Research Disclosure No. 17643, VII, items I and J; No. 15162; No. 18716, page 650, left column; No. 36544, page 527; No. 307105, page 872; and No. 15162; and compounds which are shown by general formula of representative compounds and included in examples of compounds as described in JP-A-62-215272, pages 127 to 137, can be used.

The mildewproofing agents used in the invention include sodium dehydroacetate, sodium benzoate, sodium pyridinethion-1-oxide, ethyl p-hydroxybenzoate, 1,2-benzisothiazoline-3-one and salts thereof, and the like. These are preferably used in amounts of 0.02 to 5.00 mass percent in ink.

Details of these agents are described in "*Bokin-Bobaizai Jiten*" (Edited by Nippon Bokin-Bobaigakkai Jitenhenshuiinkai) and the like.

Examples of the anti-corrosive agents include acidic sulfurous salts, sodium thiosulfate, ammonium thioglycolate, diisopropylammonium nitrite, pentaerythritol tetranitrate, dicyclohexylammonium nitrite, benzotriazole, and the like. These agents can be preferably used in amounts of 0.02 to 5.00 mass percent in ink.

The pH adjusters used in the invention can be suitably used in view of adjustment of pH, the promotion of dispersion stability, and the like, and it is preferable to adjust the ink to pH 8 to 11 at 25° C. The pH less than 8 causes the nozzle to clog because of reduced solubility of dye and exceeding pH 11 results in deteriorating the water resistance. The pH adjusters include organic bases and inorganic alkalis as basic adjusters and organic acids and inorganic acids as acidic adjusters.

The above-described organic bases include triethanolamine, diethanolamine, N-methyldiethanolamine, dimethylethanolamine, and the like. The above-described inorganic alkalis include hydroxides of alkali metals (e.g., sodium hydroxide, lithium hydroxide, potassium hydroxide, etc.), carbonic salts thereof (e.g., sodium carbonate, sodium hydrogencarbonate, etc.), ammonium, and the like. The above-described organic acids include acetic acid, propionic acid, trifluoroacetic acid, alkylsulfonic acid, and the like. The above-described inorganic acids include hydrochloric acid, sulfuric acid, phosphoric acid, and the like.

Apart from the above-described surfactants, in this invention, nonionic, cationic, or anionic surfactants are used as regulators of surface tension. Examples of such surfactants include, as the anionic surfactants, fatty acid salts, alkyl sulfuric ester salts, alkylbenzenesulfonic salts, alkylnaphthalenesulfonic salts, dialkyl sulfosuccinic salts, alkyl phosphoric ester salts, formalin condensation products of naphthalenesulfonic acid, polyoxyethylene alkyl sulfuric ester salts, and the like and, as the nonionic surfactants, polyoxyethylene alkyl ethers, polyoxyethylenealkylaryl ethers, polyoxyethylene fatty acid esters, sorbitan fatty acid esters, polyoxyethylene sorbitan fatty acid esters, polyoxyethylene alkylamines, glycerin fatty acid esters, oxyethylene oxypropylene block copolymers, and the like. SURFYNOLS (Air Products & Chemicals Co.) that are acetylene-series polyoxyethylene oxide surfactants also are preferably used. Amphoteric surfactants of amine oxide type such as N,N-dimethyl-N-alkylamine oxide also are preferred. Furthermore, compounds described as surfactants in JP-A-59-157636, pages 37 and 38, and Research Disclosure No. 308119 (1989) also can be used.

The surface tension of the ink of the invention is preferably from 20 to 60 mN/m and further preferably from 25 to 45 mN/m regardless of use or disuse of these surfactants.

The viscosity of the ink used in the invention is preferably 30 mPa·s or less. Furthermore, since it is more preferable to regulate the viscosity to 20 mPa·s or less, viscosity modifiers are used in some cases for the purpose of regulating the viscosity. Examples of the viscosity modifiers include cellulose, water-soluble polymers such as polyvinyl alcohol, nonionic surfactants, and the like. Further details are described in "Nendochosei Gijutsu" (Gijutsujoho Kyokai, 1999), Chapter 9 and "Chemicals for Ink Jet Printer" (a revised and enlarged edition, 98)—Zairyo no Kaihatsu Doko. Tenbo Chosa—" (CMC, 1997), pages 162 to 174.

In the invention, the respective surfactants of the aforesaid cationic, anionic, and nonionic types as the dispersants or dispersion stabilizers, fluorine-series and silicone-series compounds as antifoaming agents, and chlating agents represented by EDTA can also be used as needed.

The ink for ink jet recording of the invention also can be utilized for other uses than the use of ink jet recording. For example, the ink can be utilized for materials for display image, image-forming materials for interior decoration materials, image-forming materials for outdoor decoration materials, or the like.

The materials for display image indicate various articles such as posters, wall paper, small articles for decoration (ornaments, dolls, etc.), leaflets for commercial advertisement, packing paper, wrapping materials, paper bags, vinyl bags, packaging materials, signboards, images pictured on or attached to the side faces of public carriers (automobiles, buses, tram cars, etc.), and suits of clothes with logos. When the dyes of the invention are used as materials for forming display images, the images contain all patterns made of the dyes and recognized by men, including abstract designs, letters, geometric patterns, and the like, in addition to images of a narrow sense.

The materials for interior decoration indicate various articles such as wall paper, small articles for decoration (ornaments, dolls, etc.), members of light equipment, members of furniture, and design members of flooring and ceiling. When the dyes of the invention are used as materials for forming images, the images contain all patterns made of the dyes and recognized by men, including abstract designs, letters, geometrical patterns, and the like, in addition to images of s narrow sense.

The materials for outdoor decoration indicate various articles such as wall materials, roofing materials, signboards, gardening materials, small articles for outdoor decoration (ornaments, dolls, etc.), and members for outdoor light equipment. When the dyes of the invention are used as materials for forming images, the images contain all patterns made of the dyes and recognized by men, including abstract designs, letters, geometrical patterns, and the like, in addition to images of a narrow sense.

In the above-described uses, the media on which patterns are formed can include paper, fiber, cloth (including nonwoven fabric), plastics, metals, ceramics, and the like. Mordanting, textile printing, and fixation of dyestuffs with the aid of reactive dyes having reactive groups introduced are possible as the forms of dyeing. Of these forms, dyeing by the mordanting form is preferred.

Recording charts and recording films used in the process for ink jet recording of the invention are described. Supports of recording charts and recording films used in the invention consist of chemical pulp such as LBKP and NBKP, mechanical pulp such as GP, PGW, RMP, TMP, CTMP, CMP, and CGP, and recycled fiber such as DIP, are mixed as needed with known additives such as pigment, binder, sizing agent, bonding agent, cationic agent, or paper strength additive, and are manufactured on various machines such as fourdrinier paper machine or cylinder paper machine. In addition to these supports, any of synthetic paper and plastic film sheets can be used as the supports, and it is desirable that the thickness of the supports is from 10 to 250 μm, and the basis weight is from 10 to 250 g/m$^2$.

An image-receiving material for the ink of the invention may be prepared by providing an image-receiving layer and a back coat layer directly on a support, or may be prepared by providing a size press or an anchor coat layer by use of starch, polyvinyl alcohol, or the like and then providing the image-receiving layer and the back coat layer. Furthermore, the support can be subjected to a flattening treatment on a calendering machine such as machine calender, TG calender, and soft calender.

The support used more preferably in the invention is paper or plastic film having polyolefin (e.g., polyethylene, polystyrene, polybutene, and copolymers thereof) or poly (ethylene terephthalate) laminated on both sides thereof. It is preferable to add a white pigment (e.g., titanium oxide or zinc oxide) or a tinting dye (e.g., cobalt blue, ultramarine blue, or neodymium oxide) to the polyolefin.

The image-receiving layer provided on the support is allowed to contain therein a porous material and an aqueous binder. Furthermore, the image-receiving layer preferably contains a pigment, and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate and organic pigments such as styrene-series pigment, acrylic pigment, urea resin, and melamine resin. Porous white inorganic pigments are particularly preferred and particularly, synthetic amorphous silica having a large pore area or the like is suitable. Both of silicic acid anhydride obtained by a dry process (gas phase process) and moisture silicic acid obtained by a wet process can be used as the synthetic amorphous silica.

Recording charts containing the above-described pigments in the image-receiving layers which can be used herein specifically include those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777, JP-A-2001-301314, and the like.

Examples of the aqueous binder contained in the image-receiving layer include water-soluble polymers such as polyvinyl alcohol, silanol-modified polyvinyl alcohol, starch, cationic starch, casein, gelatin, carboxymethyl cellulose, hydroxyethyl cellulose, polyvinylpyyrolidone, polyalkylene oxide, and polyalkylene oxide derivatives and water-dispersible polymers such as styrene butadiene latex and acrylic emulsion. These aqueous binders can be used singly or as mixtures of two or more thereof. Of these, the polyvinyl alcohol and the silanol-modified polyvinyl alcohol are particularly suitable in the invention in view of the adhesion to pigment and the release resistance of an ink-accepting layer.

The image-receiving layer can contain a mordant, a water resistance promoter, a light resistance improver, a gas resistance improver, a surfactant, a hardener, and other additives in addition to the pigment and the aqueous binder.

It is preferable that the mordant added to the image-receiving layer is unmovable. A polymer mordant is preferably used therefor.

The polymer mordant is described in the respective descriptions of JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, and JP-A-1-161236 and U.S. Pat. Nos. 2,484,430, 2,548,564, 3,148,061, 3,309,690, 4,115,124, 4,124,386, 4,193,800, 4,273,853, 4,282,305, and 4,450,224. Image-receiving materials containing polymer mordants as described in JP-A-1-161236, pages 212 to 215, are particularly preferred. Use of the polymer mordants as described in this patent enables formation of an image of excellent quality and improvement in light resistance of the image.

The water resistance promoter is effective for the water resistance of image, and cationic resins are particularly desirable as the water resistance promoters. Such cationic resins include polyamide polyamine epichlorhydrin, polyethylene imine, polyamine sulfone, dimethyldiallyl-ammonium chloride polymer, cationic polyacrylic amide, and the like. The content of these cationic resins in the total solid components of the ink-accepting layer is preferably from one to 15 mass percent and particularly preferably from three to 10 mass percent.

The light resistance improvers and the gas resistance improvers include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, succharides, water-soluble reductive compounds, organic acids, inorganic acids, hydroxy group-containing organic acids, benzotriazole compounds, benzophenone compounds, triazine compounds, heterocyclic compounds, water-soluble metallic salts, organometallic compounds, metal complexes, and the like.

Specific examples of these compounds include those described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258, JP-A-11-321090, and the like.

The surfactants function as a coating aid, a release improver, a slip improver, or an antistatic agent. The surfactants are described in the respective descriptions of JP-A-62-173463 and JP-A-62-183457.

Organic fluorine compounds can be used in place of the surfactants. The organic fluorine compounds are preferably hydrophobic. Examples of the organic fluorine compounds include fluorine-series surfactants, oily fluorine-series compounds (e.g., fluorine oil), and solid fluorine compound resins (e.g., tetrafluoroethylene resin). The organic fluorine compounds are described in JP-B-57-9053 (8th to 17th columns), JP-A-61-20994, and JP-A-62-135826.

Materials used as the hardeners are those described in JP-A-1-161236, Page 222, JP-A-9-263036, JP-A-10-119423, and JP-A-2001-310547.

Furthermore, additives added to other image-receiving layers include a pigment dispersant, a thickener, an anti-foaming agent, a dye, a fluorescent brightening agent, an antiseptic agent, a pH adjuster, a matting agent, a hardener, and the like. The ink-accepting layer may be of one layer or two layers.

A back coat layer can be provided on the recording chart and the recording film, and components that can be added to this layer are a white pigment, an aqueous binder, and other components.

Examples of the white pigment contained in the back coat layer include white inorganic pigments such as precipitated calcium carbonate light, calcium carbonate heavy, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrohalloysite, magnesium carbonate, and magnesium hydroxide and organic pigments such as styrene-series plastic pigment, acrylic plastic pigment, polyethylene, microcapsule, urea resin, and melamine resin.

The aqueous binders contained in the back coat layer include water-soluble polymers such as styrene/maleic salt copolymer, styrene/acrylic salt copolymer, polyvinyl alcohol, silanol-modified polyvinyl alcohol, starch, cationic starch, casein, gelatin, carboxymethyl cellulose, hydroxyethyl cellulose, and polyvinylpyrrolidones and water-dispersible polymers such as styrene butadiene latex, and acrylic emulsion, ant the like. Other components contained in the back coat layer include an antifoaming agent, a foam suppressor, a dye, a fluorescent brightening agent, an antiseptic agent, a water resistance promoter, and the like.

A dispersion of finely divided particles of polymer can be added to layers constituting the ink jet recording chart and recording film (including back layers). The dispersion of finely divided particles of polymer is used for the purpose of improving film properties such as dimensional stability, prevention of curling, prevention of blocking, and prevention of crazing of film. The dispersion of finely divided particles of polymer is described in the respective descriptions of JP-A-62-245258, JP-A-62-1316648, and JP-A-62-110066. The dispersion of finely divided particles of polymer having a low glass transition temperature (40° C. or lower), which is added to the layer containing a mordant, can prevent the layer from crazing and curling. Furthermore, the curling can be prevented by adding the dispersion of finely divided particles of polymer having a high glass transition temperature to the back layer also.

Systems of ink jet recording applicable to the ink of the invention are not limited, and the ink of the invention can be used for known systems, for example, a charge control system where the ink is discharged with the aid of electrostatic attraction force, a drop-on demand system (pressure pulse system) where the vibratory pressure of a piezoresistor is utilized, an acoustic ink jet system where ink is discharged by changing electric signals to acoustic beams, irradiating the ink with the acoustic beams, and utilizing the resulting radiation pressure, a thermal ink jet (bubble jet) system where ink is heated to form bubbles and the resulting pressure is utilized, and the like.

The ink jet recording system includes a system of ejecting a number of small volumes of an ink having a low concentration called photo-ink, a system of improving an image by use of a plurality of inks having substantially the same color hue but different concentrations, and a system of using a colorless transparent ink.

BEST MODE FOR CARRYING OUT THE INVENTION

The present invention is hereinafter illustrated through examples, but is not to be construed as limited to these.

EXAMPLE 1

After deionized water was added to the following ingredients so as to become 1 liter, the resulting mixture was stirred for 1 hr while heating at 30 to 40° C. The mixture was then filtered under reduced pressure through a microfilter having an average pore diameter of 0.25 μm to prepare a light magenta ink.

[Formulation of Light Magenta Ink LM-101]

(Solid Ingredients)

| | |
|---|---|
| Magenta dye (a-36) | 7.5 g/l |
| PROXEL | 5 g/l |

(Liquid Ingredients)

| | |
|---|---|
| Diethylene glycol | 90 g/l |
| Glycerin | 70 g/l |
| Triethylene glycol monobutyl ether | 70 g/l |
| Triethanolamine | 6.9 g/l |
| Surfynol STG | 10 g/l |

Furthermore, a magenta ink liquid, M-101, where magenta dyestuff (a-36) was increased to 23 g in the above-described formulation was prepared.

[Formulation of Magenta Ink M-101]

(Solid Ingredients)

| | |
|---|---|
| Magenta dye (a-36) | 23 g/l |
| PROXEL | 5 g/l |

(Liquid Ingredients)

| | |
|---|---|
| Diethylene glycol | 90 g/l |
| Glycerin | 70 g/l |
| Triethylene glycol monobutyl ether | 70 g/l |

-continued

[Formulation of Magenta Ink M-101]

| | |
|---|---|
| Triethanolamine | 6.9 g/l |
| Surfynol STG | 10 g/l |

The oxidation potential of magenta dye (a-36) used herein is more positive than 1.0 V (vs SCE).

Inks LM-102 to LM-108 and M-102 to M-108 having the quite same formulations were prepared, respectively, except that additives as shown below were added to LM-101 to M-101.

| | Additives |
|---|---|
| LM-101, M-101 (Comparative Example) | None |
| LM-102, M-102 (Comparative Example) | 50 g/l of diethylene glycol to LM-101 and M-101 |
| LM-103, M-103 (Comparative Example) | 50 g/l of glycerin to LM-101 and M-101 |
| LM-104, M-104 (Comparative Example) | 50 g/l of triethylene glycol monobutyl ether to LM-101 and M-101 |
| LM-105, M-105 (This Invention) | 10 g/l of 2-pyrrolidone to LM-101 and M-101 |
| LM-106, M-106 (This Invention) | 10 g/l of sulfolane to LM-101 and M-101 |
| LM-107, M-107 (This Invention) | 10 g/l of 1,3-dimethylimidazolidinone to LM-101 and M-101 |
| LM-108, M-108 (This Invention) | 10 g/l of ε-caprolactam to LM-101 and M-101 |

These inks were charged into cartridges for magenta ink and light magenta ink of Ink Jet Printer PM-950C produced by EPSON Co. and the inks of PM-950C were used as other color inks to print single color images of magenta different in density. The images were printed on Ink Jet Paper Photo Glossy Paper EX manufactured by Fuji Photo Film Co., Ltd. as image-accepting sheets and evaluations of the discharge stability of the inks and the fastness of the images were carried out.

(Experiments for Evaluation)

1) The discharge stability was evaluated as follows: after the cartridges were set in the printer and discharge of the inks from all nozzles was confirmed, 20 sheets of A4 were printed out and evaluated on the basis of the following standards.

A: No turbulence in printing occurs from the beginning to the end of printing.

B: Output causing turbulence in printing occurs.

C: Turbulence in printing occurs from the beginning to the end of printing.

This experiment was carried out just after charging the inks (discharge stability A) and after storing the ink cartridges under the conditions of 40° C.-80% RH for two weeks (discharge stability B).

2) The keeping quality of image was evaluated as to samples of printed magenta solid image prepared in the following manner.

(1) About the light resistance, image density $C_i$ was measured with a reflection densitometer (X-Rite 310TR) immediately after printing, the image was then irradiated with Xenon light (85,000 lux) for 10 days by use of a weather meter produced by Atlas Co., then the image density $C_f$ was measured again to find the residual ratio of dye ($100 \times C_f/C_i$) for evaluation. The residual ratios of dye were evaluated at three points of 1, 1.5, and 2 in reflection density, and when the residual ratios of dye were 70 percent or more at all densities, the sample was graded A; when the residual ratios of dye were less than 70 percent at two points, the sample was graded B; and when the residual ratios of dye were less than 70 percent at all densities, the sample was graded C.

(2) About the heat resistance, the densities of a sample were measured with the reflection densitometer (X-Rite 310TR) before and after the sample was stored under the conditions of 80° C.-15% RH for 10 days to find the residual ratio of dye for evaluation. The residual ratio of dye was evaluated at three points of 1, 1.5, and 2 in reflection density, and when the residual ratios of dye were 90 percent or more at all densities, the sample was graded A; when the residual ratios of dye were less than 90 percent at two points, the sample was graded B; and when the residual ratios of dye were less than 90 percent at all densities, the sample was graded C.

(3) About the ozone resistance, the above-described sheets of the photo glossy paper having image were allowed to stand for 7 days in a box set to an ozone gas concentration of 0.5 ppm and the image densities were measured by use of a reflection densitometer (X-Rite 310TR) before and after the sheets were allowed to stand, to evaluate the ozone resistance as the residual ratio of dyestuff. The reflection densities were measured at three points of 1, 1.5, and 2.0. The concentration of ozone gas in the box was set by use of an ozone gas monitor (Model OZG-EM-01) produced by APPLICS Co.

The results were evaluated in the following three steps: when the residual ratios of dyestuff were 80 percent or more at all densities, the sample was graded A; when the residual ratios of dyestuff were less than 80 percent at one or two points, the sample was graded B; and when the residual ratios were less than 70 percent at all densities, the sample was graded C.

Results thus obtained are shown in the following table.

| | Discharge Stability A | Discharge Stability B | Light Resistance | Heat Resistance | Ozone Resistance |
|---|---|---|---|---|---|
| Magenta ink, light magenta ink of PM-950C, EPSON Co. (Comparative Example) | A | A | C | B | C |
| LM-101, M-101 (Comparative Example) | A | C | A | A | A |
| LM-102, M-102 (Comparative Example) | A | C | A | A | A |
| LM-103, M-103 (Comparative Example) | A | C | A | A | A |
| LM-104, M-104 (Comparative Example) | A | C | A | A | A |
| LM-105, M-105 (This Invention) | A | A | A | A | A |
| LM-106, M-106 (This Invention) | A | A | A | A | A |
| LM-107, M-107 (This Invention) | A | A | A | A | A |
| LM-108, M-108 (This Invention) | A | A | A | A | A |

The results of the above table reveal that this invention satisfies all capabilities and is superior to the comparative examples.

Furthermore, the inks of the invention obtained a color hue equal to that of the inks of PM-950C of EPSON Co.

The inks of the invention prepared by using other dyes represented by general formula (1) in place of magenta dye (a-36) in Example 1 also obtained the same capabilities and effect of color hue as in Example 1.

EXAMPLE 2

A light magenta ink was prepared similarly to Example 1 except that the following ingredients were used.

| [Formulation of Light Magenta Ink LM-101] | |
|---|---|
| (Solid Ingredients) | |
| Magenta Dye (a-36) | 7.5 g/l |
| PROXEL | 3.5 g/l |
| (Liquid Ingredients) | |
| Diethylene Glycol | 150 g/l |
| Glycerin | 130 g/l |
| Triethylene Glycol Monobutyl Ether | 130 g/l |
| Triethanolamine | 6.9 g/l |
| Surfynol STG | 10 g/l |

Furthermore, magenta ink liquid M-101 where magenta dye (a-36) was increased to 23 g in the above-described formulation was prepared.

| [Formulation of Magenta Ink M-101] | |
|---|---|
| (Solid Ingredients) | |
| Magenta Dye (a-36) | 23 g/l |
| PROXEL | 3.5 g/l |
| (Liquid Ingredients) | |
| Diethylene Glycol | 150 g/l |
| Glycerin | 130 g/l |
| Triethylene Glycol Monobutyl Ether | 130 g/l |
| Triethanolamine | 6.9 g/l |
| Surfynol STG | 10 g/l |

Inks LM-102 to 108 and M-102 to 108 having the same compositions as in LM-101 and M-101 were prepared except that additives were added as shown below.

| | Additives |
|---|---|
| LM-101, M-101 (Comparative Example) | None |
| LM-102, M-102 (Comparative Example) | 20 g/l of ethylene glycol to LM-101 and M-101 |
| LM-103, M-103 (Comparative Example) | 40 g/l of ethylene glycol to LM-101 and M-101 |
| LM-104, M-104 (This Invention) | 20 g/l of N,N-dimethylurea to LM-101 and M-101 |
| LM-105, M-105 (This Invention) | 40 g/l of N,N-dimethylurea to LM-101 and M-101 |
| LM-106, M-106 (This Invention) | 40 g/l of ethyleneurea to LM-101 and M-101 |
| LM-107, M-107 (This Invention) | 40 g/l of sulfonylurea to LM-101 and M-101 |

-continued

| | Additives |
|---|---|
| LM-108, M-108 (This Invention) | 20 g/l of HMPA to LM-101 and M-101 |

The discharge stability and image fastness of these inks were evaluated similarly to Example 1.

Results thus obtained are shown in the following table.

| | Discharge Stability A | Discharge Stability B | Light Resistance | Heat Resistance | Ozone Resistance |
|---|---|---|---|---|---|
| Pure Ink (PM-950C), EPSON Co. | A | A | C | B | C |
| LM-101, M-101 (Comparative Example) | A | C | A | A | A |
| LM-102, M-102 (Comparative Example) | A | C | A | A | A |
| LM-103, M-103 (Comparative Example) | A | C | A | A | A |
| LM-104, M-104 (This Invention) | A | A | A | A | A |
| LM-105, M-105 (This Invention) | A | A | A | A | A |
| LM-106, M-106 (This Invention) | A | A | A | A | A |
| LM-107, M-107 (This Invention) | A | A | A | A | A |
| LM-108, M-108 (This Invention) | A | A | A | A | A |

The results of the above-described table reveal that the systems where the ink sets of this invention are used are superior to those of the comparative examples in view of the discharge stability. Furthermore, the results also shows that the inks of this invention are superior to the inks of EPSON Co. (PM-950C pure ink) in view of the resistance to light, heat, and oxidative gas of dyestuff.

EXAMPLE 3

A light cyan ink was prepared similarly to Example 1 except that the following ingredients were used.

| [Formulation of Light Cyan Ink LC-101] | |
|---|---|
| (Solid Ingredients) | |
| Cyan Dye of This Invention (154) | 17.5 g/l |
| PROXEL | 5 g/l |
| (Liquid Ingredients) | |
| Diethylene Glycol (DEG) | 90 g/l |
| Glycerin (GR) | 70 g/l |
| Triethylene Glycol Monobutyl Ether (TGB) | 70 g/l |
| Triethanolamine | 6.9 g/l |
| Surfynol STG | 10 g/l |
| Triethanolamine (TEA) | 6.9 g/l |
| Surfynol STG (SW) | 10 g/l |

Furthermore, cyan ink liquid C-101 where cyan dye (154) was increased to 68 g in the above formulation was prepared.

| [Formulation of Cyan Ink C-101] | |
|---|---|
| (Solid Ingredients) | |
| Cyan Dye of this invention (154) | 68 g/l |
| PROXEL | 5 g/l |
| (Liquid Ingredients) | |
| Diethylene Glycol (DEG) | 90 g/l |
| Glycerin (GR) | 70 g/l |
| Triethylene Glycol Monobutyl Ether (TGB) | 70 g/l |
| Triethanolamine | 6.9 g/l |
| Surfynol STG | 10 g/l |
| Triethanolamine (TEA) | 6.9 g/l |
| Surfynol STG (SW) | 10 g/l |

The oxidation potential of cyan dye (154) used herein is more positive than 1.0 V (vs SCE).

Inks LC-102-108 and C-102-108 having the same composition were prepared, respectively, except that additives were added to LC-101 and C-101 as shown in the following table.

| | Additive |
|---|---|
| LC-101, C-101 (Comparative Example) | None |
| LC-102, C-102 (Comparative Example) | 50 g/l of diethylene glycol to LC-101 and C-101 |
| LC-103, C-103 (Comparative Example) | 50 g/l of glycerin to LC-101 and C-101 |
| LC-104, C-104 (Comparative Example) | 50 g/l of triethylene glycol monobutyl ether to LC-101 and C-101 |
| LC-105, C-105 (This Invention) | 10 g/l 2-pyrrolidone to LC-101 and C-101 |
| LC-106, C-106 (This Invention) | 10 g/l of Sulfolane to LC-101 and C-101 |
| LC-107, C-107 (This Invention) | 10 g/l of 1,3-dimethylimidazolidinone to LC-101 and C-101 |
| LC-108, C-108 (This Invention) | 10 g/l of ε-caprolactam to LC-101 and C-101 |

The cartridges for cyan ink and light cyan ink of Ink Jet Printer MP-950C produced by EPSON Co. were charged with these inks and the inks of PM-950C were used for inks of other colors to print singe color images of cyan. The images were printed on Ink Jet Paper Photo Glossy Paper EX manufactured by Fuji Photo Film Co., Ltd. as image-accepting sheets and evaluations of the discharge stability of the inks and the fastness of the images were carried out.

(Experiments for Evaluation)

1) About the discharge stability, the cartridges were set in the printer, the discharge of inks from all nozzles was confirmed, and then 20 sheets of A4 were printed out and evaluated on the basis of the following standards.

A. No turbulence in printing occurs from the beginning to the end of printing.

B. Output causing turbulence in printing occurs.

C. Turbulence in printing occurs from the beginning to the end of printing.

This experiment was carried out about inks immediately after charging with inks (discharge stability A) and about inks that were repeatedly stored in a constant temperature box of 60° C. for 12 hr and in a constant temperature box of −60° C. for 12 hr and were restored to room temperature after the elapse of two weeks (discharge stability B).

2) About the keeping quality of image, printed samples of cyan solid image were prepared and (1) light resistance, (2) heat resistance, and (3) ozone resistance were evaluated similarly to Example 1.

Results thus obtained are shown in the following table.

|  | Discharge Stability A | Discharge Stability B | Light Resistance | Heat Resistance | Ozone Resistance |
|---|---|---|---|---|---|
| Pure Ink, EPSON Co. | A | A | C | B | C |
| LC-101, C-101 (Comparative Example) | A | C | A | A | A |
| LC-102, C-102 (Comparative Example) | A | C | A | A | A |
| LC-103, C-103 (Comparative Example) | A | C | A | A | A |
| LC-104, C-104 (Comparative Example) | A | C | A | A | A |
| LC-105, C-105 (This Example) | A | A | A | A | A |
| LC-106, C-106 (This Example) | A | A | A | A | A |
| LC-107, C-107 (This Example) | A | A | A | A | A |
| LC-108, C-108 (This Example) | A | A | A | A | A |

The results of the above table reveal that the inks of the invention satisfy all capabilities and are superior to those of the comparative examples.

Furthermore, the inks having the same color hue as in the ink of PM-950C manufactured by EPSON Co. were obtained in this invention.

EXAMPLE 4

A light cyan ink was prepared similarly to Example 1 except that the following ingredients were used.

[Formulation of Light Cyan Ink LC-101]

(Solid Ingredients)

| Cyan Dye of This Invention (154) | 17.5 g/l |
|---|---|
| PROXEL | 3.5 g/l |

(Liquid Ingredients)

| Diethylene Glycol | 150 g/l |
|---|---|
| Glycerin | 130 g/l |
| Triethylene Glycol Monobutyl Ether | 130 g/l |
| Triethanolamine | 6.9 g/l |
| Surfynol STG | 10 g/l |

PREPARATION OF CYAN INK C-101 (COMPARATIVE EXAMPLES)

Furthermore, cyan ink liquid C-101 where cyan dye (154) was increased to 68 g in the above formulation were prepared.

[Formulation of Cyan Ink C-101]

(Solid Ingredients)

| Cyan Dye of the Invention (Exemplified Compound 154) | 68 g/l |
|---|---|
| PROXEL | 3.5 g/l |

(Liquid Ingredients)

| Diethylene Glycol | 150 g/l |
|---|---|
| Glycerin | 130 g/l |
| Triethylene Glycol Monobutyl Ether | 130 g/l |
| Triethanolamine | 6.9 g/l |
| Surfynol STG | 10 g/l |

PREPARATION OF CYAN INKS OF THIS INVENTION AND OTHER COMPARATIVE EXAMPLES

Inks LC-102 to 108 and C-102 to 108 having the same composition as described above were prepared, respectively, except that additives as shown in the following table were added to the above-described cyan inks LC-101 and C-101.

|  | Additive |
|---|---|
| LC-101, C-101 (Comparative Example) | None |
| LC-102, C-102 (Comparative Example) | 20 g/l of ethylene glycol to LC-101 and C-101 |
| LC-103, C-103 (Comparative Example) | 40 g/l of ethylene glycol to LC-101 and C-101 |
| LC-104, C-104 (This Invention) | 20 g/l of N,N-dimethylurea to LC-101 and C-101 |
| LC-105, C-105 (This Invention) | 40 g/l of N,N-dimethylurea to LC-101 and C-101 |
| LC-106, C-106 (This Invention) | 40 g/l of ethyleneurea to LC-101 and C-101 |
| LC-107, C-107 (This Invention) | 40 g/l of Sulfonylurea to LC-101 and C-101 |
| LC-108, C-108 (This Invention) | 20 g/l of HMPA to LC-101 and C-101 |

About these inks, single color images of cyan were printed similarly to Example 3 and the discharge stability of ink and the fastness of image were evaluated similarly to Example 1.

Results thus obtained are shown in the following table.

|  | Discharge Stability A | Discharge Stability B | Light Resistance | Heat Resistance | Ozone Resistance |
|---|---|---|---|---|---|
| Pure Ink (PM-950C), EPSON Co. | A | A | B | B | C |
| LC-101, C-101 (Comparative Example) | A | C | A | A | A |
| LC-102, C-102 (Comparative Example) | A | C | A | A | A |
| LC-103, C-103 (Comparative Example) | A | C | A | A | A |
| LC-104, C-104 (This Invention) | A | A | A | A | A |

-continued

| | Discharge Stability A | Discharge Stability B | Light Resistance | Heat Resistance | Ozone Resistance |
|---|---|---|---|---|---|
| LC-105, C-105 (This Invention) | A | A | A | A | A |
| LC-106, C-106 (This Invention) | A | A | A | A | A |
| LC-107, C-107 (This Invention) | A | A | A | A | A |
| LC-108, C-108 (This Invention) | A | A | A | A | A |

The results of the table reveal that the systems where the ink sets of this invention are used are superior to those of comparative examples in view of the discharge stability and furthermore, the systems are superior to the ink of EPSON Co. (pure ink PM-950C) in view of the light resistance, heat resistance, and oxidative gas resistance of dyestuff.

INDUSTRIAL APPLICABILITY

According to the present invention, in aqueous inks advantageous in view of handling properties, odor, and safety, inks for ink jet recording can be provided which are good in color hue and excellent in discharge stability, weathering resistance, water resistance, light resistance, heat stability, and oxidation resistance even after aging for a long period of time.

The invention claimed is:

1. An ink for ink jet recording comprising a dye dissolved or disperses in an aqueous medium, wherein the dye is a water-soluble dye having an oxidation potential more positive than 1.0 V (vs SCE) and the ink comprises at least one compound selected from compounds represented by the following general formula (A) or general formula (B):

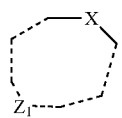

General formula (A)

in the formula, X represents a group containing carbonyl or a heteroatom; $Z_1$ represents a group of atoms that can form a cyclic organic substance:

$$X^1—Y-Z$$ <span style="float:right">General formula (B)</span> in the formula, $X^1$ represents a group shown by $—N(Q_1)-Q_2$; Z represents a group shown by $—N(Q_1)-Q_2$ or a group shown by $—O-Q_3$; Y represents a group shown by $—W-(G)_k-(H)_n—$; W and H represent groups shown by $—CO—$, $—SO_2—$, or $—PO(Q_4)-$; G represents a divalent connecting group; $Q_1$ to $Q_4$ represent any of a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group, and a heteroarylamino group; X and Z may combine with each other to form a ring; K and n each represent 0 or 1.

2. The ink for ink jet recording as described in claim 1, wherein the dye is a magenta dye selected from an aza dye, and the magenta dye has an absorption maximum in a spectral region of 500 to 580 nm in the aqueous medium.

3. The ink for ink jet recording as described in claim 2, wherein the azo dye has a chromophore represented by general formula: (heterocycle A)-N=N-(heterocycle B), in which the heterocycle A and the heterocycle B in the above general formula may have the same structure.

4. The ink for ink jet recording as described in claim 2, wherein the azo dye is an azo dye having an aromatic nitrogen-containing six-membered heterocycle linked directly to at least one side of the azo group as a coupling component.

5. The ink for ink jet recording as described in claim 3, wherein the azo dye is an azo dye having an aromatic amino group- or a heterocyclic amino group-containing structure as an auxochrome.

6. The ink for ink jet recording as described in claim 2, wherein the azo dye is an azo dye having a steric structure.

7. The ink for ink jet recording as described in claim 2, wherein the azo dye is a dye represented by the following general formula (1):

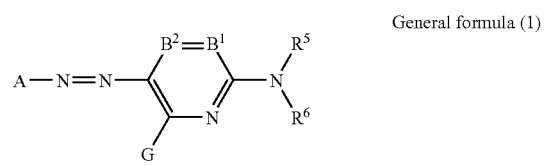

General formula (1)

in general formula (1), A represents a five-membered heterocyclic group;

$B^1$ and $B^2$ each represents $=CR^1—$ or $—CR^2=$, or either thereof represents a nitrogen atom and the other represents $=CR^1—$ or $—R^2=$; $R^5$ and $R^6$ each independently represent a hydrogen atom or a substituent group, the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and a hydrogen atom(s) on the respective substituent groups may be substituted;

G, $R^1$, and $R^2$ each independently represent a hydrogen atom or a substituent group, the substituent group represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sutfo group, and a hydrogen atom(s) on the respective substituent groups may be substituted;

$R^1$ and $R^5$, or $R^5$ and $R^6$ may be combined to form a five- or six-membered ring.

8. The ink for ink jet recording as described in claim 2, wherein a rate constant of ozone fading of a recorded image is $5.0 \times 10^{-2}$ [hour$^{-1}$] or less.

9. The ink for ink jet recording as described in claim 1, wherein the dye is a phthalocyanine dye.

10. The ink for ink jet recording as described in claim 9, wherein a residual ratio of dye (density after fading/initial density×100) is 60 percent or more when kept in an ozone atmosphere of 5 ppm for 24 hr, in a monochromatic site printed so that the cyan reflection density in a status A filter is from 0.9 to 1.1 by use of a monochrome of the ink (cyan).

11. The ink for ink jet recording as described in claim 10, wherein an amount of Cu ion running off into water is 20 percent or less of the total dye after the ink undergoes ozone fading under the condition of claim 10.

12. The ink for ink jet recording as described in claim 9, wherein the phthalocyanine dye is a water-soluble dye having an electron-withdrawing group at a β position of a benzene ring of the phthalocyanine.

13. The ink for ink jet recording as described in claim 9, wherein the phthalocyanine dye is a water-soluble phthalocyanine dye prepared by a process that does not go through a sulfonation of non-substituted phthalocyanine.

14. The ink for ink jet recording as described in claim 9, wherein the phthalocyanine dye is represented by the following general formula (I):

General formula (I)

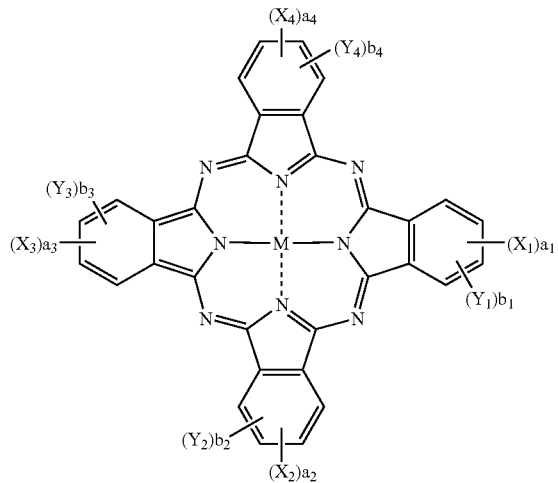

in the above formula (I), $X_1$, $X_2$, $X_3$, and $X_4$ each independently represent —SO-Z, —SO$_2$-Z, —SO$_2$NR$^1$R$^2$, a sulfo group, —CONR$^1$R$^2$, or —CO$_2$R$^1$;

the above Z represents a substituted or unsubstituted alkyl group, a substituted or unsubsututed cycloalkyl group, a substituted or unsubstituted alkenyl group, a substituted or unsubstituted aralkyl group, a substituted or unsubstituted aryl group, or a substituted or unsubstituted heterocyclic group; the above $R^1$ and $R^2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and when a plurality of Z's exist, the Z's may be the same or different;

$Y_1$, $Y_2$, $Y_3$, and $Y_4$ each independendy represent a monovalent substituent group;

when any of $X_1$ to $X_4$ and $Y_1$ to $Y_4$ exists in plurality, they may be the same or different;

$a_1$ to $a_4$ and $b_1$ to $b_4$ represent the number of substituent groups $X_1$ to $X_4$ and $Y_1$ to $Y_4$, respectively, and $a_1$ to $a_4$ each independently represent an integer of 0 to 4, all of them do not represent 0 at the same time, and $b_1$ to $b_4$ each independently represent an integer of zero to four;

M is a hydrogen atom, a metallic atom, or an oxide, a hydroxide or a halide thereof.

15. The ink for ink jet recording as described in claim 14, wherein the dye represented by general formula (I) is a dye represented by the following general formula (II):

General formula (II)

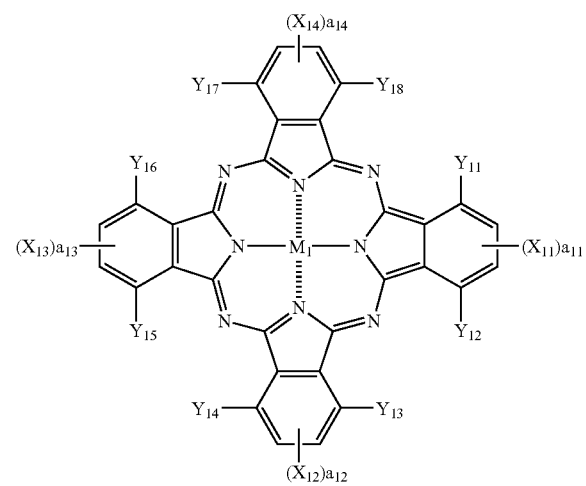

in the above general formula (II), $X_{11}$ to $X_{14}$, and M have the same meanings as $X_1$ to $X_4$, and M in general formula (I), respectively;

$a_{11}$ to $a_{14}$ each independently represent an integer of 1 or 2, and $Y_{11}$ to $Y_{18}$ each indenendently represents a hydrogen atom, a halogen atom, a cyano group, a carboxyl group or a sulfo group.

16. The ink for ink jet recording as described in any of claim 1, which comprises an organic solvent having a boiling point of 150° C. or higher.

17. A method of ink jet recording, which comprises using the ink for ink jet recording as described in claim 1.

18. A method of ink jet recording, which comprises discharging ink droplets according to a recording signal onto an image-receiving material that has an image-receiving layer containing particles of a white inorganic pigment on a support to record an image on the image-receiving material, wherein the ink droplets comprises the ink for ink jet recording as described in claim 1.

19. The ink for ink jet recording as described in claim 14, wherein the phthalocyanine represented by the general formula (I), at least one of $X_1$, $X_2$, $X_3$ and $X_4$ represents —SO$_2$Z or SO$_2$NR$^1$R$^2$.

20. The ink for ink jet recording as described in claim 15, wherein $Y_{11}$ to $Y_{18}$ each represents a hydrogen atom.

* * * * *